United States Patent
Sato et al.

(10) Patent No.: US 8,302,188 B2
(45) Date of Patent: Oct. 30, 2012

(54) INSTRUCTION GENERATION APPARATUS FOR GENERATING A COMPUTER PROGRAM RESISTANT TO UNAUTHORIZED ANALYSES AND TAMPERING

(75) Inventors: Taichi Sato, Kyoto (JP); Rieko Asai, Osaka (JP)

(73) Assignee: Panasonic Corporation, Osaka (JP)

( * ) Notice: Subject to any disclaimer, the term of this patent is extended or adjusted under 35 U.S.C. 154(b) by 804 days.

(21) Appl. No.: 12/373,956

(22) PCT Filed: Jul. 18, 2007

(86) PCT No.: PCT/JP2007/064156
§ 371 (c)(1),
(2), (4) Date: Jan. 15, 2009

(87) PCT Pub. No.: WO2008/010508
PCT Pub. Date: Jan. 24, 2008

(65) Prior Publication Data
US 2009/0177873 A1      Jul. 9, 2009

(30) Foreign Application Priority Data

Jul. 18, 2006 (JP) .................. 2006-195249
Nov. 9, 2006 (JP) .................. 2006-303603

(51) Int. Cl.
*G06F 12/14* (2006.01)
(52) U.S. Cl. ........................................ 726/22
(58) Field of Classification Search ............... 726/22
See application file for complete search history.

(56) References Cited

U.S. PATENT DOCUMENTS

2005/0262347 A1   11/2005   Sato et al.
2010/0070804 A1   3/2010    Bolignano et al.

FOREIGN PATENT DOCUMENTS

| JP | 2004-362532 | 12/2004 |
|----|-------------|---------|
| JP | 2005-166070 | 6/2005  |
| JP | 2005-173903 | 6/2005  |
| JP | 2006-164184 | 6/2006  |
| JP | 2007-517299 | 6/2007  |
| WO | 2005/073859 | 8/2005  |
| WO | 2006/009081 | 1/2006  |

OTHER PUBLICATIONS

Ogiso et al.; "Software Obfuscation on a Theoretical Basis and Its Implementation"; Jan. 2003; IEICE.*
International Search Report issued Oct. 30, 2007 in the International (PCT) Application of which the present application is the U.S. National Stage.
Chenxi Wang, "A Security Architecture for Survivability Mechanisms", Ph.D. A Dissertation, Oct. 2000.

* cited by examiner

*Primary Examiner* — Eddie P Chan
*Assistant Examiner* — Benjamin Geib
(74) *Attorney, Agent, or Firm* — Wenderoth, Lind & Ponack, L.L.P.

(57) ABSTRACT

A tampering-prevention-process generation apparatus generates an output process instruction group to be executed by an execution processing apparatus in order to protect a first process instruction which causes the execution processing apparatus to assign a value to an assign-target variable. The tampering-prevention-process generation apparatus includes a branch-process-instruction-group generating unit configured to generate, as a part of the output process instruction group, a branch process instruction group which causes a processing route to branch to the first process instruction. The tampering-prevention-process generation apparatus also includes a dependent-process-instruction-group generating unit configured to generate, as a part of the output process instruction group, a dependent process instruction group which causes the execution processing apparatus to execute a process dependent on the value of the assign-target variable.

15 Claims, 35 Drawing Sheets

FIG. 5A

First process instruction group 140

```
int decrypt( int encryptedData){
    int plainData
    plainData = encryptedData ^0X00FF;
    return plainData;
}
```

FIG. 5B

Second process instruction group 150

```
long decompress(char compressedData){
    int counter;
    long decompressedData=0;
    for(counter=0;counter<compressedData;counter++){
        decompressedData
            = (decompressedData<<1) | 0x0001;
    }
    return decompressedData;
}
```

FIG. 5C

Output process instruction group 160

```
long decompress(char compressedData){
    int counter;
    long decompressedData=0;
    int encryptedData;
    int plainData;
    encryptedData = 0xF022;
    plainData = decrypt( encryptedData );
    for(counter=0;counter<compressedData;counter++){
        decompressedData
            = (decompressedData<<1) |
              (plainData -0xF0DC );

}
    return decompressedData;
}
```

Referenced-variable-value-assigning-process instruction group 310

Branch process instruction group 320

Dependent process instruction group 330

FIG. 9

Output process instruction group 160a

```
long decompress(char compressedData){
    int counter;
    long decompressedData=0;
    int encryptedData;
    int plainData;
    encryptedData = compressedData<<8;
    plainData = decrypt( encryptedData );
    for(counter=0;counter<compressedData;counter++){
        decompressedData
            = (decompressedData<<1) |
              ( (compressedData <<8)^plainData ^0x00FE );
    }
    return decompressedData;
}
```

Referenced-variable-value-assigning-process instruction group 310a

Branch process instruction group 320a

Dependent process instruction group 330a

FIG. 20

Tamper-resistant program 1330

```
func( int var_org0, int var_org1, int var_org2)
{
    int var_ab0,var_save0;
```

| PRE_A:<br>   var_org0=7+var_org2;<br>   var_org2=var_org0*2; | PRE_A instruction group 1410 |

STR_A-variable-group value assigning instruction group 1620

| var_ab0=1; |

| A:<br>   var_org0=var_org2*8;<br>   var_org2=var_org2+2; | A instruction group 1420 |

CBR_AB conditional branch instruction group 1610

| if(var_ab0%2==0) goto SUC_B_; |

| SUC_A:<br>   var_org0=var_org1+var_org2;<br>   var_org2=var_org2-4; | SUC_A instruction group 1430 |

B instruction group 1440

| B:<br>   var_org1 =var_org1*3;<br>   var_org2=var_org2*2: |

STR_B-variable-group value assigning instruction group 1630

| var_ab0=8; |

Save instruction group 1640

| var_save0=var_org2; |

BR_B branch instruction group 1660

| goto A: |

Restore instruction group 1650

| SUC_B_:<br>   var_org2 =var_save0; |

| SUC_B:<br>  var_org1 =var_org1+var_org2;<br>   var_org1 =var_org1*123; | SUC_B instruction group 1450 |

```
    return var_org1;
}
```

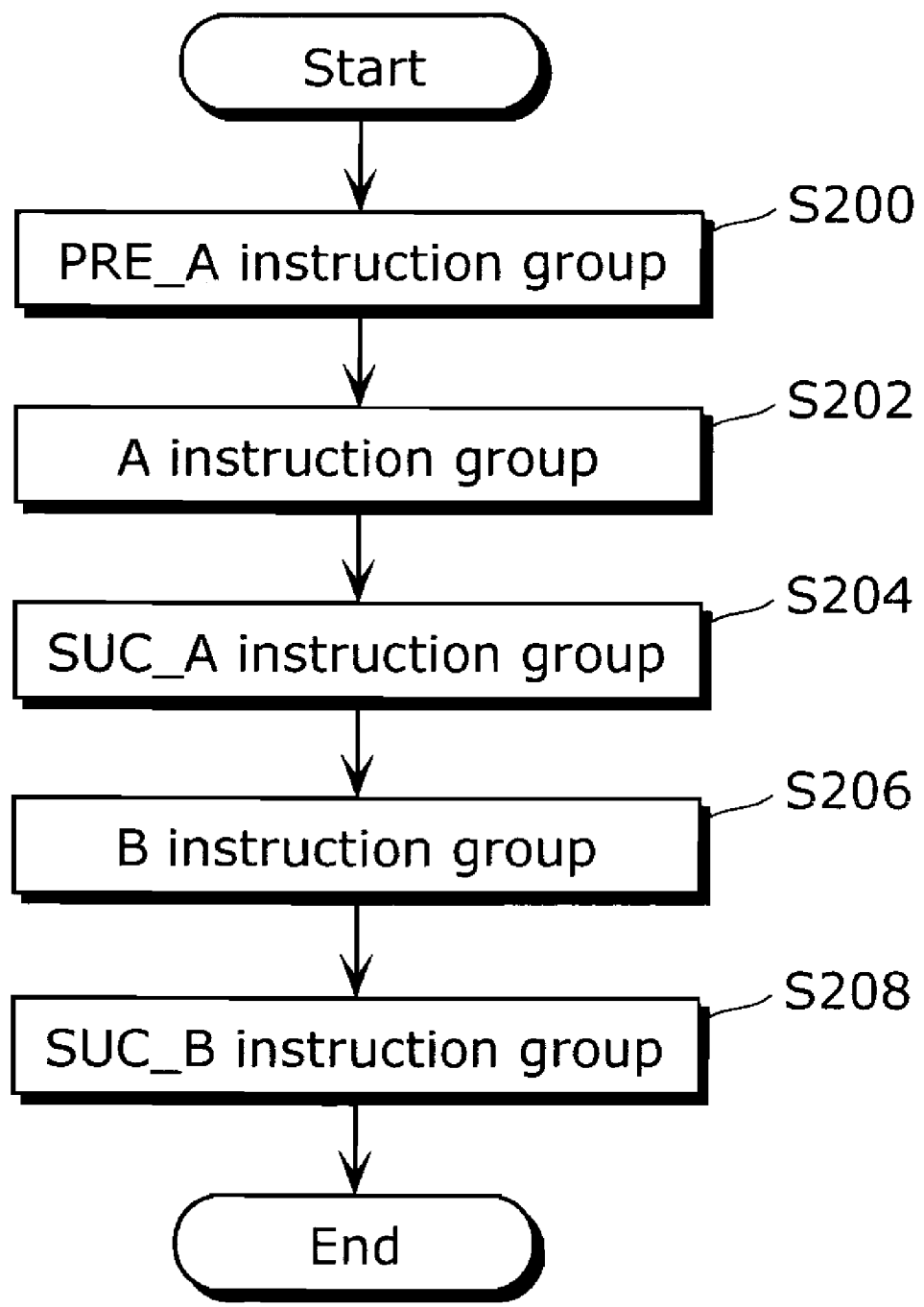

FIG. 26    Tamper-resistant program 1330a

```
func( int var_org0, int var_org1, int var_org2)
{
    int var_ab0,var_save0;                      PRE_A instruction
    ┌──────────────────────────────────┐        group 1410
    │ PRE_A:                           │
    │   var_org0=7+var_org2;           │        STR_A-variable
    │   var_org2=var_org0*2;           │        -group value
    └──────────────────────────────────┘        assigning
    ┌──────────────────────────────────┐        instruction group
    │   var_ab0=1;                     │        1620
    └──────────────────────────────────┘
    ┌──────────────────────────────────┐        A instruction group
    │ A:                               │        1420
    │   var_org0=var_org2*8;           │
    │   var_org2=var_org2+2;           │        CBR_AB conditional
    └──────────────────────────────────┘        branch instruction
    ┌──────────────────────────────────┐        group 1610
    │ if(var_ab0%2==0) goto SUC_B_;    │
    └──────────────────────────────────┘        SUC_A instruction
    ┌──────────────────────────────────┐        group 1430
    │ SUC_A:                           │
    │   var_org0=var_org1+var_org2;    │        B instruction group
    │   var_org2=var_org2-4;           │        1440
    └──────────────────────────────────┘
    ┌──────────────────────────────────┐        STR_B-variable
    │ B:                               │        -group value
    │   var_org1 =var_org1*3;          │        assigning instruction
    │   var_org2=var_org2*2:           │        group 1630
    └──────────────────────────────────┘
    ┌──────────────────────────────────┐        Save instruction
    │   var_ab0=8;                     │        group 1640
    └──────────────────────────────────┘
    ┌──────────────────────────────────┐        Referenced
    │   var_save0=var_org2;            │        -variable-value-
    └──────────────────────────────────┘        assigning-process
    ┌──────────────────────────────────┐        instruction group
    │   var_org2=5;                    │        2210
    └──────────────────────────────────┘
    ┌──────────────────────────────────┐        BR_B branch
    │   goto A:                        │        instruction group
    └──────────────────────────────────┘        1660
    ┌──────────────────────────────────┐
    │ SUC_B_:                          │        Restore instruction
    │   var_org2 =var_save0;           │        group 1650
    └──────────────────────────────────┘
    ┌──────────────────────────────────┐        SUC_B dependent
    │ SUC_B:                           │        process instruction
    │ var_org1 =var_org1+var_org2;     │        group 2220
    │   var_org1 =var_org1*(var_org0*3+3);│
    └──────────────────────────────────┘
    return var_org1;
}
```

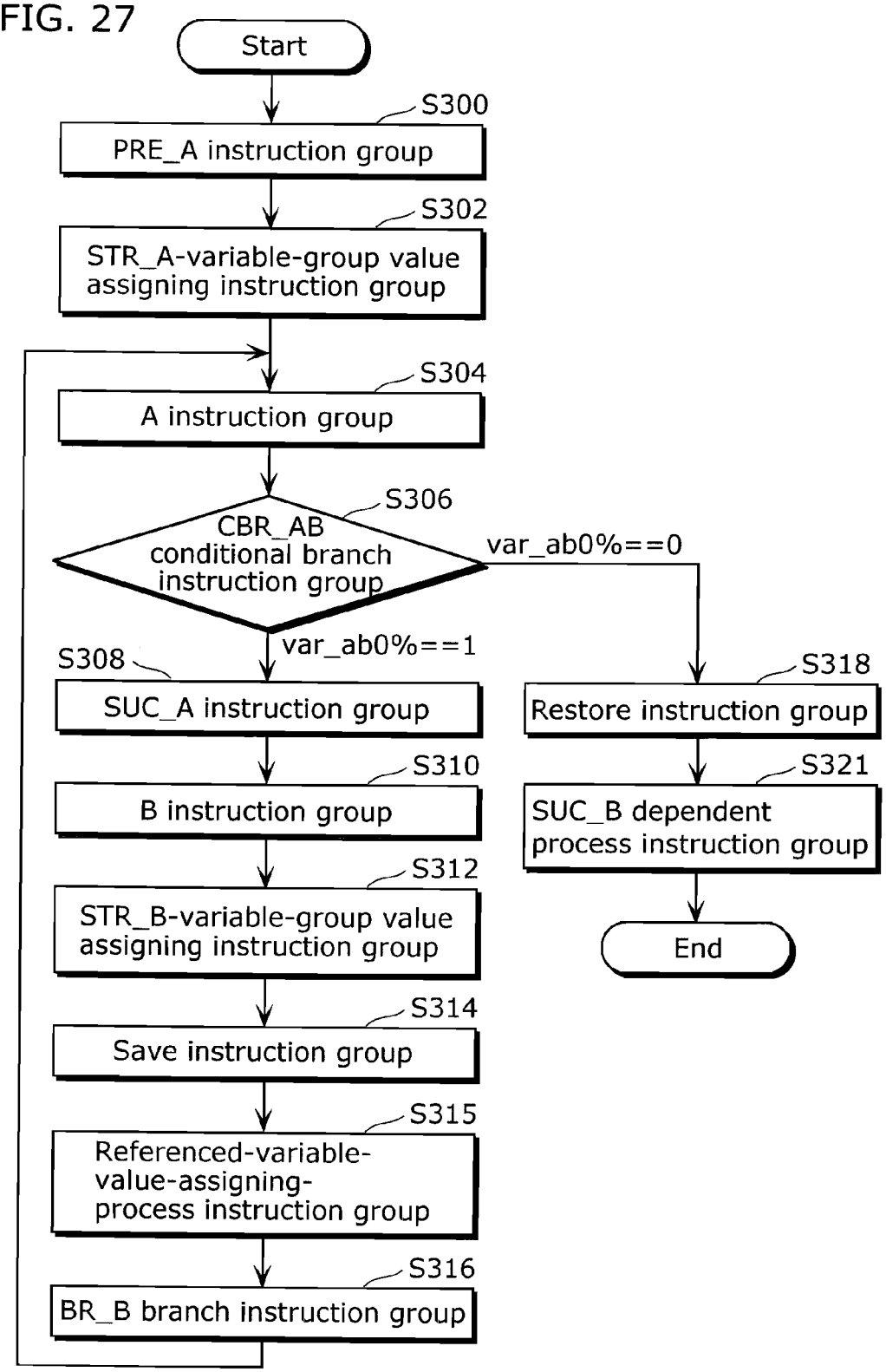

INSTRUCTION GENERATION APPARATUS FOR GENERATING A COMPUTER PROGRAM RESISTANT TO UNAUTHORIZED ANALYSES AND TAMPERING

TECHNICAL FIELD

The present invention relates to an instruction generation apparatus for generating a computer program that is resistant to unauthorized analyses and tampering.

BACKGROUND ART

Some of the programs operated by computers are required to be resistant to unauthorized tampering. Examples of such programs include programs handling personal information and programs utilized for copyright management. The programs handling important information such as personal information are desirably tamper-resistant because spread of tampered programs is a threat. The programs utilized for copyright management are, for example, programs that manage the number of content usages for the purpose of applying a usage restriction, and are also desirably tamper-resistant because tampering with the programs in order to avoid the usage restriction is a threat. Apart from these examples, there is also a threat of modifying programs, developed by software development vendors, to be sold by other companies, and a threat of modifying game programs despite the intentions of the copyright holders, which creates a demand for program-tampering prevention techniques.

Among conventional tampering prevention techniques is one utilizing a tampering check. This technique is to detect tampering by calculating a hash value/checksum of a program in a memory and then judging whether or not the calculated hash value/checksum is equal to a precalculated hash value/checksum.

FIG. 1 is a diagram showing a program which includes a conventional tampering check process. In FIG. 1, a function f1 represents a process instruction group on which the tampering check is to be performed (protection target). The function f1 is assumed to be a program held in a computer memory for execution, and held specifically at addresses 0300 to 0400 in the memory. A function f2 represents a tampering check process. A process instruction "tmp=0; for(a=0300;a<0400; a++){tmp+=*a;}" represents a process (a hash calculation process) for repeating, from the address 0300 to the address 0400, an operation of reading data stored in a variable "a" and adding the read value to a variable "tmp". This process enables calculation of a sum (checksum) of data from the address 0300 to the address 0400.

A process instruction "if(tmp!=SUM){exit( );}" represents a process (judgment/termination process) for judging whether or not the calculated checksum equals SUM, and continuing the process when the judgment indicates true whereas terminating the process when the judgment indicates false. Here, SUM is the precalculated checksum of the function f1. Therefore, if no tampering has been performed with the function f1, SUM and tmp have the same value, however, if tampering has been performed with the function f1, SUM and tmp have different values. As a result, one is able to find out whether or not tampering has been performed with the function f1 based on whether or not SUM and tmp have the same value.

FIG. 2 is a diagram for describing a process performed by a conventional tampering-prevention-process generation apparatus.

The conventional tampering-prevention-process generation apparatus (instruction generation apparatus) obtains an input program containing a protection target code, and generates a tamper-resistant program by adding a tampering check process to the input program. The protection target code corresponds to the above mentioned process instruction group represented by the function f1, and the tamper-resistant program corresponds to the program shown in FIG. 1.

Execution of such a tamper-resistant program by a computer involves a judgment on whether or not the hash value (checksum) of the protection target code is correct, and detection of tampering performed with the protection target code when the hash value is judged to be incorrect.

In such a manner, the conventional tampering-prevention-process generation apparatus adds the tampering check process to the input program to prevent execution of the input program containing the tampered protection target code.

Apart from the tampering check, there is a tampering prevention technique implemented by monitoring program behaviors. Patent Reference 1 discloses a technique of detecting program tampering by incorporating into a program in advance a process instruction for performing a predetermined behavior, and monitoring the actual program behavior at the time of the program execution to check whether or not the incorporated behavior will actually be exhibited.
Patent Reference 1: Japanese Unexamined Patent Application Publication No. 2005-173903

DISCLOSURE OF INVENTION

Problems that Invention is to Solve

The conventional tampering-prevention-process generation apparatus shown in FIG. 2, however, entails a problem that the tampering check process can be easily found by an unauthorized analyzer, allowing tampering with the tampering check process to invalidate the tampering check process.

For example, the unauthorized analyzer first tampers with the protection target code (the function f1) of the tamper-resistant program, and executes the tamper-resistant program. Then, by monitoring whether or not the tampered portion is accessed as data, the unauthorized analyzer can easily find the hash calculation process contained in the tampering check process. More specifically, finding the tampering check process is enabled by using a debugger having a function to monitor whether the tampered portion is read as data from a designated address. In other words, by monitoring the tampered address after tampering with the protection target code, the unauthorized analyzer can find the tampering check process "tmp+=*a" of reading data from the tampered address, and thus can find out that the tampering check process is performed on the tampered address.

Thus, the unauthorized analyzer tampers with a process instruction "if(tmp!=SUM){exit( );}", which is for the judgment/termination process, such that it is altered to be an instruction "if(tmp!=SUM){;}" for not performing any processes even when SUM and "tmp" do not match each other. As a result, the tampering check process itself is invalidated.

Moreover, even with the technique disclosed in Patent Reference 1 of monitoring program behaviors, the process itself of monitoring the behaviors could be found to be the target of tampering.

Therefore, the present invention has been conceived in consideration of the above described problems, and an object of the present invention is to provide an instruction generation apparatus that generates a program that reliably protects protection target codes.

Means to Solve the Problems

In order to achieve the object set forth above, the instruction generation apparatus according to the present invention is an instruction generation apparatus which generates an output process instruction group including a plurality of instructions to be executed by a computer in order to protect a first process instruction which causes the computer to assign data to an assign-target variable, the apparatus comprising: a branch-instruction generating unit configured to generate, as a part of the output process instruction group, a branch instruction which causes a processing route to branch to the first process instruction so that the computer executes the first process instruction; and a dependent-process-instruction generating unit configured to generate, as a part of the output process instruction group, a dependent process instruction dependent on the data assigned to the assign-target variable, the dependent process instruction causing the computer to execute a predetermined process in the output process instruction group onward when the data indicates predetermined contents, and the assigned to the assign-target variable indicating a result of the first process instruction executed by the computer according to the branch instruction.

With this structure, when the computer executes the output process instruction group, it executes the first process instruction through the branch instruction, and also the process dependent on the execution result of the first process instruction (the data assigned to the assign-target variable) through the dependent process instruction. As a result, if the first process instruction is not tampered with, the computer executes a predetermined process through the dependent process instruction, whereas if the first process instruction is tampered with, the computer executes a process different from the predetermined process. Thus, protection of the first process instruction against tampering is possible. In addition, since the first process instruction is not read as data, it is possible to make it difficult for an unauthorized analyzer to find the process (the output process instruction group) intended for tampering prevention. As a result, the first process instruction, the protection target code, can be reliably protected against tampering and unauthorized analyses.

Further, the present invention is valuable since the use of the first process instruction as a part of the output process instruction group enables prevention of unauthorized analyses on and tampering with programs (e.g. the first process instruction).

Furthermore, when the first process instruction is tampered with, the output process instruction group does not allow the execution of a predetermined process. That is, a tampering check can be achieved for the first process instruction. In addition, even when the tampering is performed in such a manner that the data assigned through the first process instruction is forcibly made conformed to predetermined contents in order to avoid the tampering check, in the case where the first process instruction is also called by another instruction group, this instruction group results in an abnormal operation. As a result, the tampering can be detected.

Moreover, the method for making the tampering difficult according to the present invention differs from the conventional tampering check methods, and does not need to read programs as data, which enables its use even in an environment where reading programs such as Java® and the like is restricted, and thus a highly advantageous effect is produced.

Further, when the output process instruction group is executed, the first process instruction is also executed. Therefore, it is difficult to analyze whether the first process instruction is a process necessary for both the functions of the first process instruction and of the output process instruction group, or necessary only for the function of the first process instruction. As a result, it is possible to create a difficulty in the analytic operations performed by the unauthorized analyzer who focuses only on the process necessary for the function of the first process instruction to attempt an analysis on the first process instruction.

Here, it may be that the dependent-process-instruction generating unit is configured to obtain a second process instruction which causes the computer to execute a predetermined process, and to generate the dependent process instruction by converting the second process instruction into the dependent process instruction, and the dependent process instruction causes the computer to derive an execution result identical to an execution result of the second process instruction when a value assigned to the assign-target variable equals a predetermined assumed value, the value assigned to the assign-target variable indicating an execution result of the first process instruction.

With this structure, upon obtainment of the second process instruction, the instruction generation apparatus is capable of obfuscating the second process instruction to generate a dependent process instruction, and thus reliable protection of the first process instruction can be achieved.

Furthermore, according to the present invention, at the time of executing the output process instruction group (corresponding to the process of the second process instruction) for the execution of the predetermined process, the first process instruction is also executed. Therefore, when analyzing the predetermined process, the unauthorized analyzer needs to analyze both the output process instruction group and first process instruction, and thus the unauthorized analysis is made further difficult.

Here, it may be that the instruction generation apparatus further comprises: an obtaining unit configured to obtain an input program which includes: the second process instruction that does not use the first process instruction; and a third process instruction which causes the computer to execute a process different from the second process instruction using the first process instruction; and an output unit configured to output an output program which includes the third process instruction and the output process instruction group, the output process instruction group including the dependent process instruction generated through the conversion of the second process instruction included in the input program by the dependent-process-instruction generating unit.

With this structure, the program including the second process instruction can be obfuscated. Further, with the obfuscated program, although a process which was originally not present in the first process instruction is additionally executed, since the first process instruction is used also for a different purpose, the code size increase can be suppressed and the fact that the execution of the first process instruction is actually for the purpose of the tampering check can be concealed.

Here, it may be that the instruction generation apparatus further comprises: an assumed value calculating unit configured to calculate, as the assumed value, a value to be assigned to the assign-target variable in the first process instruction according to a predetermined condition, wherein the dependent-process-instruction generating unit is configured to generate the dependent process instruction which causes the computer to derive an execution result identical to the execution result of the second process instruction when the value assigned to the assign-target variable equals the assumed value calculated by the assumed value calculating unit, the value assigned to the assign-target variable indicating the execution result of the first process instruction. For example, the instruction generation apparatus further comprises a referenced-variable-value-assigning-process generating unit configured to generate, as a part of the output process instruction group, a referenced-variable-value-assigning-process instruction which causes the computer to assign a value to a referenced variable referred to in the first process instruction at a time of executing the first process instruction, wherein the assumed value calculating unit is configured to use the value assigned to the referenced variable as the condition, and calculate, as the assumed value, a value to be assigned to the assign-target variable in the first process instruction according to the value assigned to the referenced variable.

With this structure, the value of the referenced variable referred to when the computer executes the first process instruction equals the value of the referenced variable serving as a condition applied when the assumed value calculating unit calculates an assumed value. Thus, if the first process instruction is not tampered with, the value of the assign-target variable indicating the result of the execution of the first process instruction by the computer can be made equal to the assumed value. As a result, when the assign-target-variable value is different from the assumed value, the first process instruction can be judged as being tampered with, and it is possible to prevent the computer from deriving the execution result identical to that of the second process instruction.

In addition, since it is sufficient as long as the value of the referenced variable referred to when the computer executes the first process instruction equals the value of the referenced variable serving as a condition applied when the assumed value calculating unit calculates an assumed value, the value of the referenced variable may be any given value rather than fixed.

Here, it may be that the instruction generation apparatus further comprises a referenced-variable identifying unit configured to identify a referenced variable referred to in the first process instruction, wherein the referenced-variable-value-assigning-process generating unit is configured to generate the referenced-variable-value-assigning-process instruction which causes the computer to assign a value to the referenced variable identified by the referenced-variable identifying unit.

With this structure, since the referenced variable identifying unit (the referenced variable analyzing unit) identifies the referenced variable, the referenced-variable-value-assigning-process instruction (the referenced-variable-value-assigning-process instruction group) can be generated without the user specifying which variable is the referenced variable included in the first process instruction.

Here, it may be that the instruction generation apparatus further comprises a value holding unit configured to hold, as a set of referenced variable values, values which are candidates for a value to be assigned to the referenced variable, wherein the referenced-variable-value-assigning-process generating unit is configured to generate the referenced-variable-value-assigning-process instruction which causes a value included in the set of referenced variable values to be assigned to the referenced variable. For example, the assumed value calculating unit is configured to calculate, as a set of assumed values, a set of values each to be assigned to the assign-target variable in the first process instruction, the calculation being performed according to each of values included in the set of referenced variable values, the dependent-process-instruction generating unit is configured to generate the dependent process instruction by using the set of referenced variable values and the set of assumed values, and the dependent process instruction causes the computer to derive an execution result identical to the execution result of the second process instruction when the value assigned to the assign-target variable equals a value included in the set of assumed values, the value assigned to the assign-target variable indicating the execution result of the first process instruction.

With this structure, the value stored in the referenced variable can be made different for every execution of the output process instruction. As a result, it becomes more difficult for the unauthorized analyzer to elucidate that the output process instruction group is intended for protecting the first process instruction.

Here, it may be that the dependent process instruction causes the computer to compare a value assigned to the assign-target variable and a predetermined assumed value, execute the predetermined process when the value assigned to the assign-target variable equals the predetermined assumed value, and suppress the execution of the predetermined process when the value assigned to the assign-target variable is different from the assumed value.

With this structure, when the tampering with the first process instruction causes the assign-target-variable value to be different from the assumed value, an error process can be executed by the computer, thereby allowing the detection of the tampering with the first process instruction.

Here, it may be that the instruction generation apparatus further comprises an assign-target-variable identifying unit configured to identify the assign-target variable included in the first process instruction, wherein the dependent-process-instruction generating unit is configured to generate the dependent process instruction which causes the computer to execute a process dependent on data assigned to the assign-target variable identified by the assign-target-variable identifying unit.

With this structure, the assign-target-variable identifying unit (the assign-target variable analyzing unit) identifies an assign-target variable, and thus the dependent process instruction can be generated without the user specifying which variable is the assign-target variable included in the first process instruction.

Here, it may be that the instruction generation apparatus further comprises: an obtaining unit configured to obtain an input program which includes the first process instruction, a first preceding instruction serving as a branch source of the first process instruction, a first subsequent instruction serving as a branch destination of the first process instruction, a second process instruction serving as a branch destination of the first subsequent instruction, and a second subsequent instruction serving as a branch destination of the second process instruction; a conditional-branch-instruction generating unit configured to generate a conditional branch instruction; and an output unit configured to output an output program which includes the first process instruction, the first preceding instruction, the first subsequent instruction, and the second process instruction, wherein the dependent-process-instruction generating unit is configured to generate the dependent process instruction which causes the computer to derive an execution result identical to an execution result of the second subsequent instruction when the data assigned to the assign-target variable indicates predetermined contents, the branch-instruction generating unit is configured to generate the branch instruction which causes the processing route to branch from the second process instruction to the first process instruction so that the computer executes the first process instruction again after executing the second process instruction, the conditional-branch-instruction generating unit is configured to generate the conditional branch instruction which causes the processing route to branch from the first process instruction to the first subsequent instruction when the first condition is satisfied, and branch from the first process instruction to the dependent process instruction when the second condition is satisfied, the output unit is configured to output the output program which includes the dependent process instruction, the branch instruction, and the conditional branch instruction, the first condition is that the first preceding instruction has been executed immediately before the first process instruction when the computer executes the first process instruction, and the second condition is that the second process instruction has been executed immediately before the first process instruction when the computer executes the first process instruction.

With this structure, the first process instruction which is not executed in the input program between the second process instruction and the second subsequent instruction is sometimes executed in the output program (tamper-resistant program) between the second process instruction and the second subsequent instruction. That is to say, the first process instruction in the output program is also executed in an execution order different from that of the input program. As a result, the input program can be obfuscated, and even when the unauthorized analyzer performs an analysis by actually operating the output program, the execution order and anteroposterior relationships in the input program cannot be easily analyzed.

Further, it may be that the first subsequent instruction included in the input program includes a plurality of first subsequent instructions, and the conditional-branch-instruction generating unit is configured to generate, when the first condition is satisfied, the conditional branch instruction which causes the processing route to branch from the first process instruction to one of the plurality of first subsequent instructions which satisfies a third condition so that the one of the plurality of first subsequent instructions is executed as a branch-destination first subsequent instruction after the first process instruction is executed.

This structure makes both the dependent process instruction and the plurality of first subsequent instructions the branch destinations of the first process instruction, thereby making it difficult to analyze from which of the first process instruction and the second process instruction, the dependent process instruction and the plurality of first subsequent instructions make a branch for execution.

Furthermore, it may be that the third condition is a value assigned to a variable, and the conditional-branch-instruction generating unit is configured to generate the conditional branch instruction which causes the processing route to make a branch based on a value assigned to a variable indicating whether or not the first condition is satisfied and a value assigned to a variable indicating whether or not the second condition is satisfied.

This structure makes it difficult to distinguish between the variable used for checking whether the first or second condition is satisfied and the variable used for the third condition, thereby making it difficult to find out on which of the variables each of the conditions is based, and to perform an analysis on each condition.

Moreover, it may be that the second subsequent instruction included in the input program includes a plurality of second subsequent instructions, the dependent process instruction causes the plurality of second subsequent instructions to be converted into a plurality of dependent process instructions including the dependent process instruction, and the conditional-branch-instruction generating unit is configured to generate, when the second condition is satisfied, the conditional branch instruction which causes the processing route to branch from the first process instruction to one of the plurality of dependent process instructions which satisfies a fourth condition so that the one of the plurality of dependent process instructions is executed as a branch-destination dependent process instruction after the first process instruction is executed.

This structure makes both the plurality of dependent process instructions and the first subsequent instruction the branch destinations of the first process instruction, thereby making it difficult to analyze from which of the first process instruction and the second process instruction, the plurality of dependent process instructions and the first subsequent instruction make a branch for execution.

Further, it may be that the fourth condition is a value assigned to a variable, and the conditional-branch-instruction generating unit is configured to generate the conditional branch instruction which causes the processing route to make a branch based on a value assigned to a variable indicating whether or not the first condition is satisfied and a value assigned to a variable indicating whether or not the second condition is satisfied.

This structure makes it difficult to distinguish between the variable used for checking whether the first or second condition is satisfied and the variable used for the fourth condition, thereby making it difficult to find out on which of the variables each of the conditions is based, and to perform an analysis on each condition.

Furthermore, it may be that the instruction generation apparatus further comprises: a variable generating unit configured to generate an additional variable which is not used in the input program; and a conditional-value-assigning-instruction generating unit configured to generate a first conditional value assigning instruction which causes the computer to assign a first conditional value to the additional variable when the first condition is satisfied, and to generate a second conditional value assigning instruction which causes the computer to assign a second conditional value to the additional variable when the second condition is satisfied, wherein the conditional-branch-instruction generating unit is configured to generate a conditional branch instruction which causes the processing route to branch from the first process instruction to the first subsequent instruction when a value assigned to the additional variable is the first conditional value, and branch from the first process instruction to the dependent process instruction when the value assigned to the additional variable is the second conditional value.

With this structure, since the additional variable used for checking whether the first or second condition is satisfied is not a variable included in the input program, it can be ensured that assigning a value to the additional variable for the judgment on whether the first or second condition is satisfied does not influence the execution of the process to be executed in the input program.

Further, it may be that the second subsequent instruction and the dependent process instruction cause the computer to execute respective processes that are equivalent to each other by using an execution result obtained through execution of the second process instruction, and the instruction generation apparatus further comprises: a save-instruction generating unit configured to generate a save instruction to save, before the execution of the first process instruction, the execution result obtained through the execution of the second process instruction; and a restore-instruction generating unit configured to generate a restore instruction to restore the saved execution result after the first process instruction is executed again.

With this structure, even when the first process instruction is inserted between the second process instruction and the dependent process instruction in the output program, it is possible to ensure that the execution result of the dependent process instruction onward becomes identical to that of the second subsequent process instruction onward.

In addition, it may be that the instruction generation apparatus further includes a conversion unit configured to convert at least one of the first process instruction, the first preceding instruction, and the second process instruction into an instruction equivalent to the at least one instruction, and the output unit is configured to include the instruction generated through the conversion by the conversion unit in the output program as a replacement of the corresponding pre-conversion instruction and to output the resulting output program. That is to say, the instruction or instruction group according to the present invention includes not only the instruction or instruction group itself, but also an equivalent instruction generated through obfuscation of the instruction or instruction group by an obfuscation technique different from the present invention.

Therefore, since at least one of the instructions of the input program is replaced with an equivalent instruction in the output program, the correspondence between the instructions of the input program and instructions of the output program cannot be easily understood. In other words, a higher level of obfuscation can be performed on the input program, and the analysis on the output program can be made more difficult.

Further, it may be that when the first process instruction includes an Application Program Interface (API), the branch-instruction generating unit is configured to search for, as the second subsequent instruction, an instruction to call an API identical to the API, and generate the branch instruction which causes the processing route to branch from the second process instruction serving as a branch source of the second subsequent instruction to the first process instruction.

With this structure, the instruction for calling the API identical to the API of the first process instruction is set as the second subsequent instruction, and thus the first process instruction can be easily converted into the dependent process instruction dependent on the data assigned to the assign-target variable, thereby making it possible to reliably protect the first process instruction against tampering and unauthorized analyses as described above.

Furthermore, it may be that the instruction generation apparatus further comprises: an obtaining unit configured to obtain an input program which includes the first process instruction; and an output unit configured to add to the input program the branch instruction generated by the branch-instruction generating unit and the dependent process instruction generated by the dependent-process-instruction generating unit so as to generate an output program which includes the first process instruction, the branch instruction, and the dependent process instruction, and to output the output program.

With this structure, the input program can be converted into the output program to reliably protect the first process instruction included in the output program.

Further, the output program generated by the instruction generation apparatus according to present invention includes the first process instruction corresponding to a first function, the second process instruction corresponding to a second function, and the branch instruction which causes the computer to execute the first process instruction, which is unnecessary for the second function, as a redundant process at the time of executing the second process instruction.

As a result, the process of the first process instruction, which is inherently unnecessary for the process of the second process instruction, is executed even in the process of the second process instruction, thereby making it difficult to analyze for which function the process of the first process instruction is necessary and for which function the process of the first process instruction is unnecessary.

Moreover, the present invention can be embodied not only as the instruction generation apparatus as described above, but also as a process generation method for generating the output process instruction group, a program causing a personal computer and the like to generate the output process instruction group, a recording medium recorded with the program, or an integrated circuit which generates the output process instruction group. Obviously, such cases also allow obtainment of the same advantageous effect as that of the instruction generation apparatus.

Effects of the Invention

The instruction generation apparatus according to the present invention produces an advantageous effect of generating a program that reliably protects a protection target code.

BRIEF DESCRIPTION OF DRAWINGS

FIG. 5A is a diagram showing a specific example of a first process instruction group written in the C language.

FIG. 5B is a diagram showing a specific example of a second process instruction group written in the C language.

FIG. 5C is a diagram showing a specific example of an output process instruction group written in the C language.

FIG. 9 is a diagram showing a specific example of an output process instruction group generated by a tampering-prevention-process generation apparatus according to Variation 6 of Embodiment 1 of the present invention.

FIG. 20 is a diagram showing a specific example of a tamper-resistant program written in the C language according to Embodiment 3 of the present invention.

FIG. 21 is a diagram showing a process flow of an input program according to Embodiment 3 of the present invention.

FIG. 26 is a diagram showing a specific example of a tamper-resistant program written in the C language according to a variation of Embodiment 3 of the present invention.

FIG. 27 is a diagram showing a process flow of a tamper-resistant program according to a variation of Embodiment 3 of the present invention.

NUMERICAL REFERENCES

Figure 1:
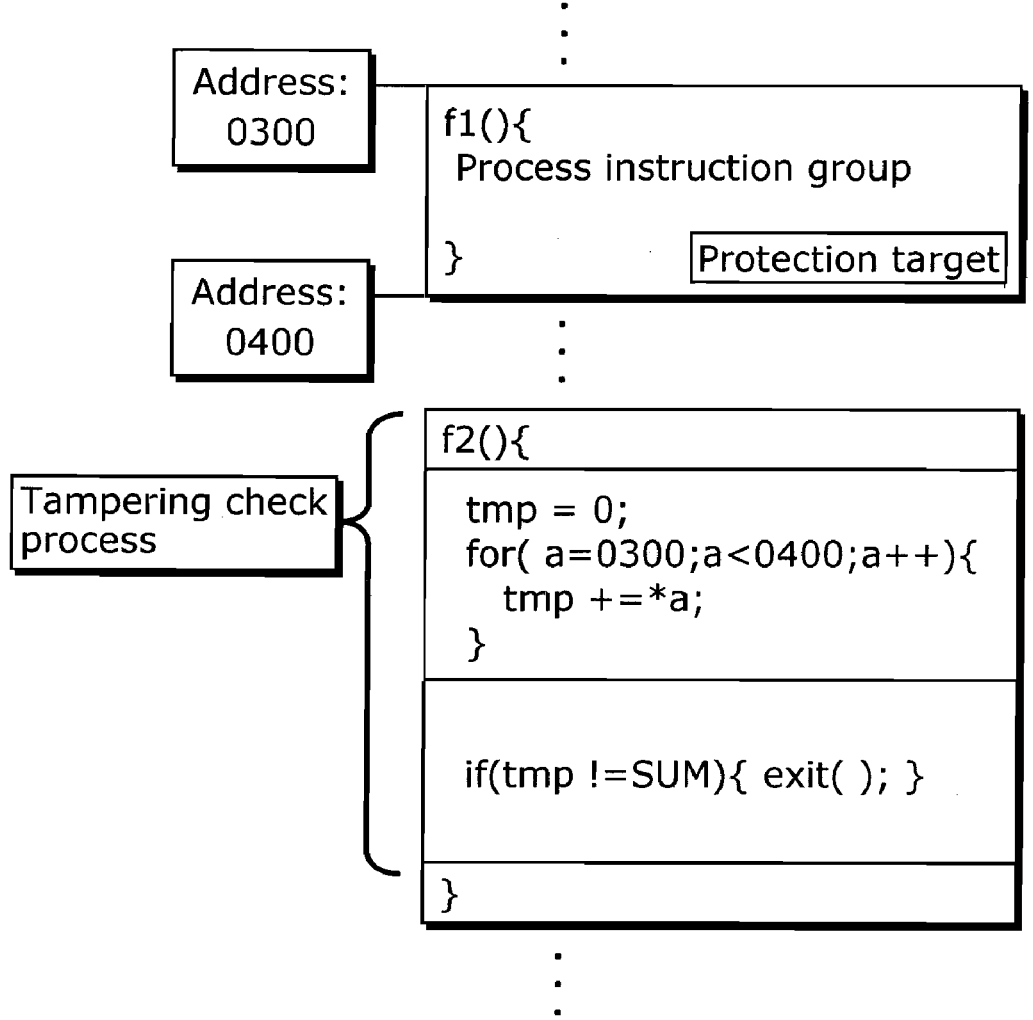
FIG. 1 is a diagram showing a program which includes a conventional tampering check process.
Figure 2:
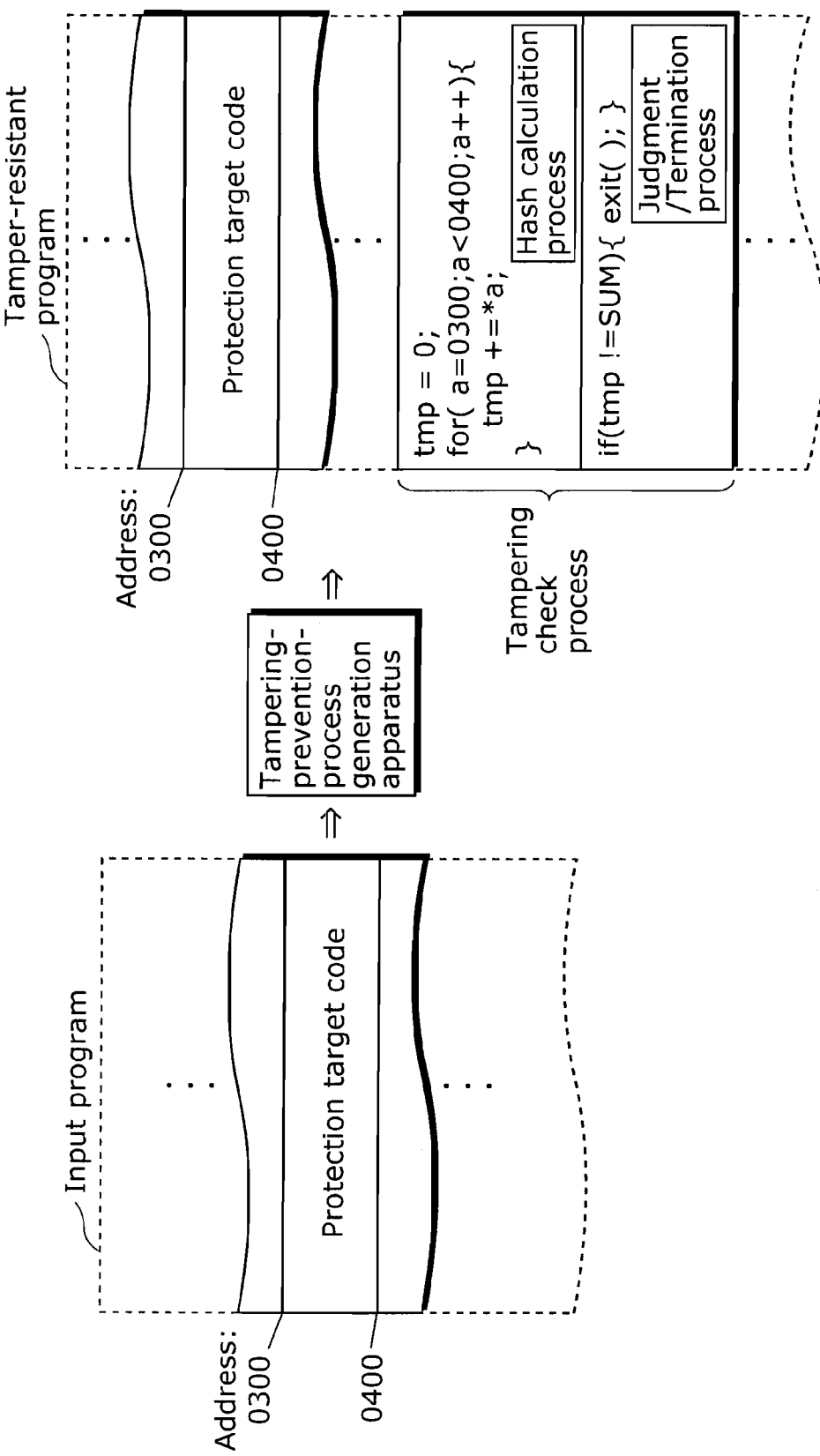
FIG. 2 is a diagram for describing a process performed by a conventional tampering-prevention-process generation apparatus.

| | |
|---|---|
| 100, 100b, 1300 | Processing system |
| 101, 101b, 1310, Pi | Input program |
| 102, 102b, 1330, 1330a, Po | Tamper-resistant program |
| 110, 110a, 110b, 1320, 400 | Tampering-prevention-process generation apparatus |
| 120, 120b, 1350 | Recording medium |
| 130, 130b, 1340 | Execution processing apparatus |
| 140, 140b | First process instruction group |
| 150 | Second process instruction group |
| 160, 160a, 160b | Output process instruction group |
| 210 | Input-process-instruction-group holding unit |
| 220 | Referenced variable analyzing unit |
| 230 | Referenced-variable-information holding unit |
| 240, 240a | Referenced-variable-value-assigning-process-instruction-group generating unit |
| 250 | Referenced-variable-value-assigning-process-instruction-group holding unit |
| 260, 260a | Referenced-variable-value holding unit |
| 270 | Assign-target variable analyzing unit |
| 280 | Assign-target-variable-information holding unit |
| 290, 290a | Assumed value calculating unit |
| 295, 295a | Assumed-value-information holding unit |
| 201 | Dependent-process-instruction-group generating unit |
| 202 | Dependent-process-instruction-group holding unit |
| 203 | Branch-process-instruction-group generating unit |
| 204 | Branch-process-instruction-group holding unit |
| 205 | Output-process-instruction-group generating unit |
| 206 | Output-process-instruction-group holding unit |
| 310, 310a, 310b, 2210 | Referenced-variable-value-assigning-process instruction group |
| 320, 320a, 320b | Branch process instruction group |
| 330, 330a, 330b, 2220 | Dependent process instruction group |
| 1410 | PRE_A instruction group |
| 1420 | A instruction group |
| 1430 | SUC_A instruction group |
| 1440 | B instruction group |
| 1450 | SUC_B instruction group |
| 1610 | CBR_AB conditional branch instruction group |
| 1620 | STR_A-variable-group value assigning instruction group |
| 1630 | STR_B-variable-group value assigning instruction group |
| 1640 | Save instruction group |
| 1650 | Restore instruction group |
| 1660 | BR_B branch instruction group |
| 2010 | Input unit |
| 2020 | Input program holding unit |
| 2030 | Assign-target variable analyzing unit |
| 2040 | Assign-target-variable-information holding unit |
| 2050 | Saved variable analyzing unit |
| 2060 | Saved-variable-information holding unit |
| 2070 | Save-instruction-group generating unit |
| 2080 | Save-instruction-group holding unit |

-continued

| | |
|---|---|
| 2090 | Restore-instruction-group generating unit |
| 2091 | Restore-instruction-group holding unit |
| 2092 | Conditional-branch-instruction-group generating unit |
| 2093 | Branch condition holding unit |
| 2094 | Conditional-branch-instruction-group holding unit |
| 2095 | Variable-group-value-assigning-instruction-group generating unit |
| 2096 | Variable-group-value-assigning-instruction-group holding unit |
| 2097 | Branch-instruction-group generating unit |
| 2098 | Branch-instruction-group holding unit |
| 2099 | Tamper-resistant program generating unit |
| 2100 | Tamper-resistant program output unit |

BEST MODE FOR CARRYING OUT THE INVENTION

Hereinafter, with reference to the drawings, the instruction generation apparatus and the instruction generation method according to the present invention shall be described. It is to be noted that in the following embodiments and variations, the instruction generation apparatus according to the present invention shall be described as a tampering-prevention-process generation apparatus.

(Embodiment 1)

Hereinafter, a processing system according to Embodiment 1 of the present invention shall be described.

Figure 3:
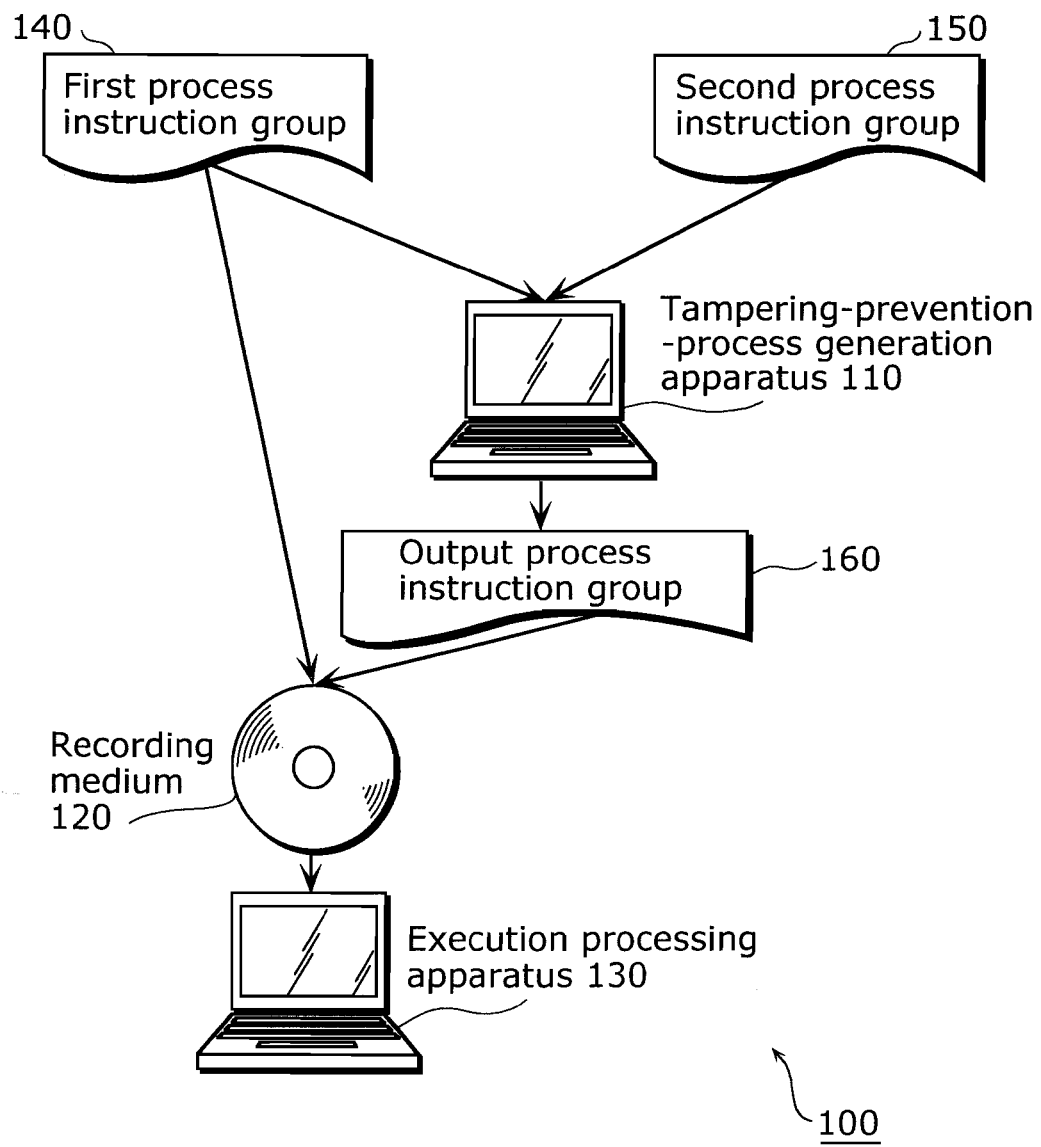
FIG. 3 is a diagram showing the structure of a processing system according to Embodiment 1 of the present invention.

FIG. 3 is a diagram showing the structure of a processing system according to Embodiment 1.

A processing system 100 of the present embodiment includes a tampering-prevention-process generation apparatus (instruction generation apparatus) 110 and an execution processing apparatus 130.

The tampering-prevention-process generation apparatus 110 generates a program that reliably protects codes targeted for protection (protection target codes). It obtains a first process instruction group 140 that is a protection target code and a second process instruction group 150, so as to generate an output process instruction group 160. It is to be noted that the tampering-prevention-process generation apparatus 110 is an obfuscation apparatus which obfuscates the second process instruction group 150 to generate the output process instruction group 160. Unless otherwise stated, an instruction group according to the present description and invention is not limited to an instruction group including a plurality of instructions; it also refers to an instruction group which includes only one instruction.

Further, the tampering-prevention-process generation apparatus 110 writes the first process instruction group 140 and the generated output process instruction group 160 on a recording medium 120.

The execution processing apparatus 130 reads and executes the first process instruction group 140 and the output process instruction group 160 recorded on the recording medium 120.

It is to be noted that instead of writing the first process instruction group 140 and the output process instruction group 160 on the recording medium 120, the tampering-prevention-process generation apparatus 110 may transmit these instruction groups to the execution processing apparatus 130 via a communication medium.

Hereinafter, each of the structural elements shall be described.

The first process instruction group 140 is a process instruction group executed by the execution processing apparatus 130. In some cases, it is executed as a part of the process of the output process instruction group 160, whereas in other cases, it is executed separately from the process of the output process instruction group 160.

The second process instruction group 150 is a process instruction group including an instruction for the execution processing apparatus 130 to execute a predetermined process.

Hereinafter, it is assumed in the present embodiment that the first process instruction group 140 is an instruction group for instructing execution of a process of receiving an encrypted number of times that a content item can be reproduced, decrypting the same, and outputting the number of times in plain text that the content item can be reproduced. Furthermore, it is also assumed in the present embodiment that the second process instruction group 150 is an instruction group for instructing execution of a process of receiving a compressed content item, decompressing the same, and outputting the decompressed content item.

The output process instruction group 160 is an instruction group generated by obfuscating the second process instruction group 150, and calls the first process instruction group 140 during its process for use thereof. More specifically, when the execution processing apparatus 130 executes the output process instruction group 160, an instruction group included in the output process instruction group 160 is executed first, then, during the process, the first process instruction group 140 is called and executed, which is followed by execution of a subsequent process instruction group of the output process instruction group 160.

Hereinafter, the output process instruction group 160 shall be described in detail.

(1) Structure of the Output Process Instruction Group 160

Figure 4:
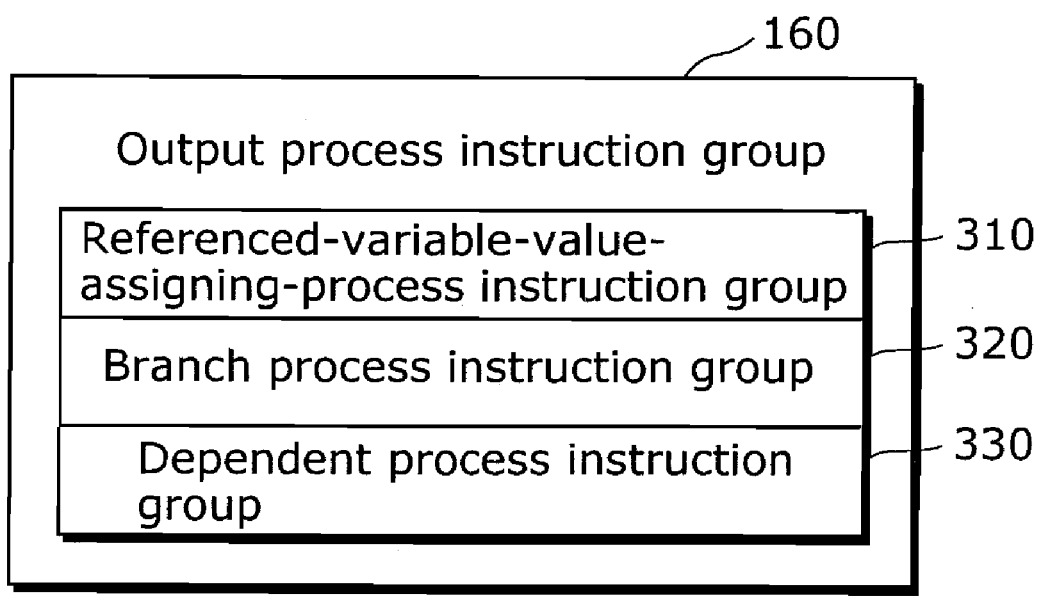
FIG. 4 is a diagram showing the structure of an output process instruction group according to Embodiment 1 of the present invention.

FIG. 4 is a diagram showing a structure of the output process instruction group 160.

The output process instruction group 160 includes a referenced-variable-value-assigning-process instruction group 310 for setting values to various parameters necessary for calling and executing the first process instruction group 140, a branch process instruction group 320 for calling the first process instruction group 140, and a dependent process instruction group 330 executed after the first process instruction group 140 is called. When executing the output process instruction group 160, the execution processing apparatus 130 executes the referenced-variable-value-assigning-process instruction group 310, the branch process instruction group 320, the first process instruction group 140, and the dependent process instruction group 330 in this order.

Hereinafter, each of the process instruction groups shall be described.

(1.1) Referenced-Variable-Value-Assigning-Process Instruction Group 310

The referenced-variable-value-assigning-process instruction group 310 is a process for setting values to various parameters necessary for calling and executing the first process instruction group 140. To be more specific, when the first process instruction group 140 is a function, for example, the referenced-variable-value-assigning-process instruction group 310 is an instruction group for assigning a value to an argument of the function. Further, when the first process instruction group 140 is an instruction group for referring to an external variable, for example, the referenced-variable-value-assigning-process instruction group 310 is an instruction group for assigning a value to the external variable. Furthermore, when the first process instruction group 140 is an instruction group for referring to a value stored on a stack, for example, the referenced-variable-value-assigning-process instruction group 310 is an instruction group for storing a value on the stack. Further, when the first process instruction group 140 is an instruction group for referring to a value stored at a location designated by an address variable, for example, the referenced-variable-value-assigning-process instruction group 310 is an instruction group for storing a value in the address variable referred to.

Such various parameters necessary for executing the first process instruction group 140 are collectively referred to as "referenced variables" in the following description.

(1.2) Branch Process Instruction Group 320

The branch process instruction group 320 is a process instruction group for branching to the first process instruction group 140. To be more specific, for example, when the first process instruction group 140 is a function, the branch process instruction group 320 is a function call instruction, and when the first process instruction group 140 is a subroutine, the branch process instruction group 320 is a subroutine call instruction. Further, when the first process instruction group 140 is a set of process instruction groups, the branch process instruction group 320 is a branch instruction, whereas when the first process instruction group 140 is an exception handling, the branch process instruction group 320 is a process instruction for generating an exception. More specifically, in the assembly language, for example, the branch process instruction group 320 is a function call such as "CALL" and "RET", a jump instruction such as "JA", "JMP", and "LOOP", or an interrupt instruction such as "INT".

(1.3) Dependent Process Instruction Group 330

The dependent process instruction group 330 is a process instruction group executed after the first process instruction group 140 is called, and is a program instruction group for executing a process equivalent to the second process instruction group 150. A difference from the second process instruction group 150 is that a part of the second process instruction group 150 is replaced with a process in which the result of the process of the first process instruction group 140 is used. Details of the replacement shall be given later together with the description of the tampering-prevention-process generation apparatus 110, and thus just an outline of the replacement shall be provided here.

First, the process result of the first process instruction group 140 is, specifically, a return value of a function when the first process instruction group 140 is a function, for example. Further, when the first process instruction group 140 is a process for setting a value to an external variable, for example, the process result of the first process instruction group 140 is a value assigned to the external variable. Furthermore, when the first process instruction group 140 is a process for storing a value on a stack, for example, the process result of the first process instruction group 140 is the value stored on the stack. Further, when the first process instruction group 140 is a process for storing a value at a location designated by an address variable, for example, the process result of the first process instruction group 140 is the stored value. Such process results of the first process instruction group 140 are stored at a storage location referred to as an "assign-target variable" in the following description.

Although it is generally impossible to find out the process result of the first process instruction group 140 in advance, only when the values of the various parameters necessary for executing the first process instruction group 140 are set by the referenced-variable-value-assigning-process instruction group 310, the value of the process result can be known in advance. To be more specific, the value of the process result can be found out when, for example, the first process instruction group 140 is executed with the value set by the referenced-variable-value-assigning-process instruction group 310 actually set in the referenced variable. Hereinafter, such found value is referred to as an assumed value.

The dependent process instruction group 330 is an instruction group for executing the same process as the second process instruction group when the value of the assign-target variable equals the assumed value. Further, it is desirably an instruction group for executing a process different from the second process instruction group when the value of the assign-target variable does not equal the assumed value. More specifically, the dependent process instruction group is "a=a*b;" that replaces the second process instruction group, in the case where the second process instruction group is "a=a*5;" and the assumed value for the assign-target variable "b" is "5", for example.

(1.4) Specific Example of the Process Instruction Groups

FIG. 5A is a diagram showing a specific example of the first process instruction group 140 written in the C language. FIG. 5B is a diagram showing a specific example of the second process instruction group 150 written in the C language. FIG. 5C is a diagram showing a specific example of the output process instruction group 160 written in the C language. It is to be noted that in the following description, operators such as "*", "~", "|", "^", "<<", and ">>" are used, and these operators used in the description of process instruction groups are operators in the C language unless stated otherwise. Moreover, in the following description, each process instruction group is added with a function declaration and/or a variable declaration in accordance with the C language format. However, this language format is well known and thus the description thereof shall be omitted.

As FIG. 5A shows, the first process instruction group 140 is an instruction group including a process of receiving an encrypted number of times a content item is reproduced, namely, "encryptedData" (referenced variable), and decrypting the same to output the decrypted number of times the content item is reproduced, namely, "plainData" (assign-target variable). For simplification, the decryption process here refers to a process "plainData=encryptedData^0x00FF", that is, a process of performing an exclusive OR between the encrypted number of times the content item is reproduced and confidential information "0x00FF". It is to be noted that "0x" at the beginning of "0x00FF" indicates that "00FF" is a hexadecimal number.

Here, each of "plainData" and "encryptedData" is a 16-bit value that takes a value in a range of "0x0000 to 0xFFFF". Further, it is assumed that when the most significant bit of plainData, when represented in a binary value, is 1, "plainData" indicates a negative number. Thus, values in a range of "0x8000 to 0xFFFF" are negative numbers.

As FIG. 5B shows, the second process instruction group 150 is an instruction group which includes a process of receiving compressed content data, namely, "compressedData", and decompressing the same for outputting the resulting content data, that is, "decompressedData". For simplification, the decompression process here refers to a process of outputting a binary value having 1 which appears in succession as many times as the number of values of the compressed content data "compressedData". As FIG. 5B shows, this process is represented as an instruction group "for(counter=0; counter<compressedData;counter++){(decompressedData=decompressedData<<1)|0x0001;}".

It is assumed here that "compressedData" takes a value in a range of 0 to 31, and "decompressedData" takes a 32-bit value. When "compressedData" is "0", "de compressedData"

is "0x00000000", and when "compressedData" is "1", it is "0x00000001". Further, when "compressedData" is "31", it is "0xFFFFFFFF".

As FIG. 5C shows, the output process instruction group 160 is a process instruction group for performing the same decompression process as that of the second process instruction group 150. The output process instruction group 160 is an instruction group generated through obfuscation of the second process instruction group 150 by the tampering-prevention-process generation apparatus 110. A detailed description of the tampering-prevention-process generation apparatus 110 shall be provided later.

The instruction group "encryptedData=0xF022;", which is the referenced-variable-value-assigning-process instruction group 310, is a process of assigning a value to an argument for calling the first process instruction group 140, and indicates a process of assigning a value "0xF022" to the referenced variable "encryptedData".

The instruction group "plainData=decrypt(encryptedData);", namely, the branch process instruction group 320, indicates a process for calling the first process instruction group 140 with the referenced variable "encryptedData" serving as an argument, and causes the process result of the first process instruction group 140 to be stored in the assign-target variable "plainData". The assumed value for a return value, which is to be obtained through a normal execution of the branch process instruction group 320 by the execution processing apparatus 130, becomes "0xF022^0x00FF=0xF0DD", which is the process result of the first process instruction group 140 performed with the value "0xF022" assigned to the referenced variable "encryptedData".

The dependent process instruction group 330 indicates a process for performing a process equivalent to the second process instruction group 150. However, unlike the second process instruction group 150, this process includes a process that employs "plainData", which is the process result of the first process instruction group 140.

More specifically, the dependent process instruction group 330 is represented as "for(counter=0; counter<compressedData;counter++){decompressedData=(decompressedData<<1)|(plain Data-0xF0DC);}".

In the above process, when the value of "plainData" is the above mentioned assumed value "0xF0DD", "(plainData-0xF0DC)" becomes the value "0x001". This is the same as the corresponding value in the second process instruction group 150, and thus when "plainData" equals the assumed value, the dependent process instruction group 330 causes execution of a process equivalent to the second process instruction group 150. When the value of "plainData" is different from the assumed value, the value of "(plainData-0xF0DC)" becomes different from "0x001", and thus the process equivalent to the second process instruction group 150 will not be executed.

(1.5) Advantageous Effects of the Output Process Instruction Group 160

The output process instruction group 160 according to Embodiment 1 includes the referenced-variable-value-assigning-process instruction group 310 for setting values to various parameters necessary for executing the first process instruction group 140, the branch process instruction group 320 for calling the first process instruction group 140, and the dependent process instruction group 330 executed after the first process instruction group 140 is called. Here, although the second process instruction group 150, on which no conversion is performed by the tampering-prevention-process generation apparatus 110, does not call the first process instruction group 140, the output process instruction group 160, which is an instruction group resulted from a conversion, is added with a process for calling the first process instruction group 140.

With such a structure, when the execution processing apparatus 130 executes the output process instruction group 160, the first process instruction group 140 (decryption process in the above embodiment) which is inherently unnecessary for the process to be achieved by the output process instruction group 160 (decompression process in the above embodiment) is also executed. As a result, it becomes difficult to analyze whether the first process instruction group 140 is a function necessary for a single process or plural processes. To be more specific in the above example, the first process instruction group is necessary for the decryption, and inherently unnecessary for the decompression. However, in the output process instruction group 160, the first process instruction group 140 is necessary for both the decryption and decompression. Thus, it becomes possible to create a difficulty in analytic operations performed by unauthorized analyzers who attempt to analyze confidential information contained in the decryption process by analyzing a process necessary only for the decryption.

Further, when executing the output process instruction group 160, the execution processing apparatus 130 also executes the first process instruction group 140. Therefore, there are more processes that the unauthorized analyzers, who attempt to analyze the output process instruction group 160, need to analyze, compared to the second process instruction group 150. Obfuscation has conventionally been put into practice for adding a process to the original process so that the unauthorized analyzers need to analyze an increased number of processes. However, this has in turn resulted in an increase in the program size due to the process added. In contrast, the output process instruction group 160 is only added with an instruction group for calling the first process instruction group 140 used by the execution processing apparatus 130 for another purpose. Thus, it is possible to increase the number of processes that the unauthorized analyzers need to analyze while causing almost no increase in the program size.

Note that while it is not particularly mentioned in detail as is not the essence of the invention, the first process instruction group 140 for executing the decryption process according to Embodiment 1 is obviously a process also called by an instruction group other than the second process instruction group 150 that causes the execution of the decompression process (rather, it is originally a process to be called by an instruction group other than the second process instruction group 150). Here, the instruction group which is assumed to call the first process instruction group 140 may be an instruction group included in the same program as the first process instruction group 140. Further, in the case where the first process instruction group 140 is a library or the like, it may be called by a different program. Furthermore, the first process instruction group 140 and the second process instruction group 150 may be included in the same program. In the case where the first process instruction group 140 is a library or the like as stated above, they may be included in different programs. In the case where the first process instruction group 140 and the second process instruction group 150 are included in the same program, the program desirably causes execution of some kind of processes using the first process instruction group 140, in order to avoid an increase in the program size as described above.

Further, in the case where the first process instruction group 140 and the second process instruction group 150 are included in the same program, inputting the program allows input of both of the process instruction groups at one time.

Furthermore, in this case, further provision of a program output unit and the like that outputs the output process instruction group 160 as replacement of the second process instruction group 150 included in the program enables obfuscation of the input program to generate a program having the above described features.

Furthermore, the dependent process instruction group 330 of the output process instruction group 160 is an instruction group for executing a process dependent on a process result of the first process instruction group 140. Therefore, when an unauthorized analyzer tampers with the first process instruction group 140, the process of the output process instruction group 160 produces a result different from a normal result. To be more specific, for example, when the unauthorized analyzer tampers with the first process instruction group 140 shown in FIG. 5A which is an instruction group for outputting the number of times a content item can be reproduced, and the unauthorized analyzer alters the first process instruction group 140 to be "int decrypt(int encryptedData){return 100;}", the value of "plainData" in the dependent process instruction group 330 becomes 100, which is different from "0xF0DD". Consequently, even when the output process instruction group 160 is executed, the output thereof will be a value different from the one to be obtained from the normal decompression process. As a result, the unauthorized analyzer who has tampered with the first process instruction group 140 becomes incapable of correctly reproducing the content item unless he or she additionally tampers with the output process instruction group 160. As described, in the case where the first process instruction group 140 and the second process instruction group 150 are structural elements of a significant function such as content reproduction and so on, tampering with a portion of the structural elements results in an improper behavior of another. Thus, it becomes difficult for the unauthorized analyzer to tamper with the function in the way he or she desires.

(2) Structure of the Tampering-Prevention-Process Generation Apparatus 110

Now, the tampering-prevention-process generation apparatus 110 shall be described. The tampering-prevention-process generation apparatus 110 is an apparatus that converts the second process instruction group 150 into the above described output process instruction group 160.

Figure 6:
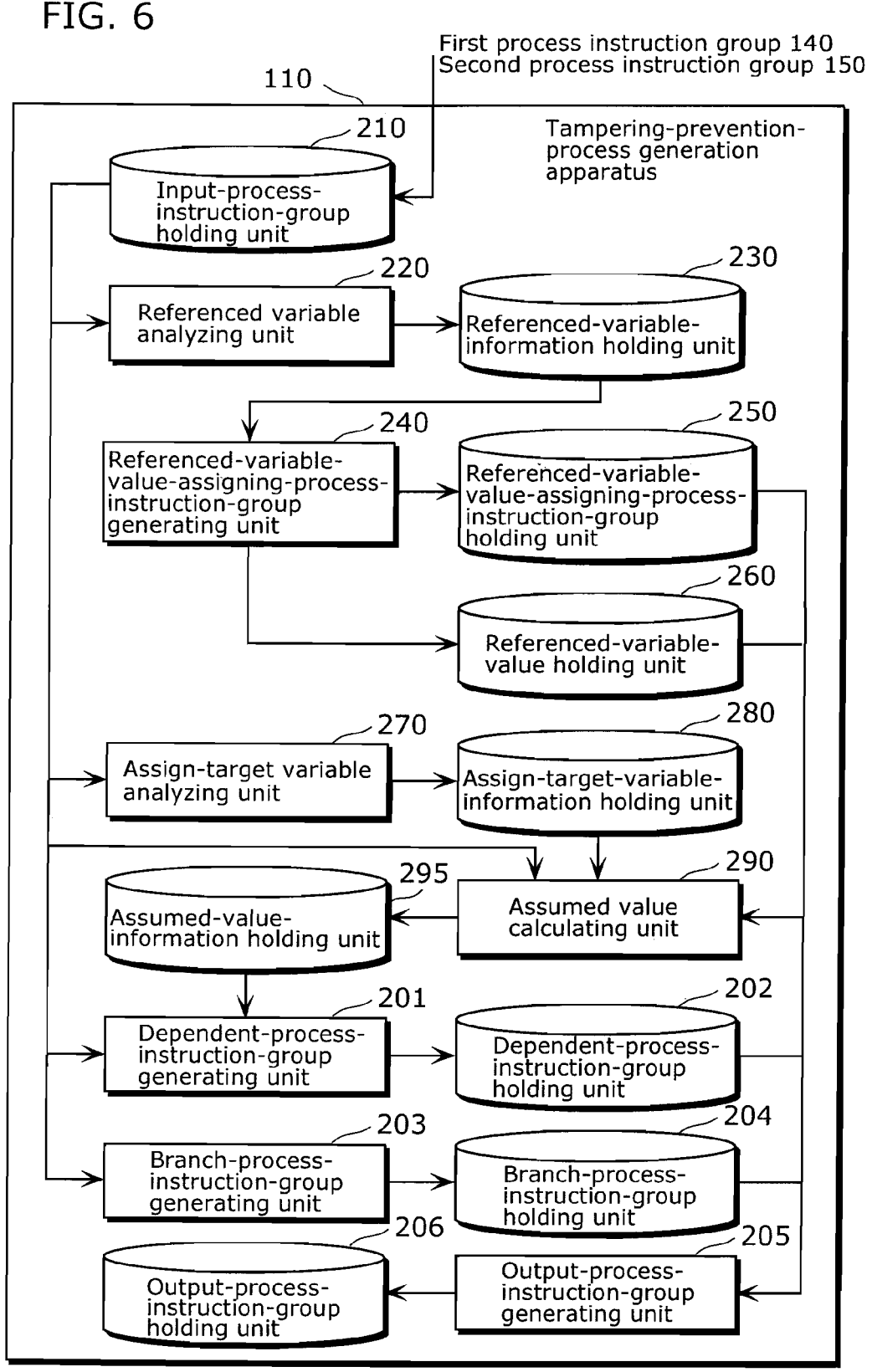
FIG. 6 is a diagram showing the structure of a tampering-prevention-process generation apparatus according to Embodiment 1 of the present invention.

FIG. 6 is a diagram showing a structure of the tampering-prevention-process generation apparatus 110.

The tampering-prevention-process generation apparatus 110 includes an input-process-instruction-group holding unit 210, a referenced variable analyzing unit 220, a referenced-variable-information holding unit 230, a referenced-variable-value-assigning-process-instruction-group generating unit 240, a referenced-variable-value-assigning-process-instruction-group holding unit 250, a referenced-variable-value holding unit 260, an assign-target variable analyzing unit 270, an assign-target-variable-information holding unit 280, an assumed-value-information holding unit 295, an assumed value calculating unit 290, a dependent-process-instruction-group generating unit 201, a dependent-process-instruction-group holding unit 202, a branch-process-instruction-group generating unit 203, a branch-process-instruction-group holding unit 204, an output-process-instruction-group generating unit 205, and an output-process-instruction-group holding unit 206.

The input-process-instruction-group holding unit 210 obtains the first process instruction group 140 and the second process instruction group 150, and holds each of the obtained instruction groups.

The referenced variable analyzing unit 220 analyzes which variable serves as an argument, for example, for which a value needs to be set for execution of the first process instruction group 140 (referenced variable).

The referenced-variable-information holding unit 230 holds information such as the name and so on of the referenced variable identified through the analysis by the referenced variable analyzing unit 220.

The referenced-variable-value-assigning-process-instruction-group generating unit 240 generates a referenced-variable-value-assigning-process instruction group 310 for assigning a value to the referenced variable.

The referenced-variable-value-assigning-process-instruction-group holding unit 250 holds the referenced-variable-value-assigning-process instruction group 310 generated by the referenced-variable-value-assigning-process-instruction-group generating unit 240.

The referenced-variable-value holding unit 260 holds the value to be assigned to the referenced variable through the referenced-variable-value-assigning-process instruction group 310.

The assign-target variable analyzing unit 270 analyzes which variable is to be assigned with a process result of the first process instruction group 140 (assign-target variable).

The assign-target-variable-information holding unit 280 holds information such as the name of the assign-target variable identified through the analysis by the assign-target variable analyzing unit 270.

The assumed value calculating unit 290 calculates an assumed value of the assign-target variable through execution of the first process instruction group 140 with the value held by the referenced-variable-value holding unit 260 assigned as the value of the referenced variable.

The assumed-value-information holding unit 295 holds the assumed value calculated by the assumed value calculating unit 290.

The dependent-process-instruction-group generating unit 201 generates a dependent process instruction group 330 based on the second process instruction group 150 and the assumed value.

The dependent-process-instruction-group holding unit 202 holds the dependent process instruction group 330 generated by the dependent-process-instruction-group generating unit 201.

The branch-process-instruction-group generating unit 203 generates a branch process instruction group 320 for calling the first process instruction group 140 held by the input-process-instruction-group holding unit 210.

The branch-process-instruction-group holding unit 204 holds the branch process instruction group 320 generated by the branch-process-instruction-group generating unit 203.

The output-process-instruction-group generating unit 205 generates an output process instruction group 160 which includes the referenced-variable-value-assigning-process instruction group 310 held by the referenced-variable-value-assigning-process-instruction-group holding unit 250, the branch process instruction group 320 held by the branch-process-instruction-group holding unit 204, and the dependent process instruction group 330 held by the dependent-process-instruction-group holding unit 202.

The output-process-instruction-group holding unit 206 holds the output process instruction group 160 generated by the output process instruction group.

Hereinafter, each of the structural elements set forth above shall be described in detail. The following description covers a specific example of operations performed by each of the structural elements when the first process instruction group 140 shown in FIG. 5A is received, as well as the functions thereof.

(2.1) Input-Process-Instruction-Group Holding Unit 210

The input-process-instruction-group holding unit 210 receives the input of the first process instruction group 140 and the second process instruction group 150 from outside. In other words, the input-process-instruction-group holding unit 210 obtains the first process instruction group 140 and the second process instruction group 150. Further, the input-process-instruction-group holding unit 210 has a region for storing one or more process instruction groups. The input-process-instruction-group holding unit 210 holds the first process instruction group 140 and the second process instruction group 150 received by the tampering-prevention-process generation apparatus 110. Obviously, the unit for receiving the inputs and the unit for holding the received instruction groups may be provided separately.

(2.2) Referenced Variable Analyzing Unit 220

The referenced variable analyzing unit 220 analyzes (identifies) a parameter necessary for execution of the first process instruction group 140 held by the input-process-instruction-group holding unit 210, and stores the analyzed (identified) information in the referenced-variable-information holding unit 230.

More specifically, when the first process instruction group 140 is a function, for example, the referenced variable analyzing unit 220 identifies the type, name, and/or number of an argument assigned to the function. Further, when the first process instruction group 140 is an instruction group that includes a process for referring to an external variable, for example, the referenced variable analyzing unit 220 identifies the name and/or type of the external variable. Further, when the first process instruction group 140 is an instruction group that includes a process for referring to a value stored on a stack, for example, the referenced variable analyzing unit 220 identifies the size of the stack referred to. Furthermore, when the first process instruction group 140 is an instruction group that includes a process for referring to a value stored at a location designated by an address variable, for example, the referenced variable analyzing unit 220 identifies the address variable and/or the type of the stored value. In the following description, the pieces of the identified information (analyzed information), that is, the pieces of information related to the parameters necessary for the execution of the first process instruction group 140 are collectively referred to as "referenced variable information".

A specific example is that in the case where the first process instruction group 140 shown in FIG. 5A is received, the referenced variable analyzing unit 220 identifies (analyzes) the name and type "int encryptedData" of an argument assigned to a function, and stores the same in the referenced-variable-information holding unit 230. Here, the name of the argument is "encryptedData" and the type is "int".

(2.3) Referenced-Variable-Information Holding Unit 230

The referenced-variable-information holding unit 230 has a region for storing the referenced variable information.

The referenced-variable-information holding unit 230 stores the referenced variable information for the first process instruction group 140 identified by the referenced variable analyzing unit 220.

More specifically, in the case where the referenced variable analyzing unit 220 analyzes the first process instruction group 140 shown in FIG. 5A, the referenced-variable-information holding unit 230 stores the name and type "int encryptedData" of the argument assigned to the function.

(2.4) Referenced-Variable-Value-Assigning-Process-Instruction-Group Generating Unit 240

The referenced-variable-value-assigning-process-instruction-group generating unit 240 generates a referenced-variable-value-assigning-process instruction group 310 which is a process instruction group for setting a value to a parameter necessary for execution of the first process instruction group 140, and writes the generated process instruction group in the referenced-variable-value-assigning-process-instruction-group holding unit 250. Further, the referenced-variable-value-assigning-process-instruction-group generating unit 240 writes in the referenced-variable-value holding unit 260 the value to be set to the parameter.

To be more specific, for example, the referenced-variable-value-assigning-process-instruction-group generating unit 240 obtains a variable name held by the referenced-variable-information holding unit 230. Next, the referenced-variable-value-assigning-process-instruction-group generating unit 240 determines a value to be assigned to the variable indicated by the obtained variable name. Then, the referenced-variable-value-assigning-process-instruction-group generating unit 240 writes in the referenced-variable-value holding unit 260 a set of the obtained variable name and the determined value. In addition, the referenced-variable-value-assigning-process-instruction-group generating unit 240 generates a process (the referenced-variable-value-assigning-process instruction group 310) for assigning to the variable the value determined in advance, and writes the generated process in the referenced-variable-value-assigning-process-instruction-group holding unit 250.

More specifically, in the case where the referenced-variable-information holding unit 230 performs the process described in the specific example set forth in (2.3), the referenced-variable-value-assigning-process-instruction-group generating unit 240 obtains the referenced variable information "int encryptedData" held by the referenced-variable-information holding unit 230. Next, the referenced-variable-value-assigning-process-instruction-group generating unit 240 randomly determines an int-type constant value to be assigned to "encryptedData". Here, it is assumed that the referenced-variable-value-assigning-process-instruction-group generating unit 240 determines "0xF022" as the constant value. Next, the referenced-variable-value-assigning-process-instruction-group generating unit 240 writes a set of the determined variable name and value, i.e. "int encryptedData=0xF022" in the referenced-variable-value holding unit 260. Further, the referenced-variable-value-assigning-process-instruction-group generating unit 240 writes "encryptedData=0xF022" in the referenced-variable-value-assigning-process-instruction-group holding unit 250 as the referenced-variable-value-assigning-process instruction group 310.

(2.5) Referenced-Variable-Value-Assigning-Process-Instruction-Group Holding Unit 250

The referenced-variable-value-assigning-process-instruction-group holding unit 250 has a region for storing one or more process instructions. The referenced-variable-value-assigning-process-instruction-group holding unit 250 stores in the storing region the referenced-variable-value-assigning-process instruction group 310 generated by the referenced-variable-value-assigning-process-instruction-group generating unit 240. In the case where more than one process instruction is generated by the referenced-variable-value-assigning-process-instruction-group generating unit 240, plural process instructions are stored.

More specifically, in the case where the referenced-variable-value-assigning-process-instruction-group generating unit 240 performs the process described in the specific example set forth in (2.4), "encryptedData=0xF022;" is stored.

(2.6) Referenced-Variable-Value Holding Unit 260

The referenced-variable-value holding unit 260 has a region for storing a value to be set to a parameter (referenced variable) necessary for execution of the first process instruction group 140.

Specifically, for example, the referenced-variable-value holding unit 260 has a region for storing more than one set of a variable name and a value, and stores sets of a variable name determined by the referenced-variable-value-assigning-process-instruction-group generating unit 240 and a value to be assigned to a variable corresponding to the variable name.

More specifically, in the case where the referenced-variable-value-assigning-process-instruction-group generating unit 240 performs the process described in the specific example set forth in (2.4), the referenced-variable-value holding unit 260 stores the set of the variable "encryptedData" and the value "0xF022".

(2.7) Assign-Target Variable Analyzing Unit 270

The assign-target variable analyzing unit 270 analyzes (identifies) a storing location at which a process result of the first process instruction group 140 held by the input-process-instruction-group holding unit 210 is to be stored.

More specifically, when the first process instruction group 140 is a function, for example, the assign-target variable analyzing unit 270 identifies the variable name and/or type of a return value of the function. Further, when the first process instruction group 140 is a process for determining a value for an external variable, for example, the assign-target variable analyzing unit 270 identifies the variable name and/or type of the external variable. Furthermore, when the first process instruction group 140 is an instruction group which includes a process for storing a value on a stack, for example, the assign-target variable analyzing unit 270 identifies the stack size and a location in the stack (stack pointer). Further, when the first process instruction group 140 is an instruction group which includes a process for storing a value at a location designated by an address variable, for example, the assign-target variable analyzing unit 270 identifies the address at which the value is to be stored. In the following description, such identified pieces of information, that is, the pieces of information about a storing location at which a process result of the first process instruction group 140 is to be stored are collectively referred to as "assign-target variable information". It is to be noted that when a stack or the like is embodied as a function of an OS (Operating System), a stack pointer and the stack size may not be explicitly shown in the program, but such values are also referred to as the assign-target variable information.

Next, the assign-target variable analyzing unit 270 stores in the assign-target-variable-information holding unit 280 the assign-target variable information which has been analyzed (identified).

More specifically, when the analysis is to be performed on the first process instruction group 140 shown in FIG. 5A, the assign-target variable analyzing unit 270 identifies the name and type "int plainData" of the variable which is to store a return value of the function, and stores "int plainData" in the assign-target-variable-information holding unit 280.

(2.8) Assign-Target-Variable-Information Holding Unit 280

The assign-target-variable-information holding unit 280 stores the assign-target variable information for the first process instruction group 140 identified by the assign-target variable analyzing unit 270.

When there are plural variables (assign-target variables) whose values are to be determined through the first process instruction group 140, the variable names and so on (assign-target variable information) of one or more of the plural variables are stored. Knowing at least one assign-target variable enables implementation of the present invention, and thus even when plural assign-target variables are identified, it is unnecessary to store the variable names and so on of all of the plural assign-target variables. The assign-target-variable-information holding unit 280 or the assign-target variable analyzing unit 270 may determine for which of the assign-target variables the assign-target variable information should be stored. Further, the determination on for which of the assign-target variables the assign-target variable information should be stored may be performed in any manner. The first assign-target variable to be found may be chosen, or one among all the assign-target variables found may be randomly chosen.

More specifically, when the assign-target variable analyzing unit 270 performs the analysis on the first process instruction group 140 shown in FIG. 5A, the assign-target-variable-information holding unit 280 stores the name and type "int plainData" of the variable which is to store a return value of the function.

(2.9) Assumed Value Calculating Unit 290

The assumed value calculating unit 290 calculates an assumed value to be assigned to an assign-target variable when the first process instruction group 140 is executed using a value of a referenced variable held by the referenced-variable-value holding unit 260.

More specifically, the assumed value calculating unit 290 performs the following processes A) to E).

A) The assumed value calculating unit 290 reads assign-target variable information from the assign-target-variable-information holding unit 280.

B) The assumed value calculating unit 290 reads a name of a referenced variable and a value from the referenced-variable-value holding unit 260.

C) The assumed value calculating unit 290 assigns the read value to the referenced variable, and executes the first process instruction group 140 held by the input-process-instruction-group holding unit 210.

D) The assumed value calculating unit 290 refers to the value of the assign-target variable after the execution of the first process instruction group 140.

E) The assumed value calculating unit 290 writes in the assumed-value-information holding unit 295 a set of the assign-target-variable name and the assign-target-variable value which was referred to.

It is to be noted that when plural pieces of assign-target variable information are held by the assign-target-variable-information holding unit 280, the assumed value calculating unit 290 writes in the assumed-value-information holding unit 295 plural sets of a name of a variable and its value contained in the pieces of assign-target variable information.

More specifically, in the case where the referenced-variable-value holding unit 260 performs the process described in the specific example set forth in (2.6), the assumed value calculating unit 290 performs the following processes A) to E).

A) The assumed value calculating unit 290 reads the assign-target variable information "int plainData" held by the assign-target-variable-information holding unit 280.

B) The assumed value calculating unit 290 reads "int encryptedData=0xF022" from the referenced-variable-value holding unit 260. Here, the referenced-variable name is "encryptedData" and the value is "0xF022".

C) The assumed value calculating unit 290 executes "decrypt(0xF022);". To be more specific, a calculation is performed after assigning the value "0xF022" to "encryptedData" of "decrypt(encryptedData)".

D) The assumed value calculating unit 290 calculates the value of the assign-target variable "plainData" which is obtained as a result of the execution of "decrypt(0xF022);". Here, the assumed value calculating unit 290 calculates "0xF022^0x00FF=0xF0DD".

E) The assumed value calculating unit 290 stores "int plainData=0xF0DD" in the assumed-value-information holding unit 295. Here, the assign-target-variable name is "plainData" and the value is "0xF0DD".

(2.10) Assumed-Value-Information Holding Unit 295

The assumed-value-information holding unit 295 has a region for storing assumed value information. The assumed value information is, for example, the name of a variable which is to hold an assumed value, and the assumed value.

Specifically, the assumed-value-information holding unit 295 holds, as the above mentioned assumed value information, an assumed value calculated by the assumed value calculating unit 290 and the name of the variable which is to hold the assumed value.

More specifically, in the case where the assumed value calculating unit 290 performs the process described in the specific example set forth in (2.9), the assumed-value-information holding unit 295 holds "int plainData=0xF0DD". Here, the assumed value is "0xF0DD", and the variable name is "plainData".

(2.11) Dependent-Process-Instruction-Group Generating Unit 201

The dependent-process-instruction-group generating unit 201 generates a dependent process instruction group 330 based on the assumed value held by the assumed-value-information holding unit 295 and the second process instruction group 150 held by the input-process-instruction-group holding unit 210.

The dependent process instruction group 330 is a process instruction group for performing a process equivalent to the second process instruction group 150, and includes a process of referring to a process result of the first process instruction group 140. The result referred to is used for a part of the process of the dependent process instruction group 330.

The dependent-process-instruction-group generating unit 201 specifically performs the following processes A) to F), for example.

A) The dependent-process-instruction-group generating unit 201 finds a constant number contained in a process instruction included in the second process instruction group 150. Hereinafter, the process instruction containing the constant number is referred to as Or1 and the value of the constant number is referred to as Va1.

B) The dependent-process-instruction-group generating unit 201 reads the assumed value information held by the assumed-value-information holding unit 295. Hereinafter, the variable which is to hold an assumed value indicated in the assumed value information is referred to as Vr1 and the assumed value is referred to as Va2.

(C) The dependent-process-instruction-group generating unit 201 calculates Va3=Va2-Va1. Here, Va1=Va2-Va3.

D) The dependent-process-instruction-group generating unit 201 generates a process instruction Or2 for calculating the value Va1 contained in the process instruction Or1 by subtracting the value Va3 from the variable Vr1 (the variable which is to hold the value Va2). In other words, Or2 equals "(Vr1-Va3)".

E) The dependent-process-instruction-group generating unit 201 generates a dependent process instruction group 330, which is an instruction group generated by replacing the process instruction Or1 in the second process instruction group 150 with the process instruction Or2.

Given that the value of the variable Vr1 is the assumed value Va2, such replacement causes the value of "Vr1-Va3" to be "Va2-Va3=Va1". That is to say, even when the above replacement is performed for the value Va1 contained in the process instruction Or1, the process instruction Or2 can produce a result identical to the result that would have been produced prior to the replacement as long as a correct value is assigned to Vr1.

To be more specific, in the case where the assumed-value-information holding unit 295 performs the process described in (2.10), the dependent-process-instruction-group generating unit 201 performs the following processes A) to E).

A) The dependent-process-instruction-group generating unit 201 sets "decompressedData=(decompressedData<<1)|0x0001;" as the process instruction Or1, and sets "0x0001" as the value Va1.

B) The dependent-process-instruction-group generating unit 201 reads "int plainData=0xF0DD" from the assumed-value-information holding unit 295. Here, the dependent-process-instruction-group generating unit 201 sets "plainData" as the variable Vr1, and "0xF0DD" as the value Va2.

C) The dependent-process-instruction-group generating unit 201 calculates the value Va3, that is, "0xF0DD-0x0001=0xF0DC".

D) The dependent-process-instruction-group generating unit 201 generates the process instruction Or2 "decompressedData=(decompressedData<<1)|(plainData-0xF0DC);".

E) The dependent-process-instruction-group generating unit 201 generates a dependent process instruction group 330, which is an instruction group generated by replacing the process instruction Or1 in the second process instruction group 150 with the process instruction Or2. It is to be noted that the programs in the present embodiment are assumed to be in the C language, and thus, as well as the above described processes, a function declaration and/or a variable declaration need to be added in order for the dependent process instruction group 330 to operate appropriately as a C language program.

In the above described manner, the same instruction group as the dependent process instruction group 330 shown in FIG. 5C is generated.

It is to be noted that although the computation "Va3=Va2-Va1" is performed in the above C), it may be a computation or a process using a different calculation formula. To be more specific, it may be a computation such as an exclusive OR and an addition, or a computation using a function and the like for performing a more complicated conversion. In such a case, it is sufficient to modify the calculation formula or process so as to generate a calculation formula or a process for calculating Va2, and replace Va2 with the generated calculation formula or process. That is to say, it is sufficient to calculate Va3 by performing a computation or a process using Va1 and Va2, generate an instruction group for performing a computation or a process for back-calculating Va2 from Va1 and the calculated Va3, and replace Va2 with the generated instruction group.

(2.12) Dependent-Process-Instruction-Group Holding Unit 202

The dependent-process-instruction-group holding unit 202 has a region for storing one or more process instructions. The dependent-process-instruction-group holding unit 202 stores in the storing region the dependent process instruction group 330 generated by the dependent-process-instruction-group generating unit 201.

More specifically, in the case where the dependent-process-instruction-group generating unit 201 performs the process described in (2.11), the dependent-process-instruction-group holding unit 202 stores the dependent process instruction group 330 shown in FIG. 5C.

(2.13) Branch-Process-Instruction-Group Generating Unit 203

The branch-process-instruction-group generating unit 203 generates a branch process instruction group 320 for calling the first process instruction group 140 held by the input-process-instruction-group holding unit 210.

Specifically, when the first process instruction group 140 is a function, for example, the branch-process-instruction-group generating unit 203 generates a function call instruction. Further, when the first process instruction group 140 is a subroutine, the branch-process-instruction-group generating unit 203 generates a subroutine call instruction. Furthermore, when the first process instruction group 140 is an exception handling, the branch-process-instruction-group generating unit 203 generates a process instruction for generating an exception.

More specifically, in the case where the input-process-instruction-group holding unit 210 performs the process described in (2.1), the branch-process-instruction-group generating unit 203 generates a function call instruction "plainData=decrypt(encryptedData);" as the branch process instruction group 320.

(2.14) Branch-Process-Instruction-Group Holding Unit 204

The branch-process-instruction-group holding unit 204 has a region for storing one or more process instructions. The branch-process-instruction-group holding unit 204 stores in the storing region the branch process instruction group 320 generated by the branch-process-instruction-group generating unit 203.

More specifically, in the case where the branch-process-instruction-group generating unit 203 performs the process described in (2.13), the branch-process-instruction-group holding unit 204 stores "plainData=decrypt(encryptedData);".

(2.15) Output-Process-Instruction-Group Generating Unit 205

The output-process-instruction-group generating unit 205 generates an output process instruction group 160 which includes the referenced-variable-value-assigning-process instruction group 310 held by the referenced-variable-value-assigning-process-instruction-group holding unit 250, the branch process instruction group 320 held by the branch-process-instruction-group holding unit 204, and the dependent process instruction group 330 held by the dependent-process-instruction-group holding unit 202.

More specifically, in the case where the processes up to (2.14) are performed, the output-process-instruction-group generating unit 205 generates the output process instruction group 160 shown in FIG. 5C.

(2.16) Output-Process-Instruction-Group Holding Unit 206

The output-process-instruction-group holding unit 206 has a region for storing one or more process instruction groups. The output-process-instruction-group holding unit 206 stores the output process instruction group 160 generated by the output-process-instruction-group generating unit 205.

Specifically, in the case where the output-process-instruction-group generating unit 205 performs the process described in (2.15), the output-process-instruction-group holding unit 206 stores the output process instruction group 160 shown in FIG. 5C.

(2.17) Operations of the Tampering-Prevention-Process Generation Apparatus 110

Figure 7:
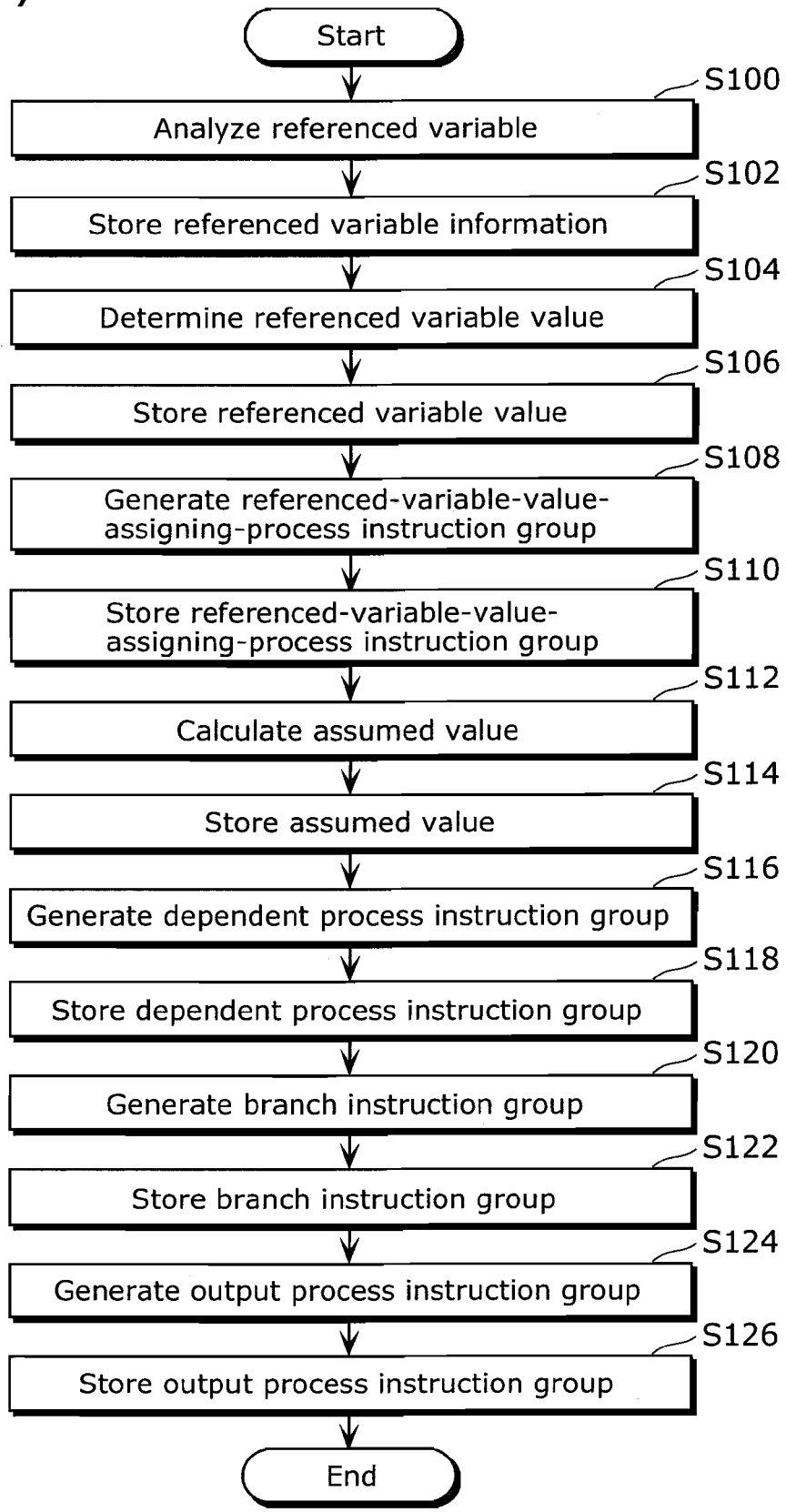
FIG. 7 is a flow chart showing operations of a tampering-prevention-process generation apparatus according to Embodiment 1 of the present invention.

With reference to FIG. 7, operations of the tampering-prevention-process generation apparatus 110 shall be described.

FIG. 7 is a flow chart showing operations of the tampering-prevention-process generation apparatus 110.

The referenced variable analyzing unit 220 analyzes (identifies) referenced variable information which relates to a referenced variable for storing a parameter necessary for the execution of the first process instruction group 140 held by the input-process-instruction-group holding unit 210 (Step S100).

The referenced variable analyzing unit 220 stores the identified (analyzed) referenced variable information in the referenced-variable-information holding unit 230 (Step S102).

The referenced-variable-value-assigning-process-instruction-group generating unit 240 determines a value to be stored in the referenced variable identified (analyzed) in Step S100 (Step S104).

The referenced-variable-value-assigning-process-instruction-group generating unit 240 stores in the referenced-variable-value holding unit 260 the value determined to be stored in the referenced is variable in Step S104, and the name of the referenced variable (Step S106).

The referenced-variable-value-assigning-process-instruction-group generating unit 240 generates a referenced-variable-value-assigning-process instruction group 310 which is a process instruction group for storing the value determined in Step S104 in the referenced variable (Step S108).

The referenced-variable-value-assigning-process-instruction-group generating unit 240 stores in the referenced-variable-value-assigning-process-instruction-group holding unit 250 the referenced-variable-value-assigning-process instruction group 310 generated in Step S108 (Step S110).

The assumed value calculating unit 290 calculates an assumed value to be taken by an assign-target variable when the first process instruction group 140 is executed using the referenced-variable value held by the referenced-variable-value holding unit 260 (Step S112). It is assumed here that the assign-target variable analyzing unit 270 analyzes the assign-target variable and stores the analysis result in the assign-target-variable-information holding unit 280 prior to Step S112. Therefore, in Step S112, the assumed value calculating unit 290 obtains information regarding the assign-target variable from the assign-target-variable-information holding unit 280 to calculate an assumed value.

The assumed value calculating unit 290 stores in the assumed-value-information holding unit the assumed value calculated, and the name of the assign-target variable (Step S114).

The dependent-process-instruction-group generating unit 201 generates a dependent process instruction group 330 based on the assumed value held by the assumed-value-information holding unit 295 and the second process instruction group 150 held by the input-process-instruction-group holding unit 210 (Step S116).

The dependent-process-instruction-group generating unit 201 stores the generated dependent process instruction group 330 in the dependent-process-instruction-group holding unit 202 (Step S118).

The branch-process-instruction-group generating unit 203 generates a branch process instruction group 320 for calling the first process instruction group 140 held by the input-process-instruction-group holding unit 210 (Step S120).

The branch-process-instruction-group generating unit 203 stores the generated branch process instruction group 320 in the branch-process-instruction-group holding unit 204 (Step S122).

The output-process-instruction-group generating unit 205 generates an output process instruction group 160 which includes the referenced-variable-value-assigning-process instruction group 310 held by the referenced-variable-value-assigning-process-instruction-group holding unit 250, the branch process instruction group 320 held by the branch-process-instruction-group holding unit 204, and the dependent process instruction group 330 held by the dependent-process-instruction-group holding unit 202 (Step S124).

The output-process-instruction-group generating unit 205 stores the generated output process instruction group 160 in the output-process-instruction-group holding unit 206 (Step S126).

(2.18) Advantageous Effects of the Tampering-Prevention-Process Generation Apparatus 110

The tampering-prevention-process generation apparatus 110 is capable of generating the output process instruction group 160, which produces the advantageous effects mentioned in (1.5), from the first process instruction group 140 and the second process instruction group 150 which have been provided as inputs.

Figure 8:
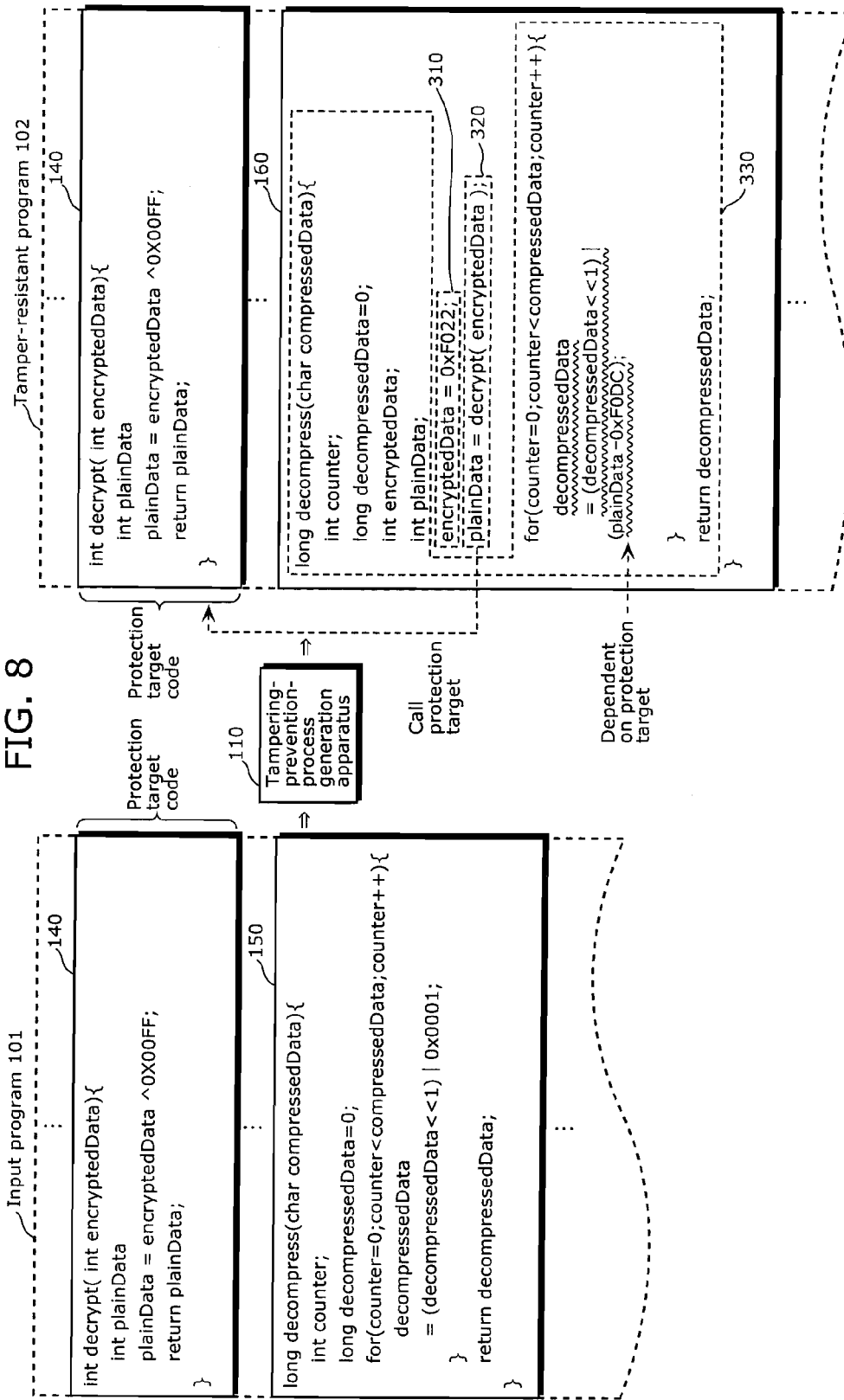
FIG. 8 is a diagram for describing advantageous effects produced by a tampering-prevention-process generation apparatus according to Embodiment 1 of the present invention.

FIG. 8 is a diagram for describing advantageous effects produced by the tampering-prevention-process generation apparatus 110.

The tampering-prevention-process generation apparatus 110, for example, obtains an input program (original program) 101 which includes the first process instruction group 140 and the second process instruction group 150, converts the input program 101 into a tamper-resistant program 102, and outputs the tamper-resistant program 102. In doing so, the tampering-prevention-process generation apparatus 110 converts the second process instruction group 150 included in the input program 101 into the output process instruction group 160 as described above.

To be more specific, the tampering-prevention-process generation apparatus 110 generates a tampering prevention process by adding to the second process instruction group 150 a process for calling the first process instruction group 140 that is a protection target code, and making the decompression process of the second process instruction group 150 dependent on a process result of the first process instruction group 140 (dependent process).

In the process for calling the protection target code (the first process instruction group 140), the protection target code is called in a state where the value "0x0022" is assigned to the referenced variable "encryptedData" of the protection target code through the referenced-variable-value-assigning-process instruction group 310.

As a result, the tamper-resistant program 102 makes it difficult for unauthorized analyzers to find a tampering prevention process, because the protection target code is not read as data, unlike in the conventional technique.

Further, in the dependent process, the decompression process "decompressedData=(decompressed Data<<1)|(plainData−0xF0DC" of the dependent process instruction group 330 is dependent on the value of "plainData" which is a result of the execution of the protection target code called through the above mentioned calling process (the process result of the first process instruction group 140). In other words, if the protection target code is not tampered with, the value of "plainData" equals the assumed value "0xF0DD", which means that when the output process instruction group 160 contained in the tamper-resistant program 102 is executed, the decompression process "decompressedData=(decompressedData<<1) 0x0001" of the second process instruction group 150 will be executed correctly.

On the other hand, if the protection target code is tampered with, the value of "plainData" becomes different from the assumed value "0xF0DD", which means that when the output process instruction group 160 contained in the tamper-resistant program 102 is executed, a process different from the decompression process of the second process instruction group 150 will be executed. In other words, the process of the input program 101 included in the tamper-resistant program 102 will not be executed correctly.

As a result, the tamper-resistant program 102 makes it further difficult for unauthorized analyzers to find the tampering prevention process because of the absence of the judgment/termination process, unlike in the conventional technique. In the case where the program includes the judgment/termination process, the unauthorized analyzers would execute the program for a number of times to collect logs from each execution so that based on a difference in logs between the executions, the unauthorized analyzers can easily find the judgment/termination process, that is, the tampering prevention process having the judgment/termination process.

With the tamper-resistant program 102, however, the tampering prevention process cannot be easily found due to the absence of the judgment/termination process as described above.

In addition, the protection target code (the first process instruction group 140) which is called by the output process instruction group 160 appears as though it is a part of the process of the output process instruction group 160 to the eyes of the unauthorized analyzers, and thus obfuscation of the second process instruction group 150 is possible.

As described, by adding the process for calling the protection target code to the second process instruction group 150 and generating the dependent process, the tampering-prevention-process generation apparatus 110 according to the present embodiment is capable of generating the output process instruction group 160 (the tamper-resistant program 102) which reliably prevents tampering with the protection target code. Furthermore, even in the case where the program is written in a language such as Java® which does not allow codes in a memory to be read as data during the program execution, the tampering-prevention-process generation apparatus 110 according to the present embodiment is capable of reliably preventing tampering with the protection target code of the program.

(Variation 1)

In the above described embodiment, the variable serving as the argument of the first process instruction group 140 is used as it is, as a variable to be assigned with a value through the referenced-variable-value-assigning-process instruction group 310. However, the present invention is not limited to this. The referenced-variable-value-assigning-process-instruction-group generating unit 240 may identify a variable name used in the second process instruction group 150, and set, as the referenced-variable-value-assigning-process instruction group 310, an instruction group for performing a process of assigning a random value to a variable whose name, among variable names held by the referenced-variable-information holding unit 230, is not used in the second process instruction group 150. Such a structure enables the obfuscation of the second process instruction group 150 even in the case where the name of the variable that stores a return value of the first process instruction group is in other use in the second process instruction group 150.

In the above described embodiment, the first process instruction group 140 and the second process instruction group 150 are instruction groups that inherently do not need exchange of information, and therefore even when the variable for storing the process result of the first process instruction group 140 is used as it is for the obfuscation, such a use does not cause rewriting of a correct process result. However, in the case where the second process instruction group 150 inherently contains an instruction for calling the first process instruction group 140 and uses the process result of the first process instruction group 140, merely performing the above described obfuscation causes rewriting of the process result through the referenced-variable-value-assigning-process instruction group 310, which makes it difficult to ensure normal operations. Here, as described, use of a variable that is not contained in the second process instruction group 150 makes the variable used for obfuscation different from the variable that is inherently contained in the second process instruction group 150 and is for storing the process result of the first process instruction group 140. Therefore, the obfuscation can be carried out with no influence on the process result. That is to say, the same obfuscation as that described above can be carried out even in the case where the second process instruction group 150 includes such a process as calling the first process instruction group 140.

It is obvious that in even this case, the same advantageous effects as that described in (1.5) can be achieved.

(Variation 2)

Although it has been assumed above that the referenced-variable-value-assigning-process-instruction-group generating unit 240 randomly determines a value to be assigned to the referenced variable, the level of difficulty for the unauthorized analyzer in performing an analysis varies depending on the value assigned. Therefore, the tampering-prevention-process generation apparatus 110 may be structured such that the user specifies a value to be assigned or an assumed value.

Hereinafter, as FIG. 5C shows, a detailed description is provided of how the level of difficulty for the unauthorized analyzer in performing an analysis varies between a case where the value to be assigned to the referenced variable "encryptedData" is "0xF022" and a case where it is "0xF0001".

As FIG. 5C shows, in the case where the value to be assigned to the referenced variable "encryptedData" is "0xF022", the assumed value calculated by the assumed value calculating unit 290 is "0xF0DD". Consequently, even when the first process instruction group 140 is tampered with and altered to be a process "int decrypt(int encryptedData){return 0xF0DD;}", the output process instruction group 160 still operates normally.

The above process is intended to make the return value of the first process instruction group 140 invariably equal to the assumed value.

Here, the number of times the reproduction is possible, which is outputted by the tampered first process instruction group 140, is "0xF0DD". The value "0xF0DD" is negative because the most significant bit is 1 when written in binary notation. In other words, the number of times the reproduction is possible, which is outputted by the first process instruction group 140, is invariably a negative value, and therefore the reproduction is not allowed even if the above tampering has succeeded. Consequently, disabling the reproduction even when the tampering has succeeded makes the unauthorized analyzer incapable of judging whether or not the tampering has truly succeeded. Further, even if the unauthorized analyzer recognizes that the tampering has succeeded, the fact that the number of times the reproduction is possible is invariably a negative value does not allow the successful tampering to produce a large benefit.

In contrast, in the case where the value to be assigned to the referenced variable is "0x0001", the assumed value calculated by the assumed value calculating unit 290 is "0x00FE". Consequently, in the case where the first process instruction group 140 is tampered with and altered to be a process "int decrypt(int encryptedData){return 0x00FE;}", the output process instruction group 160 operates normally.

Here, the number of times the reproduction is possible, namely, 0x00FE, outputted by the tampered first process instruction group 140, is invariably a positive value because the most significant bit is 0. In this case, the reproduction is invariably permitted, which is an ideal tampering result from the viewpoint of the unauthorized analyzer.

As described, the level of difficulty for the unauthorized analyzer in performing an analysis varies depending on the value assigned to the referenced variable. In view of such a circumstance, the tampering-prevention-process generation apparatus 110 may be structured such that the user specifies the value to be assigned or the assumed value.

(Variation 3)

In Embodiment 1, the value of the referenced variable is determined at random, and the assumed value corresponding to that value is calculated by the assumed value calculating unit 290. However, the tampering-prevention-process generation apparatus 110 may be structured such that the value of the referenced variable and the assumed value are provided in advance.

For example, pieces of information included in test data at the time of performing a test after the development of the first process instruction group 140, such as referenced variable information, a referenced-variable value, and an assumed value, may be used.

In such a case, the tampering-prevention-process generation apparatus 110 does not need the referenced variable analyzing unit 220, the assign-target variable analyzing unit 270, and the assumed value calculating unit 290.

Such a structure is effective in such cases as where the obfuscation is performed on different programs using the same first process instruction group 140, and where the obfuscation is attempted repeatedly together with another technique for adjusting the level of obfuscation strength until an output process instruction group 160 having appropriate execution speed and strength is obtained.

That is to say, in the case where the calculation of an assumed value is time-consuming, the obfuscation of each program takes extra time because an assumed value is calculated every time the obfuscation is performed despite the fact that every calculation results in the same assumed value. With such a structure as described above, once an assumed value is calculated, that assumed value can be used repeatedly, allowing reduction of time it takes for the obfuscation by the time consumed for the calculation of assumed values.

(Variation 4)

In the case where the first process instruction group 140 includes no referenced variables at all, the tampering-prevention-process generation apparatus 110 may exclude the referenced variable analyzing unit 220 and the referenced-variable-information holding unit 230.

(Variation 5)

The tampering-prevention-process generation apparatus 110 according to Embodiment 1 is intended for the C language, and thus includes the output-process-instruction-group generating unit 205 and the process instruction holding units holding intermediate programs, namely, the referenced-variable-value-assigning-process-instruction-group holding unit 250, the branch-process-instruction-group holding unit 204, and the dependent-process-instruction-group holding unit 202. The tampering-prevention-process generation apparatus 110 according to Embodiment 1 generates from the intermediate programs a C-language program (output process instruction group 160) having a variable declaration, a function declaration and/or the like. However, in the case where the tampering-prevention-process generation apparatus 110 is intended for a language such as the assembly language that enables generation of programs by arranging process instructions in sequence, the tampering-prevention-process generation apparatus 110 may exclude the above units and generate the output process instruction group 160 by sequentially writing intermediate programs to the output-process-instruction-group holding unit 206.

(Variation 6)

Figure 10:
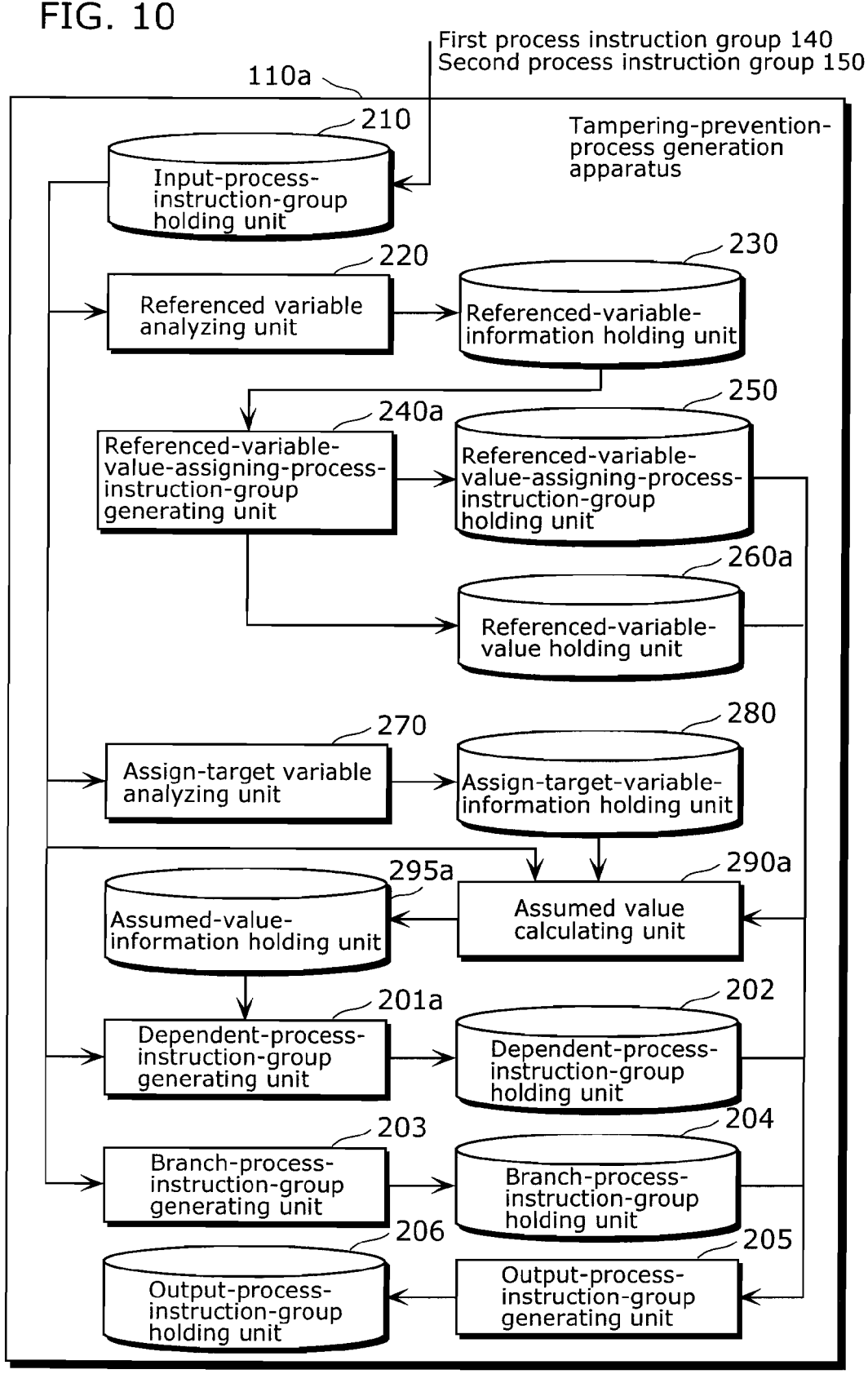
FIG. 10 is a diagram showing the structure of a tampering-prevention-process generation apparatus according to Variation 6 of Embodiment 1 of the present invention.

With reference to FIGS. 9 and 10, a tampering-prevention-process generation apparatus 110a, a variation of the tampering-prevention-process generation apparatus 110, shall be described. It is to be noted that the reference numerals of the structural elements (such as apparatuses, units and process instruction groups) of Embodiment 1 with "a" added at the end represent variations of the corresponding structural elements. For example, the tampering-prevention-process generation apparatus 110a is a variation of the tampering-prevention-process generation apparatus 110 which is one of the structural elements of Embodiment 1. Further, among the structural elements of the present variation, those denoted with the same names and reference numerals as that of the structural elements in Embodiment 1 are identical to the structural elements described in Embodiment 1.

As with the tampering-prevention-process generation apparatus 110, the tampering-prevention-process generation apparatus 110a is used in the processing system 100. The tampering-prevention-process generation apparatus 110a receives the first process instruction group 140 and the second process instruction group 150 as inputs and generates an output process instruction group 160a as output. Hereinafter, the output process instruction group 160a and the tampering-prevention-process generation apparatus 110a shall be described.

(3) Structure of the Output Process Instruction Group 160a

FIG. 9 is a diagram showing a specific example of the output process instruction group 160a generated by the tampering-prevention-process generation apparatus 110a.

The output process instruction group 160a includes a referenced-variable-value-assigning-process instruction group 310a for setting values to various parameters necessary for executing the first process instruction group 140, a branch process instruction group 320a for calling the first process instruction group 140, and a dependent process instruction group 330a executed after the first process instruction group 140 is called. Hereinafter, each of the structural units shall be described with this specific example.

(3.1) Referenced-Variable-Value-Assigning-Process Instruction Group 310a

The referenced-variable-value-assigning-process instruction group 310a is a process instruction group for setting values to various parameters necessary for calling and executing the first process instruction group 140. In the referenced-variable-value-assigning-process instruction group 310 shown in FIG. 5C, the value to be stored in the referenced variable "encryptedData" is invariably the same, fixed value "0xF022". In contrast, in the referenced-variable-value-assigning-process instruction group 310a, the value to be stored in the referenced variable is not the same, fixed value.

More specifically, in the referenced-variable-value-assigning-process instruction group 310a "encryptedData=compressedData<<8;" shown in FIG. 9, the value to be stored in the referenced variable "encryptedData" is dependent on the value of "compressedData". The variable "compressedData" takes a value between 0 to 31 inclusive (between 0x00 and 0x1F inclusive in hexadecimal notation), and thus the value to be assigned to the referenced variable "encryptedData" through the referenced-variable-value-assigning-process instruction group "encryptedData=compressedData<<8;" is one of "0x0000, 0x0100, . . . 0x1F00". In the following description, the set of possible values to be taken by the referenced variable is represented as {encrypted Data|encrypted Data=0x000, 0x0100, . . . 0x1F00}. Alternatively, the set of possible values to be taken by the referenced variable is represented as {encrypted Data|encryptedData=compressed Data<<8, compressedData=0x00, 0x01, . . . 0x1F} which includes "compressedData".

(3.2) Branch Process Instruction Group 320a

The branch process instruction group 320a is a process instruction group for causing a branch to the first process instruction group 140.

In the case of Embodiment 1, when the execution processing apparatus 130 executes the output process instruction group 160, the value taken by the assign-target variable "plainData" after the first process instruction group 140 is called is invariably the same, fixed value. This is because the variable which influences the process result of the first process instruction group 140 is the referenced variable, and in Embodiment 1, the referenced variable is invariably assigned with the same value.

In contrast, in the present variation, the value to be assigned to the referenced variable "encryptedData" is not the same, fixed value, and thus the value assigned to the assign-target variable "plainData" is also not the same, fixed value. Since the value to be taken by the referenced variable "encryptedData" is one of "0x0000, 0x0100, . . . 0x1F00", the value to be taken by the assign-target variable "plainData" is one of "0x00FF, 0x01FF, . . . 0x1FFF" which are the results of the process performed on the mentioned values "0x0000, 0x0100, . . . 0x1F00" through the first process instruction group 140. When the possible values to be taken by the assign-target variable are represented as a set, it is either {plainData|plainData=0x00FF, 0x01FF, . . . 0x1FFF} or {plainData|plainData=(compressedData<<8)^0x00FF, compressedData=0x00, 0x01, . . . 0x1F}.

(3.3) Dependent Process Instruction Group 330a

The dependent process instruction group 330a is a process instruction group executed after the first process instruction group 140 is called, and is a process instruction group for performing a process equivalent to the second process instruction group 150. To be more specific, it is a process instruction group for performing a process equivalent to the second process instruction group 150 even when the assign-target variable takes any one of the possible values to be taken mentioned in (3.2).

More specifically, the dependent process instruction group 330a is a process instruction group "for(counter=0; counter<compressed Data; counter++){decompressedData= (decompressedData<<1)1 ((compressedData<<8)^plainData^0x00FE);}".

The part to be noted in the above process instruction group is "(compressedData<<8)^plainData^0x00FE".

In the case of {plainData|plainData=(compressedData<<8) ^0x00FF, compressedData=0x00, 0x01, ..., 0x1F}, the above process instruction group is a process for calculating "(compressedData<<8) ^(compressedData<<8^0x00FF) ^0x00FE", and the output value is invariably 1. To be more specific, since (compressedData<<8) and "plainData" both have the same value "compressedData" for the high eight bits, the result of the exclusive OR operation is invariably the value "0x00FF". In the above process instruction group, a further exclusive OR between the value "0x00FF" and the value 0xFE whose least significant bit is the only difference from "0x00FF" results in obtainment of a value whose least significant bit is the only value that is "1", namely, "0x0001". Consequently, the dependent process instruction group 330a becomes a process equivalent to the second process instruction group 150 even when the assign-target variable takes any one of the possible values to be taken mentioned in (3.2).

(3.4) Advantageous effects of the Output Process Instruction Group 160a

With the output process instruction group 160a, the value to be stored in the assign-target variable varies depending on the variable "compressedData", thereby making it difficult for the unauthorized analyzer to perform an analysis. Hereinafter, a detailed description of this shall be provided.

In the case of Embodiment 1, when the unauthorized analyzer sequentially assigns values from a range of 0 to 30 to the referenced variable "compressedData" and executes the output process instruction group 160, the value of the assign-target variable "plainData", which is the process result of the branch process instruction group 320 "plainData=decrypt (encryptedData)", invariably gives the same, fixed value of "0xF0DD". Thus, with a prediction that the value of "plainData" is invariably "0xF0DD", the unauthorized analyzer can tamper with the branch process instruction group 320 to replace it with "plainData=0xF0DD;". In the case where an unauthorized analysis is performed in such a manner, the unauthorized analyzer can efficiently analyze the output process instruction group 160 without having to analyze the details of the first process instruction group 140. On the other hand, with the output process instruction group 160a, such an analysis cannot be performed since the value of the assign-target variable varies depending on the value of "compressedData".

(4) Structure of the Tampering-Prevention-Process Generation Apparatus 110a

FIG. 10 is a diagram showing the structure of the tampering-prevention-process generation apparatus 110a.

The tampering-prevention-process generation apparatus 110a includes a referenced-variable-value-assigning-process-instruction-group generating unit 240a, a referenced-variable-value holding unit 260a, an assumed value calculating unit 290a, an assumed-value-information holding unit 295a, and a dependent-process-instruction-group generating unit 201a, which respectively replace the referenced-variable-value-assigning-process-instruction-group generating unit 240, the referenced-variable-value holding unit 260, the assumed value calculating unit 290, the assumed-value-information holding unit 295, and the dependent-process-instruction-group generating unit 201 of the tampering-prevention-process generation apparatus 110 shown in FIG. 6.

Hereinafter, each of the replacing structural elements shall be described. It is to be noted that the specific example given below is a process for obtaining a process instruction group that is different from the output process instruction group 160a shown in FIG. 9.

(4.1) Referenced-Variable-Value-Assigning-Process-Instruction-Group Generating Unit 240a The referenced-variable-value-assigning-process-instruction-group generating unit 240a generates a referenced-variable-value-assigning-process instruction group 310a which is a process instruction group for setting a value to a parameter necessary for the execution of the first process instruction group 140, and writes the generated process instruction group in the referenced-variable-value-assigning-process-instruction-group holding unit 250. The referenced-variable-value-assigning-process-instruction-group generating unit 240a also writes in the referenced-variable-value holding unit 260a values to be set to the parameter.

To be more specific, the referenced-variable-value-assigning-process-instruction-group generating unit 240a, for example, obtains variable names held by the referenced-variable-information holding unit 230, and performs the following processes A) to D) on each of variables whose names are obtained.

A) The referenced-variable-value-assigning-process-instruction-group generating unit 240a determines a referenced-variable-value-assigning-process instruction group 310a. The referenced-variable-value-assigning-process instruction group 310a may be generated at random using a depended variable of the second process instruction group 150, or it may be generated by applying a depended variable to a template of a predetermined instruction group, for example.

B) The referenced-variable-value-assigning-process-instruction-group generating unit 240a writes the determined referenced-variable-value-assigning-process instruction group 310a in the referenced-variable-value-assigning-process-instruction-group holding unit 250.

C) The referenced-variable-value-assigning-process-instruction-group generating unit 240a determines a set of possible values to be taken by the referenced variable in the referenced-variable-value-assigning-process instruction group 310a.

D) The referenced-variable-value-assigning-process-instruction-group generating unit 240a writes the determined set in the referenced-variable-value holding unit 260a.

More specifically, the following processes are performed on the first process instruction group 140 shown in FIG. 5A.

A) The referenced-variable-value-assigning-process-instruction-group generating unit 240a sets "encryptedData=compressedData<<8" as the referenced-variable-value-assigning-process instruction group 310a. This process instruction group is an expression generated at random using the depended variable of the second process instruction group 150.

B) The referenced-variable-value-assigning-process-instruction-group generating unit 240a writes in the referenced variable assigning process instruction group holding unit 250 the referenced-variable-value-assigning-process instruction group 310a "encryptedData=compressedData<<8".

C) The referenced-variable-value-assigning-process-instruction-group generating unit 240a determines a set of possible values to be taken by the referenced variable in the referenced-variable-value-assigning-process instruction group 310a. The determined set is {encryptedData|encryptedData=compressedData<<8, compressedData=0x00, 0x01, ..., 0x1F}.

D) The referenced-variable-value-assigning-process-instruction-group generating unit 240a writes the determined set in the referenced-variable-value holding unit 260a. Here, the set {encryptedData|encryptedData=compressedData<<8, compressedData=0x00, 0x01, . . . 0x1F} is written.

(4.2) Referenced-Variable-Value Holding Unit 260a

The referenced-variable-value holding unit 260a has a region for storing a value to be set to a parameter necessary for the execution of the first process instruction group 140.

Specifically, the referenced-variable-value holding unit 260a has a region for storing a variable name and information on a set of values that can be taken by a variable having that variable name, for example.

More specifically, as for the first process instruction group 140 shown in FIG. 5A, the referenced-variable-value holding unit 260a holds the set {encrypted Data|encrypted Data=compressed Data<<8, compressedData=0x00, 0x01, . . . , 0x1F}. Here, the variable name is "encryptedData", and the set of values to be taken by a variable having that variable name is {encryptedData=compressedData<<8, compressedData=0x00, 0x01,..., 0x1F}. It is to be noted that the data to be held may be in a form that shows each value or in a collective representation.

(4.3) Assumed value calculating unit 290a

The assumed value calculating unit 290a calculates an assumed value to be assigned to an assign-target variable when the first process instruction group 140 is executed using a value for the referenced variable held by the referenced-variable-value holding unit 260a. Here, the value for the referenced variable is not only a fixed value but is one of values included in a set of values, and thus the assumed value calculating unit 290a calculates a set of values as the assumed value.

Specifically, the assumed value calculating unit 290a performs the following processes A) to C), for example.

A) The assumed value calculating unit 290a reads assign-target variable information from the assign-target-variable-information holding unit 280.

B) The assumed value calculating unit 290a reads the name of a referenced variable and a set of values from the referenced-variable-value holding unit 260a, and repeats the following processes (α) and (β) for each of the values in the set.

(α) The assumed value calculating unit 290a assigns the read value to the referenced variable, and executes the first process instruction group 140 held by the input-process-instruction-group holding unit 210.

(β) The assumed value calculating unit 290a refers to the value of the assign-target variable after the execution of the first process instruction group 140.

C) The assumed value calculating unit 290a stores in the assumed-value-information holding unit 295 the set of values referred to in B) and the name of the assign-target variable read in A).

To be more specific, in the case where the processes described in the specific example set forth in (4.1) and (4.2) are performed, the assumed value calculating unit 290a performs the following processes.

A) The assumed value calculating unit 290a reads the assign-target variable information "int plainData".

B) The assumed value calculating unit 290a reads the set {encryptedData|encryptedData=compressedData<<8, compressedData=0x00, 0x01, . . . , 0x1F}.

The assumed value calculating unit 290a repeats the following processes (α) and (β) for each of the cases where "compressedData" takes one of "0x00, 0x01, . . . , and 0x1F".

(α) The assumed value calculating unit 290a calculates the value of "encryptedData" for each of the cases where "compressedData" takes one of the mentioned values, and further calculates "encryptedData^0x00FF" which is a process result of the first process instruction group 140.

(β) The assumed value calculating unit 290a refers to the calculated value. It is to be noted that in each of the cases where "compressedData" takes one of "0x00, 0x01, . . . , and 0x1F", the value of the assign-target variable "plainData" becomes corresponding one of "0x00FF, 0x01FF, . . . , and 0x1FFF".

C) The assumed value calculating unit 290a stores {plainData|plainData=0x00FF, 0x01FF, . . . , 0x1FFF} in the assumed-value-information holding unit 295.

It is to be noted that the above described processes are performed in the case where the set of possible values for "plainData" is represented in a form showing each value. In the case where the possible values for "plainData" are recorded as a set, the assumed value calculating unit 290a may, instead of repeating the processes (α) and (β), store {plainData|plainData=(compressedData<<8)^0x00FF, compressedData=0x00, 0x01, . . . , 0x1F} using the process "encryptedData^0x00FF" of the first process instruction group 140.

(4.4) Assumed-Value-Information Holding Unit 295a

The assumed-value-information holding unit 295a has a region for storing assumed value information.

Specifically, the assumed-value-information holding unit 295a holds, as the assumed value information, a set of assumed values calculated by the assumed value calculating unit 290a and the name of the variable which is to hold the assumed values.

More specifically, in the case where the assumed value calculating unit 290a performs the process described in the specific example set forth in (4.3), the assumed-value-information holding unit 295a stores {plainData|plainData=0x00FF, 0x01FF, 0x1FFF}. Here, the variable name is "plainData", and the set of values to be held in "plainData" is {plainData=0x00FF,0x01FF,..., 0x1FFF}. Obviously, instead of holding the assumed values in a form showing each of the values as above, they may held in a form that represents the assumed value as a set. In that case, the assumed-value-information holding unit 295a stores {plainData|plainData=(compressedData<<8)^0x00FF, compressedData=0x00, 0x01, . . . , 0x1F}.

(4.5) Dependent-Process-Instruction-Group Generating Unit 201a

The dependent-process-instruction-group generating unit 201a generates a dependent process instruction group 330a based on the assumed values held by the assumed-value-information holding unit 295a and the second process instruction group 150 held by the input-process-instruction-group holding unit 210.

The dependent process instruction group 330a is a process instruction group for performing a process equivalent to the second process instruction group 150, and includes a process of referring to a process result of the first process instruction group 140. The value of the result referred to is used for a part of the dependent process instruction group 330a.

To be more specific, the dependent process instruction group 330a causes execution of the following processes A) to F), for example.

A) The dependent-process-instruction-group generating unit 201a finds a constant number contained in a process instruction included in the second process instruction group

150. The process instruction containing the constant number is referred to as Or1 and the value of the constant number is referred to as Va1.

B) The dependent-process-instruction-group generating unit 201*a* reads the assumed value information held by the assumed-value-information holding unit 295*a*.

C) The dependent-process-instruction-group generating unit 201*a* generates a map F which associates all the values in the set of assumed values with the same value Va2. For example, when the referenced variable is x and the set of assumed values is $\{x|x=x\_0, x\_1, \ldots, x\_n\}$, the dependent-process-instruction-group generating unit 201*a* generates $(x\hat{\ }x\_0)*(x\hat{\ }x\_1)* \ldots *(x\hat{\ }x\_n)$ as the map F. Here, "*" represents multiplication. Since $x=x\_t$ (t is one selected from $0, 1, \ldots, n$) applies, the value of the t-th item $(x\hat{\ }x\_t)$ in the expression of the map F becomes 0. Regardless of the values of items other than the t-th item, multiplying with the value 0 (the t-th item) results in the map F to be 0. In other words, the following relationship applies in this example:

$$Va2=(x\hat{\ }x\_0)*(x\hat{\ }x\_1)* \ldots *(x\hat{\ }x\_n)=0.$$

D) The dependent-process-instruction-group generating unit 201*a* calculates Va3=Va2−Va1. In the above described example, the following relationship applies:

$$Va1=Va2-Va3=(x\hat{\ }x\_0)*(x\hat{\ }x\_1)* \ldots *(x\hat{\ }x\_n)-Va3.$$

E) The dependent-process-instruction-group generating unit 201*a* generates a process instruction Or2, which is a process instruction generated by replacing the value Va1 contained in the process instruction Or1 with "process of the map F-Va3".

F) The dependent-process-instruction-group generating unit 201*a* generates the dependent process instruction group 330, which is an instruction group generated by replacing the process instruction Or1 in the second process instruction group 150 with the process instruction Or2.

To be more specific, in the case where the assumed-value-information holding unit 295*a* performs the process described in (4.4), the dependent-process-instruction-group generating unit 201*a* performs the following processes A) to F).

A) The dependent-process-instruction-group generating unit 201*a* finds a constant number contained in a process instruction included in the second process instruction group 150. To be more specific, the dependent-process-instruction-group generating unit 201*a* finds "decompressedData=(decompressedData<<1)|0x0001;" as the process instruction Or1 containing the constant number, and finds "0x0001" as the constant number Va1.

B) The dependent-process-instruction-group generating unit 201 reads the assumed value information {plainData|plainData=0x00FF, 0x01FF, . . . , 0x1FFF" from the assumed-value-information holding unit 295.

C) The dependent-process-instruction-group generating unit 201*a* generates a map F "(plainData^0x00FF)* (plainData^0x01FF)* . . . *(plainData^0x11FF)" which associates all the values in the set of assumed values with the same value Va2 "0".

D) The dependent-process-instruction-group generating unit 201*a* calculates Va3=Va2−Va1. In other words, it calculates "Va3=0−0x0001=−1=0xFFFF".

E) The dependent-process-instruction-group generating unit 201*a* generates a process instruction Or2 by replacing the value Va1 "0x0001" contained in the process instruction Or1 with "process of the map F−Va3", that is, "(plainData^0x00FF)*(plainData^0x01FF)* . . . *(plainData^0x11FF)−0xFFFF".

In other words, the process instruction Or2 "decompressedData=(decompressedData<<1)|((plainData^ 0x00FF)*(plainData^0x01FF)* . . . *(plainData^x11FF))− 0xFFFF);" is generated.

F) The dependent-process-instruction-group generating unit 201 generates a dependent process instruction group 330*a*, which is an instruction group generated by replacing the process instruction Or1 included in the second process instruction group 150 with the process instruction Or2.

In other words, "for(counter=0;counter<compressedData; counter){decompressed Data=(decompressedData<<1)1 ((plainData^0x00FF)*(plainData^0x01FF)* . . . *(plain-Data^0x11FF))−0xFFFF);}" is generated.

Further, in this case, a function declaration and/or a variable declaration are added in accordance with the C language format.

It is to be noted that although (C) has shown an example of the map F which associates all the values in the set of assumed values with the same value, it may be a different map. Further, a number of maps F may be registered in advance so that one is selected therefrom. Furthermore, the user may specify a map F. In such cases too, as in Embodiment 1, it is advantageous for situations where the same map is repeatedly used for the obfuscation.

Further, another specific example of a map different from the above described map F is "(compressedData<<8) ^plainData^0x00FE" included in the dependent process instruction group 330*a* shown in FIG. 9. Even with such a map, a correct value "0x0001" can be obtained as described above.

(Variation 7)

The tampering-prevention-process generation apparatus 110 may receive plural process instruction groups, and select the first process instruction group 140 and the second process instruction group 150 from among the plural process instruction groups. For example, the tampering-prevention-process generation apparatus 110 may obtain a process instruction group A1, a process instruction group A2, . . . and a process instruction group An, and randomly select a set of the first process instruction group 140 and the second process instruction group 150 from among these process instruction groups to perform the obfuscation. Moreover, the obfuscation may be performed on more than one set; the selection and obfuscation may be repeatedly performed.

Moreover, for example, the tampering-prevention-process generation apparatus 110 may use the first process instruction group 140 as the process instruction group A1 and randomly select a process instruction group other than the process instruction group A1 as the second process instruction group 150, to perform the obfuscation. Then, for the process instruction group A2, . . . , and An, the tampering-prevention-process generation apparatus 110 may use each one as the first process instruction group 140 and select, as the second process instruction group 150, a process instruction group other than the process instruction group used as the first process instruction group 140, to perform the obfuscation.

Such a structure makes the process instruction groups A1 to An to intricately intertwined with each other, which further causes difficulty for tampering.

In addition, as an application of the present invention, an execution processing apparatus may be mounted to have, as a part of its structure, a structure equivalent to the tampering-prevention-process generation apparatus 110, and execute a program converted by that structure equivalent to the tampering-prevention-process generation apparatus 110. In such a case, providing the execution processing apparatus with the same structure as the one in the present variation creates difficulty in identifying which process instruction group is the first process instruction group and the second process instruction group, and thus it becomes further difficult to perform an analysis.

(Variation 8)

The case described here is that an instruction included in the first process instruction 140 is targeted for protection, and the tampering prevention is provided for that instruction. However, the tampering prevention may be provided not only for instructions but also for data. As in Embodiment 1, when the protection target is an instruction group, a process for branching to that instruction group is added. However, when the protection target is data, a process for reading the data into a predetermined variable and the like is added. For example, when the protection target is data used by the first process instruction group 140, a process for reading that data into a variable is added instead of the branch process instruction group 320, and the dependent process instruction group 330 operates correctly when the value, which is dependent on and stored in the variable, equals an assumed value (that is, here, data which has not been tampered).

Such a structure allows reading of the protection target data into a variable instead of the execution of the first process instruction group 140 through the branch process instruction group 320. Then, in the case where the protection target data is tampered with, there is a change in the value to be read into the variable, and thus the dependent process instruction group 330 causes an operation different from the second process instruction group 150. As a result, the protection target data can be protected in the same manner as for the first process instruction group 140 according to Embodiment 1. It is to be noted that the protection target data is, for example, apparatus-unique numbers such as mobile phone numbers.

(Embodiment 2)

A processing system 100b according to Embodiment 2 of the present invention shall be described.

Figure 11:
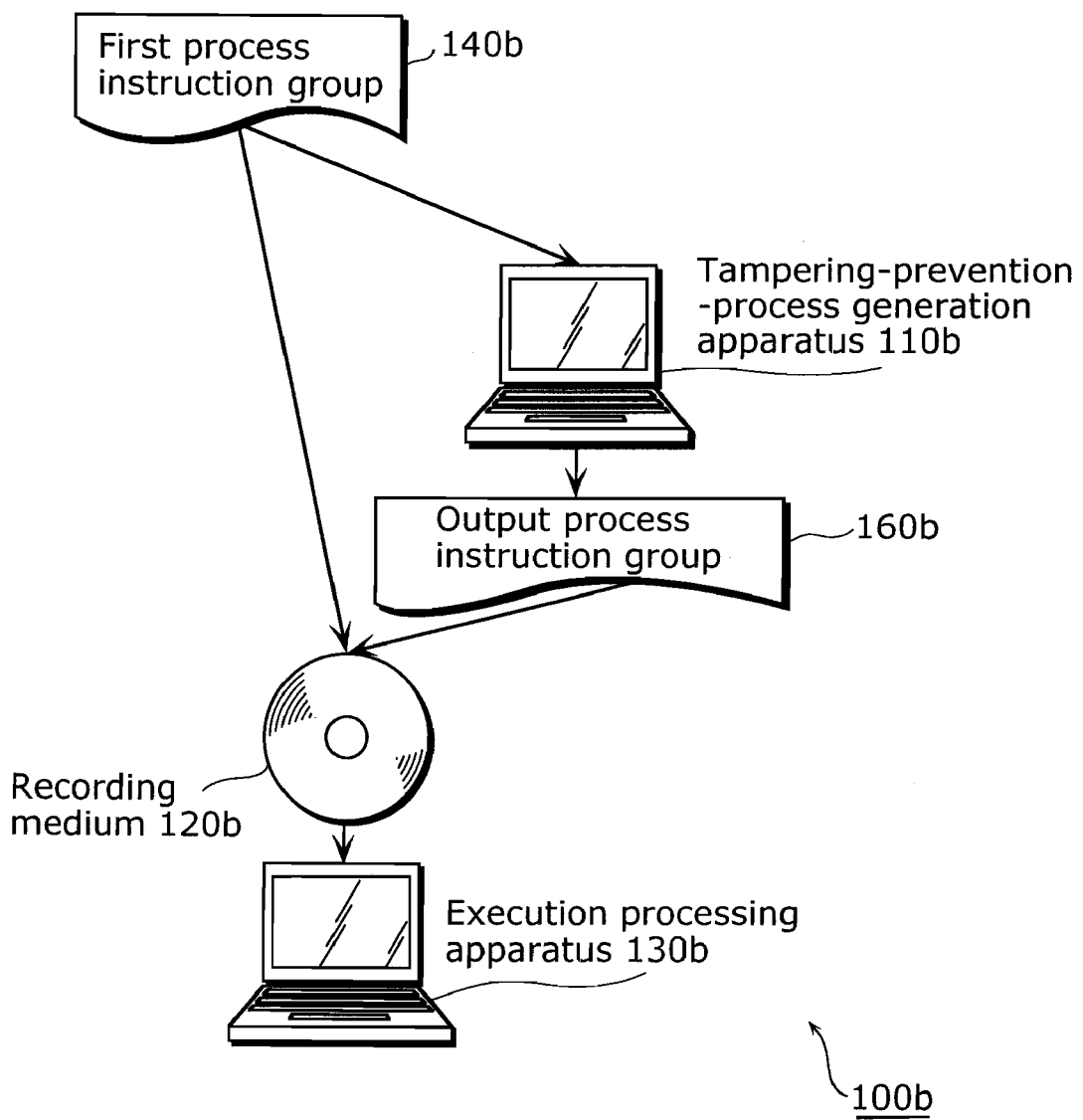
FIG. 11 is a diagram showing the structure of a processing system according to Embodiment 2 of the present invention.

FIG. 11 is a diagram showing the structure of the processing system 100b according to Embodiment 2.

The processing system 100b according to the present embodiment receives a first process instruction group 140b as input and generates an output process instruction group 160b for checking whether or not the first process instruction group 140b is tampered with. The processing system 100b includes a tampering-prevention-process generation apparatus 110b (instruction generation apparatus) and an execution processing apparatus 130b.

The tampering-prevention-process generation apparatus 110b is an apparatus which generates a program that reliably protects a protection target code. More specifically, the tampering-prevention-process generation apparatus 110b obtains the first process instruction group 140b, the protection target code, and generates an output process instruction group 160b for performing a tampering check process for checking whether or not the protection target code is tampered with. Further, the tampering-prevention-process generation apparatus 110b writes the first process instruction group 140b and the generated output process instruction group 160b on a recording medium 120b.

The execution processing apparatus 130b reads and executes the first process instruction group 140b and the output process instruction group 160b recorded on the recording medium 120b.

It is to be noted that instead of writing the first process instruction group 140b and the output process instruction group 160b on the recording medium 120b, the tampering-prevention-process generation apparatus 110b may transmit these instruction groups to the execution processing apparatus 130b via a communication medium.

The output process instruction group 160b calls the first process instruction group 140b during its process. More specifically, when the execution processing apparatus 130b executes the output process instruction group 160b, an instruction group included in the output process instruction group 160b is executed first, then, during the process, the first process instruction group 140b is called and executed, which is followed by the execution of the subsequent process instruction group of the output process instruction group 160b.

The first process instruction group 140b is a process instruction group executed by the execution processing apparatus 130b. In some cases, it is executed during the execution of the output process instruction group 160b, whereas in other cases, it is executed separately from the output process instruction group 160b.

More specifically, for example, the first process instruction group 140b is an instruction group for receiving an encrypted number of times that a content item can be reproduced, decrypting the received number, and outputting the number of times in plain text that the content item can be reproduced. The output process instruction group 160b is a process instruction group for checking whether or not the first process instruction group 140b is tampered with, and returning 0 if the first process instruction group 140b is not tampered with whereas stopping the process currently executed by the execution processing apparatus 130b if the first process instruction group 140b is tampered with.

Hereinafter, each of the elements in the figure shall be described in detail.

(1) Structure of the Output Process Instruction Group 160b

Figure 12:
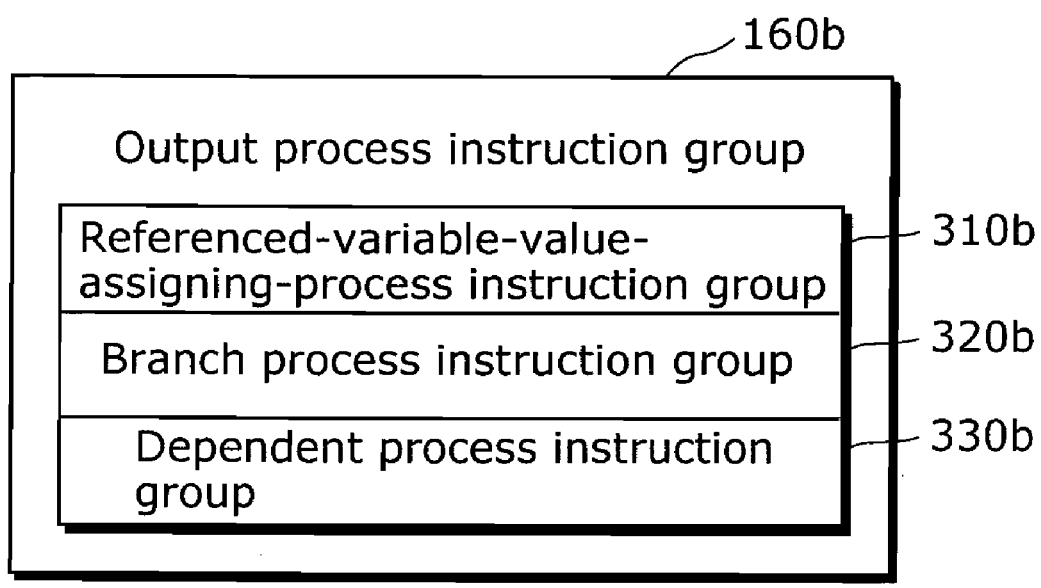
FIG. 12 is a diagram showing the structure of an output process instruction group according to Embodiment 2 of the present invention.

FIG. 12 is a diagram showing the structure of the output process instruction group 160b.

The output process instruction group 160b includes a referenced-variable-value-assigning-process instruction group 310b for setting values to various parameters necessary for executing the first process instruction group 140b, a branch process instruction group 320b for calling the first process instruction group 140b, and a dependent process instruction group 330b executed after the first process instruction group 140b is called. When the output process instruction group 160b is executed by the execution processing apparatus 130b, the referenced-variable-value-assigning-process instruction group 310b, the branch process instruction group 320b, the first process instruction group 140b, and the dependent process instruction group 330b are executed in this order.

Hereinafter, each of the process instruction groups shall be described.

(1.1) Referenced-Variable-Value-Assigning-Process Instruction Group 310b

It is the same as the referenced-variable-value-assigning-process instruction group 310 of Embodiment 1.

(1.2) Branch Process Instruction Group 320b

It is the same as the branch process instruction group 320 of Embodiment 1.

(1.3) Dependent Process Instruction Group 330b

The dependent process instruction group 330b is a process instruction group executed after the first process instruction group 140b is called, and is a process instruction group for checking, based on a process result of the first process instruction group 140b, whether or not tampering has been performed.

The process result of the first process instruction group 140b is, specifically, a return value of a function, for example, when the first process instruction group 140b is a function.

Further, when the first process instruction group 140*b* is an instruction group for determining a value for an external variable, for example, the process result of the first process instruction group 140*b* is a value assigned to the external variable. Furthermore, when the first process instruction group 140*b* is an instruction group for storing a value on a stack, for example, the process result of the first process instruction group 140*b* is the value stored on the stack. Further, when the first process instruction group 140*b* is an instruction group for storing a value at a location designated by an address variable, for example, the process result of the first process instruction group 140*b* is the stored value. Such process results of the first process instruction group 140*b* are stored at a storage location referred to as an "assign-target variable" as in Embodiment 1.

Although it is generally impossible to find out the process result of the first process instruction group 140*b* in advance, only when the values of the various parameters necessary for executing the first process instruction group 140*b* are set by the referenced-variable-value-assigning-process instruction group 310*b*, the process result can be known in advance. To be more specific, the value of the process result can be found out when, for example, the first process instruction group 140*b* is executed with a value set by the referenced-variable-value-assigning-process instruction group 310*b* actually set in the referenced variable. Hereinafter, such found value is referred to as an assumed value as in Embodiment 1.

(1.4) Example of the Output Process Instruction Group 160*b*

Figure 13:
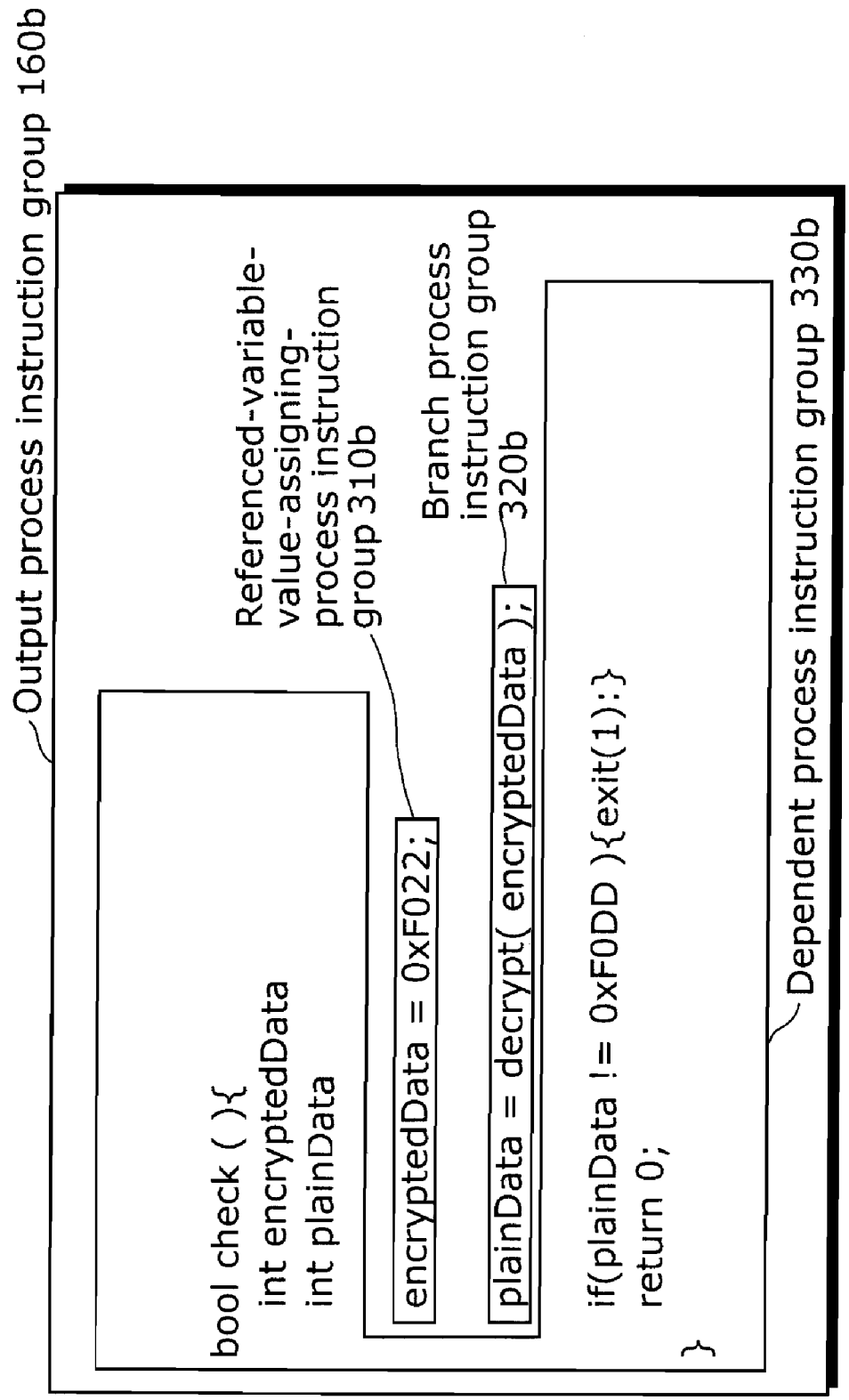
FIG. 13 is a diagram showing a specific example of an output process instruction group written in the C language according to Embodiment 2 of the present invention.

FIG. 13 is a diagram showing a specific example of the output process instruction group 160*b* written in the C language.

The output process instruction group 160*b* is an output process instruction group when the first process instruction group 140*b* is assumed to be equivalent to the first process instruction group 140 shown in FIG. 5A, and is a process instruction group for performing a tampering check on the first process instruction group 140*b* for checking whether it has been tampered with.

The referenced-variable-value-assigning-process instruction group 310*b* "encryptedData=0xF022;" is an instruction group representing a process for assigning a value to an argument used for calling the first process instruction group 140*b*. To be more specific, the referenced-variable-value-assigning-process instruction group 310*b* is for assigning the value "0xF022" to the variable "encrypted Data".

The branch process instruction group 320*b* "plainData=decrypt(encryptedData);" is an instruction group indicating a process of calling the first process instruction group 140*b* with the referenced variable "encryptedData" as the argument, and the process result of the first process instruction group 140*b* is stored in the variable "plainData". In the execution processing apparatus 130*b*, the assumed value for a return value to be obtained through normal execution of the branch process instruction group 320*b* is "0xF022^0x00FF=0xF0DD", which is the process result of the first process instruction group 140*b* performed with the value "0xF022" set to the variable "encryptedData".

The dependent process instruction group 330*b* is a process instruction group for judging whether or not the process result of the first process instruction group 140*b* equals the assumed value, and returning 0 when it equals the assumed value whereas stopping the process currently executed by the execution processing apparatus 130*b* when it does not equal the assumed value. The dependent process instruction group 330*b* is represented as "if(plainData!=0xF0DD){exit(1);}return0;".

In the above described process, if the first process instruction group 140*b* is tampered with, the process result of the first process instruction group 140*b* is a value different from the assumed value.

(1.5) Advantageous Effects of the Output Process Instruction Group 160*b*

The output process instruction group 160*b* according to Embodiment 2 includes the referenced-variable-value-assigning-process instruction group 310*b* for setting values to various parameters necessary for executing the first process instruction group 140*b*, the branch process instruction group 320*b* for calling the first process instruction group 140*b*, and the dependent process instruction group 330*b* executed after the first process instruction group 140*b* is called.

With such a structure, if a process instruction of the first process instruction group 140*b* is tampered with, the tampering can be detected through the judgment of whether or not the process result of the first process instruction group 140*b* equals the assumed value.

For the conventional tampering check using a hash check, it is necessary to read programs as data. However, ordinary programs are rarely read as data though they may be read as execution targets, and besides, an instruction used for the reading is not an ordinary one. Thus, the unauthorized analyzer monitors instructions, and when an instruction to read a program as data is executed, he or she is able to judge that the process for the reading is a part of the tampering-check-process instruction group, and that the process being read is likely to be an important process targeted for tampering prevention. However, according to the method of the present embodiment, the program tampering can be detected without having to access programs as data. In addition, the tampering check can be performed even with a language that prohibits access to the program as data.

(2) Structure of the Tampering-Prevention-Process Generation Apparatus 110*b*

Figure 14:
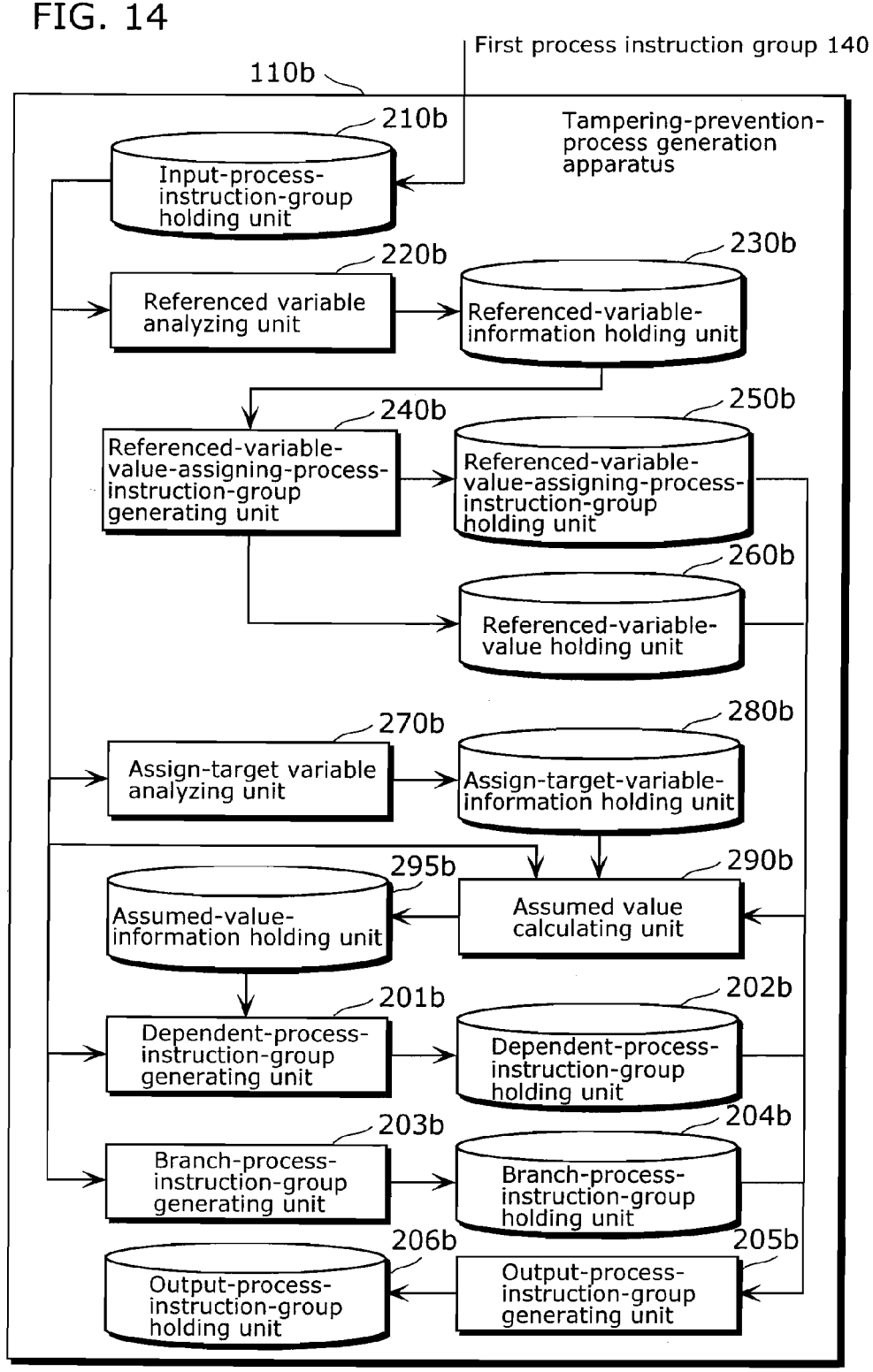
FIG. 14 is a diagram showing the structure of a tampering-prevention-process generation apparatus according to Embodiment 2 of the present invention.

FIG. 14 is a diagram showing the structure of the tampering-prevention-process generation apparatus 110*b*. Here, the tampering-prevention-process generation apparatus 110*b* is an apparatus that generates the output process instruction group 160*b* for performing the tampering check on the first process instruction group 140*b*.

The tampering-prevention-process generation apparatus 110*b* includes an input-process-instruction-group holding unit 210*b*, a referenced variable analyzing unit 220*b*, a referenced-variable-information holding unit 230*b*, a referenced-variable-value-assigning-process-instruction-group generating unit 240*b*, a referenced-variable-value-assigning-process-instruction-group holding unit 250*b*, a referenced-variable-value holding unit 260*b*, an assign-target variable analyzing unit 270*b*, an assign-target-variable-information holding unit 280*b*, an assumed-value-information holding unit 295*b*, an assumed value calculating unit 290*b*, a dependent-process-instruction-group generating unit 201*b*, a dependent-process-instruction-group holding unit 202*b*, a branch-process-instruction-group generating unit 203*b*, a branch-process-instruction-group holding unit 204*b*, an output-process-instruction-group generating unit 205*b*, and an output-process-instruction-group holding unit 206*b*.

The input-process-instruction-group holding unit 210*b* obtains and holds the first process instruction group 140*b*. The referenced variable analyzing unit 220*b* analyzes which variable serves as an argument, for example, for which a value needs to be set for the execution of the first process instruction group 140*b* (referenced variable).

The referenced-variable-information holding unit 230*b* holds information, such as the name and so on of the referenced variable identified through the analysis by the referenced variable analyzing unit 220b.

The referenced-variable-value-assigning-process-instruction-group generating unit 240b generates a referenced-variable-value-assigning-process instruction group 310b for assigning a value to the referenced variable.

The referenced-variable-value-assigning-process-instruction-group holding unit 250b holds the referenced-variable-value-assigning-process instruction group 310b generated by the referenced-variable-value-assigning-process-instruction-group generating unit 240b.

The referenced-variable-value holding unit 260b holds the value to be assigned to the referenced variable in the referenced-variable-value-assigning-process instruction group 310b.

The assign-target variable analyzing unit 270b analyzes which variable is to be assigned with a process result of the first process instruction group 140b (assign-target variable).

The assign-target-variable-information holding unit 280b holds information such as the name of the assign-target variable identified through the analysis by the assign-target variable analyzing unit 270b.

With the value held by the referenced-variable-value holding unit 260b assigned to the value of the referenced variable, the assumed value calculating unit 290b calculates an assumed value for the assign-target variable value that is obtained through the execution of the first process instruction group 140b.

The assumed-value-information holding unit 295b holds the assumed value calculated by the assumed value calculating unit 290b.

The dependent-process-instruction-group generating unit 201b generates a dependent process instruction group 330b based on the assumed value.

The dependent-process-instruction-group holding unit 202b holds the dependent process instruction group 330b generated by the dependent-process-instruction-group generating unit 201b.

The branch-process-instruction-group generating unit 203b generates a branch process instruction group 320b for calling the first process instruction group 140b held by the input-process-instruction-group holding unit 210b.

The branch-process-instruction-group holding unit 204b holds the branch process instruction group 320b generated by the branch-process-instruction-group generating unit 203b.

The output-process-instruction-group generating unit 205b generates an output process instruction group 160b which includes the referenced-variable-value-assigning-process instruction group 310b held by the referenced-variable-value-assigning-process-instruction-group holding unit 250b, the branch process instruction group 320b held by the branch-process-instruction-group holding unit 204b, and the dependent process instruction group 330b held by the dependent-process-instruction-group holding unit 202b.

The output-process-instruction-group holding unit 206b holds the output process instruction group 160b generated by the output-process-instruction-group generating unit 205b.

Hereinafter, a description shall be provided of the input-process-instruction-group holding unit 210b and the dependent-process-instruction-group generating unit 201b which are different from the corresponding units in Embodiment 1. Other units perform processes equivalent to those performed by the corresponding units of Embodiment 1, and thus a description thereof shall be omitted.

(2.1) Input-Process-Instruction-Group Holding Unit 210b

The input-process-instruction-group holding unit 210b receives the first process instruction group 140b as input from outside. That is to say, the input-process-instruction-group holding unit 210b obtains the first process instruction group 140b. The input-process-instruction-group holding unit 210b has a region for storing one or more process instruction groups. The input-process-instruction-group holding unit 210b holds the first process instruction group 140b received by the tampering-prevention-process generation apparatus 110b.

(2.2) Dependent-Process-Instruction-Group Generating Unit 201b

The dependent-process-instruction-group generating unit 201b generates a dependent process instruction group 330b based on the assumed value held by the assumed-value-information holding unit 295b.

To be more specific, the dependent-process-instruction-group generating unit 201b performs the following processes A) to D), for example.

A) The dependent-process-instruction-group generating unit 201b reads the assumed value information held by the assumed-value-information holding unit 295b.

B) The dependent-process-instruction-group generating unit 201b sets a variable (assign-target variable), which is to hold an assumed value indicated in the assumed value information, as Vr1, and sets the assumed value as Va1.

C) The dependent-process-instruction-group generating unit 201b generates a process instruction group for comparing the variable Vr1 and the assumed value Va1, and returning 0 when they are equal to each other whereas stopping the process currently executed by the execution processing apparatus 130b when they are not equal to each other. It is to be noted that here, 0 is returned when the verification shows a positive result (that is, in this case, a result showing that no tampering has been performed) in accordance with a common programming style, however, the present invention is not limited to this. A value other than 0 may be returned, or no value may be returned. That is to say, any value may be returned when judging that no tampering has been performed, as long as the currently executed process continues.

D) The dependent-process-instruction-group generating unit 201b stores the generated dependent process instruction group 330b in the dependent-process-instruction-group holding unit 202b.

To be more specific, in the case where the assumed-value-information holding unit 295b performs the same process as that described in (2.10) in Embodiment 1, the dependent-process-instruction-group generating unit 201b performs the following processes A) to D).

A) The dependent-process-instruction-group generating unit 201b reads the assumed value information "int plainData=0xF0DD" held by the assumed-value-information holding unit 295b.

B) The dependent-process-instruction-group generating unit 201b sets the variable "plainData", which is to hold an assumed value indicated in the assumed value information, as Vr1, and sets the assumed value "0xF0DD" as Va1.

C) The dependent-process-instruction-group generating unit 201b generates a process instruction group "if (plainData!=0xF0DD){exit(1);}return0;" for comparing the variable Vr1 and the assumed value Va1, and returning 0 when they are equal to each other whereas stopping the process currently executed by the execution processing apparatus 130b when they are not equal to each other.

D) The dependent-process-instruction-group generating unit 201b stores the generated dependent process instruction group 330b in the dependent-process-instruction-group holding unit 202b.

(2.3) Advantageous Effects of the Tampering-Prevention-Process Generation Apparatus 110b The tampering-prevention-process generation apparatus 110b is capable of generating a tampering check process instruction group (the output process instruction group 160b) for checking whether a program is tampered with, without having to read the program as data.

Figure 15:
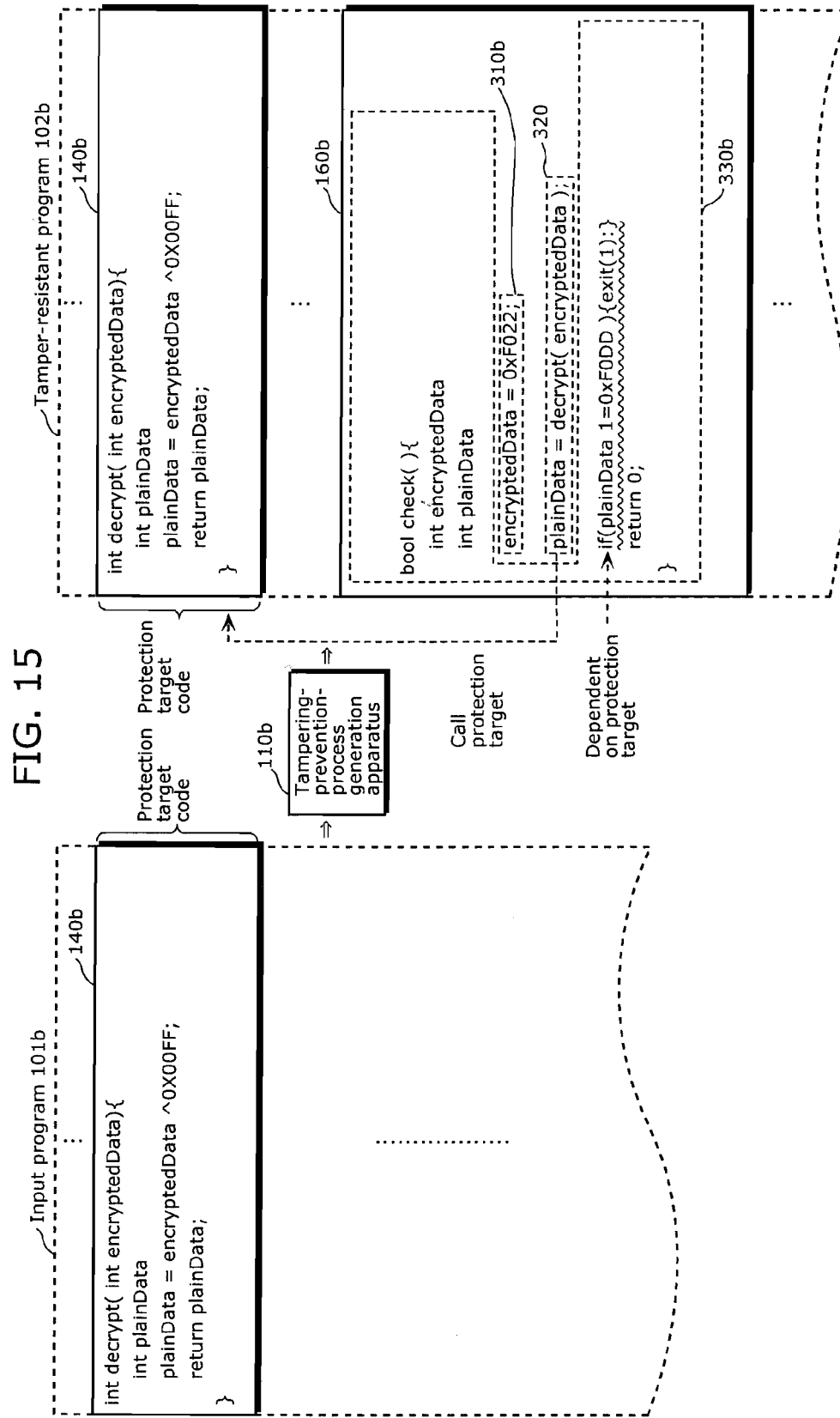
FIG. 15 is a diagram for describing advantageous effects produced by a tampering-prevention-process generation apparatus according to Embodiment 2 of the present invention.

FIG. 15 is a diagram for describing advantageous effects produced by the tampering-prevention-process generation apparatus 110b.

The tampering-prevention-process generation apparatus 110 for example obtains an input program 101b which includes the first process instruction group 140b, converts the input program 101b into a tamper-resistant program 102b, and outputs the tamper-resistant program 102b. In doing so, the tampering-prevention-process generation apparatus 110 generates the output process instruction group 160b and adds the generated output process instruction group 160b to the input program 101b as described above.

That is to say, the tampering-prevention-process generation apparatus 110 generates a tampering prevention process which includes a process (the referenced-variable-value-assigning-process instruction group 310b and the branch process instruction group 320b) for calling the first process instruction group 140b that is the protection target code, and a judgment/termination process (the dependent process instruction group 330b) for stopping a process currently executed by the execution processing apparatus 130b when the process result of the first process instruction group 140b executed through the calling process is different from an assumed value. The tampering-prevention-process generation apparatus then adds the generated tampering prevention process to the input program 101b.

In the process for calling the protection target code (the first process instruction group 140), the protection target code is called with the value "0x0022" assigned to the referenced variable "encryptedData" of the protection target code through the referenced-variable-value-assigning-process instruction group 310b.

As a result, the tamper-resistant program 102b makes it difficult for the unauthorized analyzer to find the tampering prevention process, because the protection target code is not read as data, unlike in the conventional technique.

Further, in the judgment/termination process, "if (plainData!=0xF0DD){exit(1);}return0;" of the dependent process instruction group 330b is dependent on the value of "plainData" that is the result of the execution of the protection target code called through the above mentioned calling process (the process result of the first process instruction group 140b). That is to say, if the protection target code is not tampered with, the value of "plainData" equals the assumed value "0xF0DD", which means that when the output process instruction group 160b included in the tamper-resistant program 102b is executed, a process in the tamper-resistant program 102b equivalent to the process in the input program 101b will be correctly executed by the execution processing apparatus 130b.

On the other hand, if the protection target code is tampered with, the value of "plainData" becomes different from the assumed value "0xF0DD", which means that the process in the tamper-resistant program 102b equivalent to the process in the input program 101b and currently executed by the execution processing apparatus 130b will be stopped.

As described, the tampering-prevention-process generation apparatus 110b according to the present embodiment is capable of reliably preventing tampering with a protection target code by adding to the input program 101b the process for calling the protection target code and the judgment/termination process. Furthermore, the tampering-prevention-process generation apparatus 110b according to the present embodiment is capable of reliably preventing tampering with a protection target code of a program even in the case where the program is written in a language such as Java® which does not allow codes in a memory to be read as data during the program execution.

(Embodiment 3)

A processing system 1300 according to Embodiment 3 of the present invention shall be described. The processing system 1300 according to Embodiment 3 obfuscates an input program using a first process instruction group (corresponding to an A instruction group described later) and a second process instruction group (corresponding to a B instruction group and an SUC_B instruction group described later) included in the input program. In Embodiments 1 and 2, the obfuscation is performed in such a mariner that the process result of the first process instruction group is used in the second process instruction group. However, in Embodiment 3, a process result of the A instruction group (the first process instruction group) is not used in the SUC_B instruction group (the second process instruction group). That is to say, in Embodiment 3, the process of the second process instruction group branches, during its course of execution, to the first process instruction group which is inherently unnecessary to be executed, and the first process instruction group takes over the subsequent process of the second process instruction group, thereby complicating the controlling structure.

In Embodiment 3, such input program obfuscation (complication of the controlling structure) enables reliable protection of the A instruction group (the first process instruction group), which is a protection target code, against tampering.

Some of conventionally available techniques for complicating process flows of programs to prevent unauthorized analyses include, as disclosed in a Non-Patent Reference 1 (Chenxi Wang, "A Security Architecture for Survivability Mechanisms", Ph.D. Dissertation (2000)), a technique of replacing a simple, unconditional branch instruction with a conditional branch instruction which does not allow easy identification of a branch destination, and a technique of dividing a program into plural instruction groups to rearrange the order of the instruction groups. Since the result of an unauthorized analysis serves as a clue for the unauthorized tampering performed thereafter, it is valuable to prevent unauthorized operations at the analysis stage. However, even if the obfuscation is performed according to such techniques as mentioned above, the actual operation of the program allows the unauthorized analyzer to find out the execution order and anteroposterior relationships of the instruction groups (a relationship indicating that execution of a PRE_A instruction group is followed by execution of the A instruction group, for example). In view of such a circumstance, in Embodiment 3, the controlling structure is obfuscated so that the execution order of the instruction groups cannot be found out even at the time of the actual program operation.

Hereinafter, the processing system 1300 according to Embodiment 3 shall be described.

Figure 16:
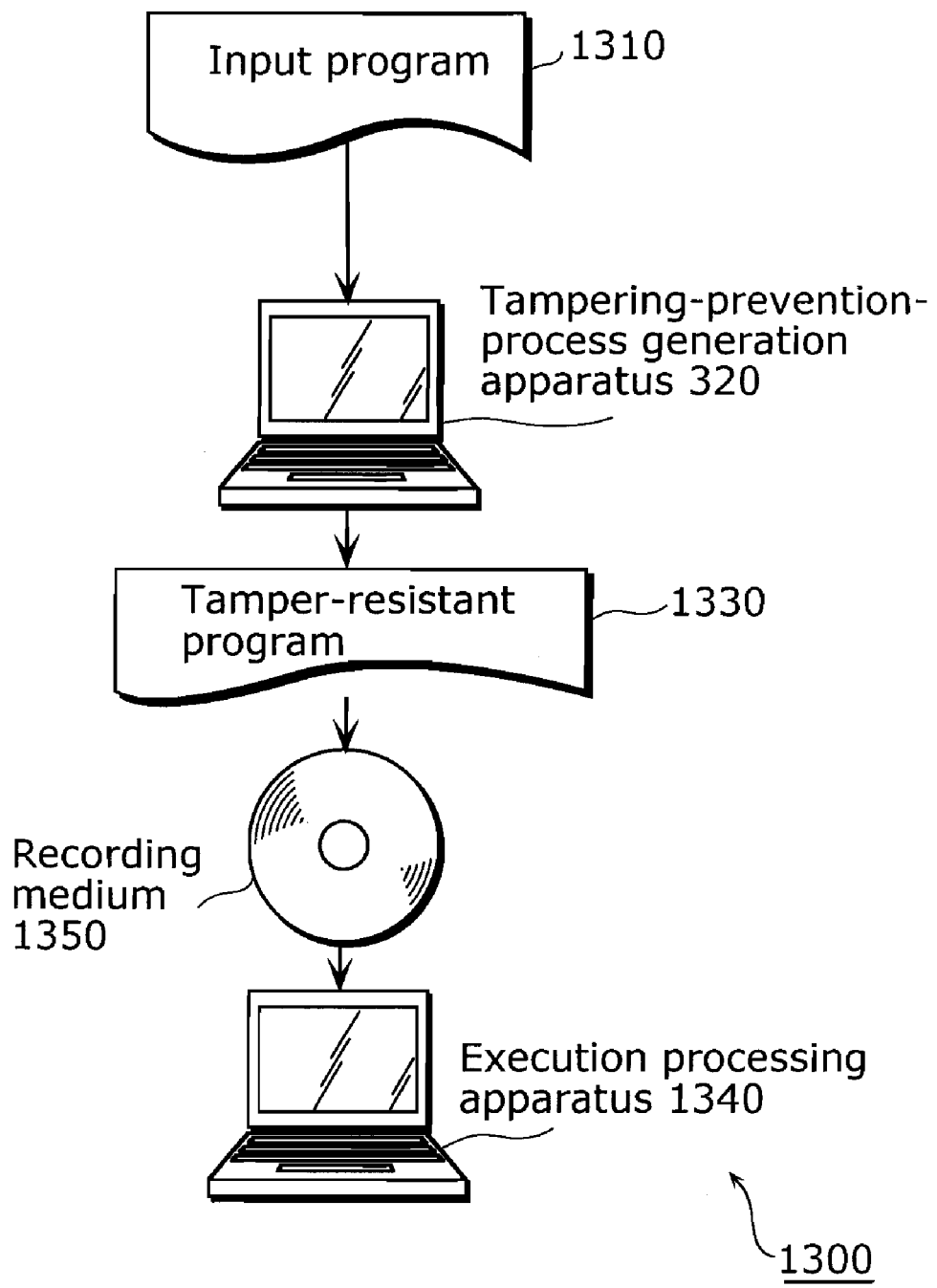
FIG. 16 is a diagram showing the structure of a processing system according to Embodiment 3 of the present invention.

FIG. 16 is a diagram showing the structure of the processing system 1300 according to Embodiment 3.

The processing system 1300 of the present embodiment includes a tampering-prevention-process generation apparatus (instruction generation apparatus) 1320 and an execution processing apparatus 1340.

The tampering-prevention-process generation apparatus 1320 generates a program that reliably protects a protection target code. It obtains and obfuscates an input program 1310 including a protection target code so as to generate a tamper-resistant program 1330.

Further, the tampering-prevention-process generation apparatus 1320 writes the generated tamper-resistant program 1330 on a recording medium 1350.

The execution processing apparatus 1340 reads and executes the tamper-resistant program 1330 recorded on the recording medium 1350.

It is to be noted that instead of writing the tamper-resistant program 1330 on the recording medium 1350, the tampering-prevention-process generation apparatus 1320 may transmit the tamper-resistant program 1330 to the execution processing apparatus 1340 via a communication medium.

As described hereinafter, the input program 1310 includes a PRE_A instruction group containing one or more instructions, an A instruction group executed after the PRE_A instruction group, and a B instruction group.

(1) Structure of the Input Program 1310

Figure 17:
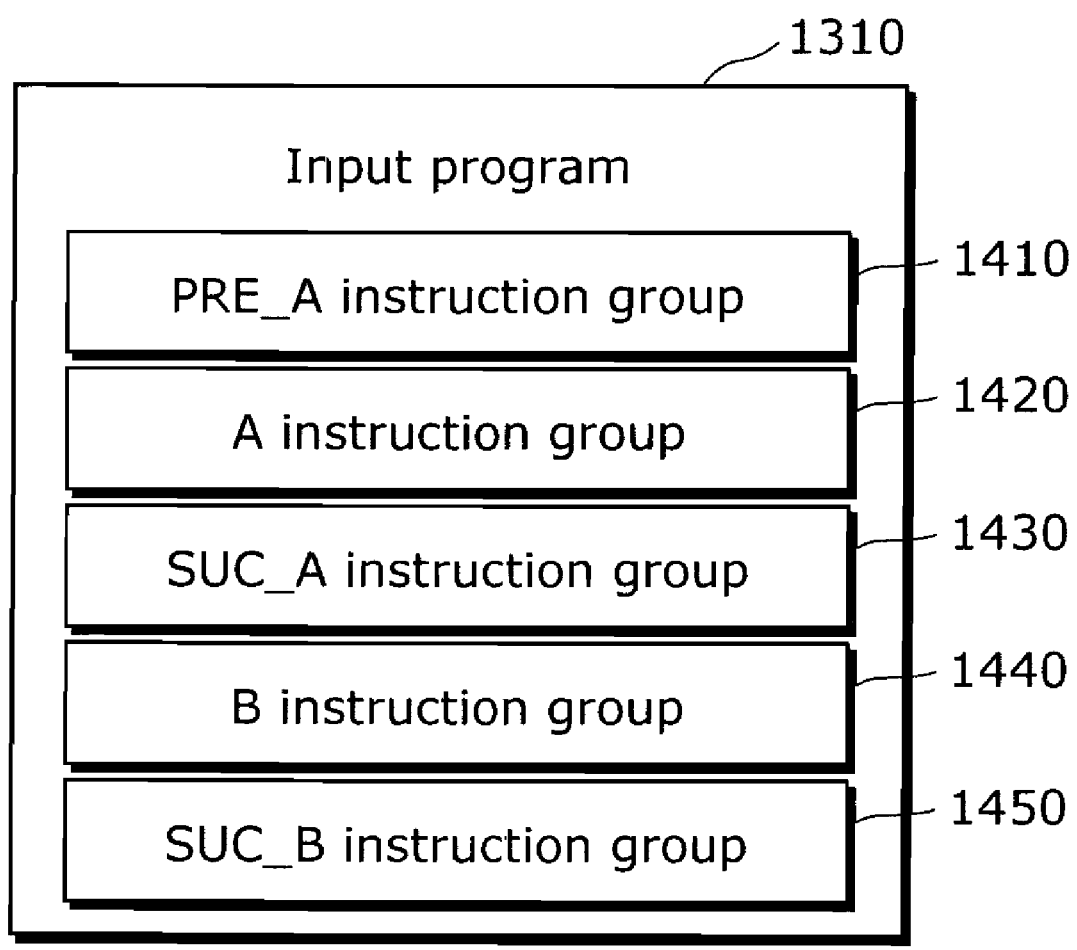
FIG. 17 is a diagram showing the structure of an input program according to Embodiment 3 of the present invention.

FIG. 17 is a diagram showing the structure of the input program 1310.

The input program 1310 includes an A instruction group 1420, a PRE_A instruction group 1410 which is a branch source of the A instruction group 1420, an SUC_A instruction group 1430 which is a branch destination of the A instruction group 1420, a B instruction group 1440, and an SUC_B instruction group 1450 which is a branch destination of the B instruction group 1440.

Here, each of the instruction groups is a set of zero or more instructions. In other words, some of the instruction groups may be nonexistent. For example, in the case where the A instruction group 1420 is at the beginning of the program, the PRE_A instruction group 1410 may be nonexistent. Further, in the case where the A instruction group 1420 is at the end of the program, the SUC_A instruction group 1430 may be nonexistent, and in the case where the B instruction group 1440 is at the end of the program, the SUC_B instruction group 1450 may be nonexistent.

When a Y instruction group is said to be a branch destination of an X instruction group, it means that the Y instruction group is executed after execution of the X instruction group. More specifically, such a relationship applies to cases where the Y instruction group is arranged immediately after the X instruction group, and where the X instruction group includes a branch instruction to branch to the Y instruction group, for example. It is to be noted that even when there is no explicit branch instruction immediately after the X instruction group, the execution of the X instruction group followed by the execution of the Y instruction group in accordance with the program notation is still referred to as "branch". For example, in the C language, instructions in a program are sequentially executed from the top, unless a branch instruction and the like exists. In that case, if the Y instruction group is written below the X instruction group, the Y instruction group is executed after the execution of the X instruction group, and therefore the Y instruction group is said to be a branch destination of the X instruction group. Further, when the X instruction group is said to be a branch source of the Y instruction group, it means that the Y instruction group is the branch destination of the X instruction group.

It is to be noted that specific examples of the branch instruction include a conditional branch instruction, an unconditional branch instruction, a subroutine call, an instruction for generating an exception, and an instruction for generating an interrupt. That is to say, any instructions for switching the execution of an instruction group to another are referred to as the branch instructions of the present Description. In the assembly language, for example, a function call such as "CALL" and "RET", a jump instruction such as "JA", "JMP", and "LOOP", and an interrupt instruction such as "INT" are referred to as the branch instructions.

Figure 18:
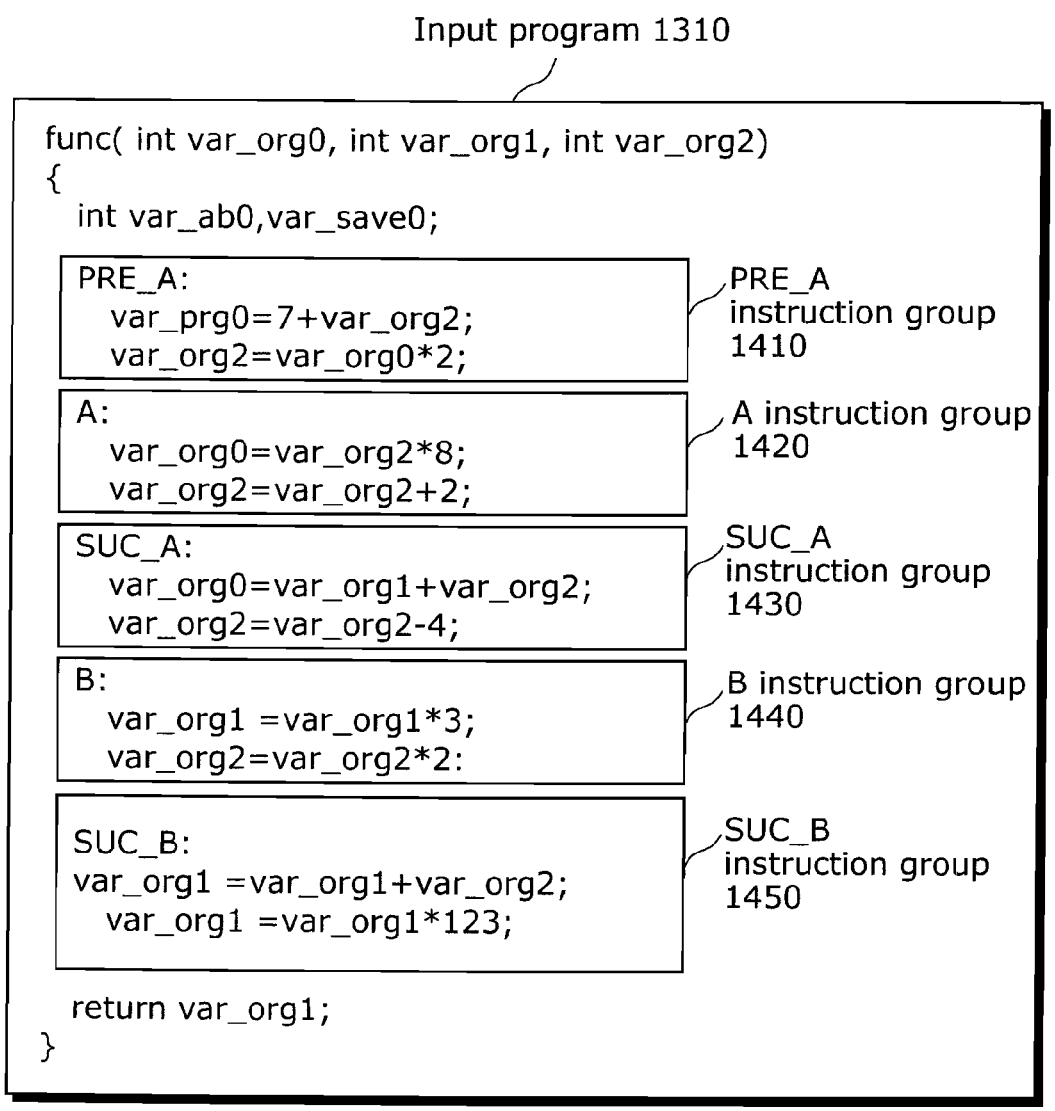
FIG. 18 is a diagram showing a specific example of an input program written in the C language according to Embodiment 3 of the present invention.

FIG. 18 is a diagram showing a specific example of the input program 1310 written in the C language.

The input program 1310 includes the PRE_A instruction group 1410, the A instruction group 1420, the SUC_A instruction group 1430, the B instruction group 1440, and the SUC_B instruction group 1450.

(2) Structure of the Tamper-Resistant Program 1330

The tamper-resistant program 1330 is a program generated through obfuscation of the input program 1310 by the tampering-prevention-process generation apparatus 1320.

Figure 19:
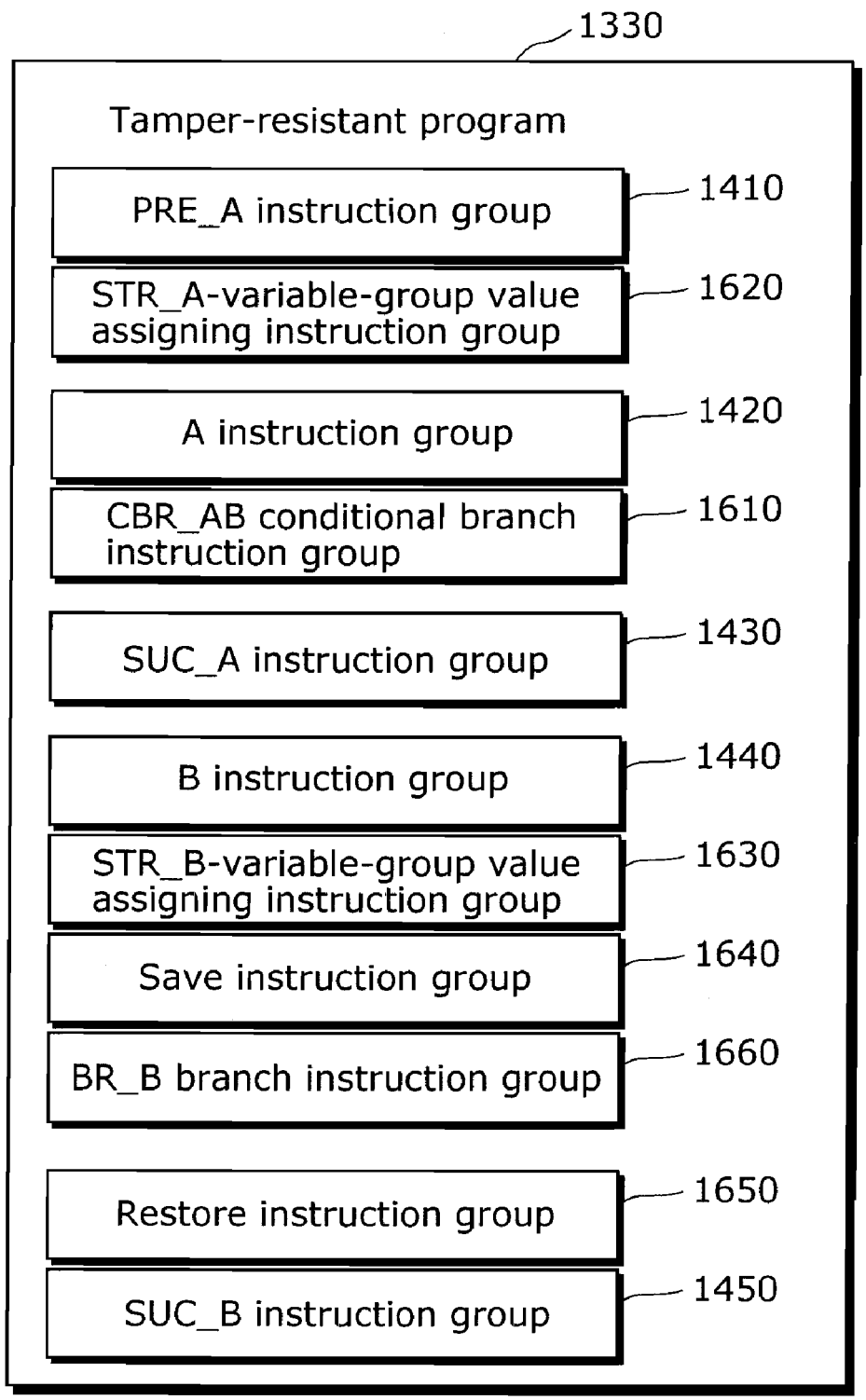
FIG. 19 is a diagram showing the structure of a tamper-resistant program according to Embodiment 3 of the present invention.

FIG. 19 is a diagram showing the structure of the tamper-resistant program 1330.

The tamper-resistant program 1330 includes the PRE_A instruction group 1410, an STR_A-variable-group value assigning instruction group 1620, the A instruction group 1420, a CBR_AB conditional branch instruction group 1610, the SUC_A instruction group 1430, the B instruction group 1440, an STR_B-variable-group value assigning instruction group 1630, a save instruction group 1640, a BR_B branch instruction group 1660, a restore instruction group 1650, and the SUC_B instruction group 1450.

In the input program 1310, the A instruction group 1420 is executed only after the execution of the PRE_A instruction group 1410. However, the input program 1310 is converted into the tamper-resistant program 1330 such that in the tamper-resistant program 1330, the A instruction group 1420 is executed also after the execution of the B instruction group 1440. To be more specific, in the tamper-resistant program 1330, the processes of the instruction groups, namely, the PRE_A instruction group 1410, the A instruction group 1420, and the SUC_A instruction group 1430, are executed in this order in some cases, yet in other cases, the processes of the instruction groups, namely, the B instruction group 1440, the A instruction group 1420, and the SUC_B instruction group 1450 are executed in this order. That is to say, there is an interrupt of the A instruction group 1420 between the B instruction group 1440 and the SUC_B instruction group 1450 in some cases.

FIG. 20 is a diagram showing a specific example of the tamper-resistant program 1330 written in the C language.

The tamper-resistant program 1330 includes the following elements as well as the elements included in the input program 1310. The following elements are added to the input program 1310 by the tampering-prevention-process generation apparatus 1320. The addition process shall be described in detail later.

The BR_B branch instruction group 1660 is a branch instruction to execute the A instruction group 1420 after the B instruction group 1440.

The CBR_AB conditional branch instruction group 1610 is an instruction group for determining an appropriate branch destination and then causing the process to branch to the determined branch destination after the execution of the A instruction group 1420. In the input program 1310, the execution of the A instruction group 1420 is invariably followed by the SUC_A instruction group 1430, whereas in the tamper-resistant program 1330, it is followed by either the SUC_A instruction group 1430 or the SUC_B instruction group 1450, depending on the case. After the execution of the A instruction group 1420, the CBR_AB conditional branch instruction group 1610 determines which of the SUC_A instruction group 1430 and the SUC_B instruction group 1450 is the appropriate branch destination, and then causes the process to branch to the determined branch destination.

The STR_A-variable-group value assigning instruction group 1620 and the STR_B-variable-group value assigning instruction group 1630 are instruction groups for setting information (in the present embodiment, a value of a variable "var_ab0" described later) used for the determination of the CBR_AB conditional branch instruction group 1610. In the tamper-resistant program 1330, in the case where the execution of the A instruction group 1420 follows the PRE_A instruction group 1410, the instruction group to be executed next is the SUC_A instruction group 1430, whereas in the case where the execution of the A instruction group 1420 follows the B instruction group 1440, the SUC_B instruction group 1450 should be executed next. To assist the determination as to which instruction group should be executed next, the STR_A-variable-group value assigning instruction group 1620 and the STR_B-variable-group value assigning instruction group 1630 leave clues by indicating whether the A instruction group 1420 follows the PRE_A instruction group 1410 or the B instruction group 1440.

The save instruction group 1640 is an instruction group for saving a process result which has already been obtained, in order to prevent the result from being influenced by the execution of subsequent processes. The restore instruction group 1650 is an instruction group for restoring the saved process result.

In the tamper-resistant program 1330, there is an interrupt of the A instruction group 1420 between the B instruction group 1440 and the SUC_B instruction group 1450. Therefore, it is necessary to save an intermediate process result obtained at the end of the execution of the B instruction group 1440 so that the result is not influenced by the process of the A instruction group. This saving process is performed through the save instruction group 1640.

When the process returns to the SUC_B instruction group 1450, the restore instruction group 1650 restores the intermediate process result saved through the save instruction group 1640.

Hereinafter, with reference to FIGS. 19 and 20, each of the instruction groups shall be described in more detail.

(2.1) Save Instruction Group 1640

In order to prevent the process of the A instruction group 1420 that interrupts between the B instruction group 1440 and the SUC_B instruction group 1450 from influencing the processes of the SUC_B instruction group 1450 and the subsequent instruction groups, the save instruction group 1640 causes the process of saving the intermediate result. To be more specific, the save instruction group 1640 is for storing, in a different variable, a value stored in one of the variables that is assigned with a value through the A instruction group 1420 and is referred to for the SUC_B instruction group.

In the input program 1310, there is no other instruction between the B instruction group 1440 and the SUC_B instruction group 1450 onward, and thus the intermediate result obtained from the execution of the instructions up to the B instruction group is carried over to the SUC_B instruction group onward. Here, the obfuscation of the input program 1310 by the tampering-prevention-process generation apparatus 1320 creates an interrupt of the A instruction group 1420 between the B instruction group 1440 and the SUC_B instruction group 1450 onward. At this stage, if the A instruction group 1420 includes an instruction to change the same variable as that to be used in the SUC_B instruction group 1450 onward, the A instruction group 1420 causes rewriting of the above mentioned intermediate result. The occurrence of such an event causes the execution result of the tamper-resistant program 1330 to be different from that of the input program 1310. In order to avoid such a situation, it is necessary to save the intermediate result before the execution of the A instruction group 1420 and restore the saved intermediate result after the execution of the A instruction group 1420.

In the A instruction group 1420 shown in FIG. 20, for example, values are assigned to variables "var_org0" and "var_org1". As for a variable "var_org2", a value is referred to through an instruction "var_org1=var_org1+var_org2;" included in the SUC_B instruction group 1450. Consequently, it is necessary to save the value of "var_org2", that is, the intermediate process result. The save instruction group 1640 causes a process "var_save0=var_org2;" of saving the value stored in "var_org2" in a different variable "var_save0".

In the present embodiment, variable values are taken as an example of what is to be saved. It is to be noted, however, that it is desirable to save, as well as variable values, any information that could be subject to alteration through the A instruction group 1420. Examples of such information include what is recorded on a stack, a register and a cache.

(2.2) Restore Instruction Group 1650

The restore instruction group 1650 is an instruction group for restoring the value saved through the save instruction group 1640 to its original variable after the execution of the A instruction group 1420, which has become, through the obfuscation, an interrupt between the B instruction group 1440 and instructions from the SUC_B instruction group 1450.

More specifically, the restore instruction group 1650 shown in FIG. 20 is represented as a process "var_org2=var_save0;" for storing, in the variable "var_org2", the value saved in the variable "var_save0".

It is to be noted that if the A instruction group does not cause a change to the variables referred to in the SUC_B instruction group 1450 onward, saving these variables is unnecessary, and thus the save instruction group 1640 and the restore instruction group 1650 may be excluded.

(2.3) CBR_AB Conditional Branch Instruction Group 1610

The CBR_AB conditional branch instruction group 1610 is a conditional branch instruction which includes, as the conditional branch destinations, the SUC_A instruction group 1430 and the SUC_B instruction group 1450. It is to be noted that in the case where the tamper-resistant program 1330 includes the restore instruction group 1650, the saved contents need to be restored before executing the SUC_B instruction group 1450 onward. Thus, the restore instruction group 1650 is set as a conditional branch destination instead of the SUC_B instruction group 1450. In FIG. 20, labels "SUC_B" and "SUC_B_" are attached to the SUC_B instruction group 1450 and the restore instruction group 1650, respectively. In the case where the restore instruction group 1650 is present, the CBR_AB conditional branch instruction group 1610 sets the restore instruction group 1650 having the label "SUC_B_" as the branch destination, whereas in the case where the restore instruction group 1650 is not present, the SUC_B instruction group 1450 having the label "SUC_B" is set as the branch destination. An example of the case where the restore instruction group 1650 is not present is a case where there is no intermediate result to be saved.

The tamper-resistant program 1330 exemplified in FIG. 20 includes the restore instruction group 1650. Therefore, the CBR_AB conditional branch instruction group 1610 includes the SUC_A instruction group 1430 and the restore instruction group 1650 as conditional branch destinations, and is represented as a conditional branch instruction "if (var_ab0%2==0) goto SUC_B_;", for which the branch destination is determined based on the value of the variable "var_ab0". Here, the variable "var_ab0" serves as a clue indicating whether the A instruction group 1420 has been executed after the PRE_A instruction group 1410 or the B instruction group 1440, and corresponds to a G_VAL_AB variable group which is described later. In the tamper-resistant program 1330, the CBR_AB conditional branch instruction group 1610 performs control in such a manner that creates both the case where the A instruction group 1420 is followed by the SUC_A instruction group 1430 and the case where the A instruction group 1420 is followed by the restore instruction group 1650 (or the SUC_B instruction group 1450).

It is to be noted that in the present embodiment, the tamper-resistant program 1330 is written in the C language, and thus no explicit instruction is written for branching to the SUC_A instruction group 1430 in the CBR_AB conditional branch instruction group 1610. That is to say, according to the C language notation, when the condition "var_ab0%2==0" in the if statement included in the CBR_AB conditional branch instruction group 1610 is false, the SUC_A instruction group is executed immediately after the CBR_AB conditional branch instruction group 1610, which makes it unnecessary to include an explicit branch instruction to branch to the SUC_A instruction group. In other words, even with the written contents shown in FIG. 20, the CBR_AB conditional branch instruction group 1610 substantially indicates whether the process should branch to the SUC_A instruction group 1430 or to the SUC_B instruction group 1450. It is obvious here that an explicit branch instruction such as "else goto SUC_A;" may be written immediately after the CBR_AB conditional branch instruction group 1610 shown in FIG. 20. Writing such an explicit branch instruction enables appropriate execution of a branch process even when the CBR_AB conditional branch instruction group 1610 and the SUC_A instruction group 1430 are located apart from each other in the program.

(2.4) STR_A-Variable-Group Value Assigning Instruction Group 1620

The STR_A-variable-group value assigning instruction group 1620 is an instruction group for assigning a value to a variable such that the SUC_A instruction group 1430 is determined as the conditional branch destination in the CBR_AB conditional branch instruction group 1610. That is to say, the case where the STR_A-variable-group value assigning instruction group 1620 is executed indicates that the execution of the PRE_A instruction group 1410 is followed by the A instruction group 1420, and that the A instruction group 1420 is followed by the CBR_AB conditional branch instruction group 1610. Thus, in order to provide information about such indication, the STR_A-variable-group value assigning instruction group 1620 leaves a value in the variable. It is to be noted that this variable is hereinafter referred to as a G_VAL_AB variable group. The G_VAL_AB variable group is not limited to a single variable, but may be a set of variables. Further, the G_VAL_AB variable group may be other than a variable explicitly appearing in the program, and may be, for example, a value stored at the top of a stack. That is to say, it may be any instruction group as long as it performs a process for leaving a determination clue. The G_VAL_AB variable group is used for determining which instruction the CBR_AB conditional branch instruction group 1610 should branch to. In the specific example shown in FIG. 20, the G_VAL_AB variable group corresponds to the variable "var_ab0".

In the specific example shown in FIG. 20, the STR_A-variable-group value assigning instruction group 1620 corresponds to an instruction group "var_ab0=1;" for assigning a value to "var_ab0" such that the condition "var_ab0%2==0" in the if statement included in the CBR_AB conditional branch instruction group 1610 becomes false. As mentioned in the description of the CBR_AB conditional branch instruction group 1610, when the condition "var_ab0%2==0" is false, the CBR_AB conditional branch instruction group 1610 causes a branch to the SUC_A instruction group 1430. That is to say, the tamper-resistant program 1330 employs the STR_A-variable-group value assigning instruction group 1620 so that the SUC_A instruction group 1430 (not the SUC_B instruction group 1450) will be executed after the A instruction group 1420 that is executed after the PRE_A instruction group 1410.

(2.5) STR_B-Variable-Group Value Assigning Instruction Group 1630

The STR_B-variable-group value assigning instruction group 1630 is an instruction group for assigning a value to a variable included in the G_VAL_AB variable group such that the SUC_B instruction group 1450 is determined as the conditional branch destination in the above described CBR_AB conditional branch instruction group 1610. That is to say, the case where the STR_B-variable-group value assigning instruction group 1630 is executed indicates that the execution of the B instruction group 1440 is followed by the A instruction group 1420, and that the A instruction group 1420 is followed by the CBR_AB conditional branch instruction group 1610. Thus, in order to provide information about such indication, the STR_B-variable-group value assigning instruction group 1630 leaves a value in the variable. Similarly to the STR_A-variable-group value assigning instruction group 1620, the STR_B-variable-group value assigning instruction group 1630 may employ plural variables or employ something other than variables.

In the specific example shown in FIG. 20, the STR_B-variable-group value assigning instruction group 1630 corresponds to an instruction group "var_ab0=8;" for assigning a value to "var_ab0" such that the condition "var_ab0%2==0" in the if statement included in the CBR_AB conditional branch instruction group 1610 becomes true. Here, when the condition "var_ab0%2==0" is true, the judgment result of the if statement included in the CBR_AB conditional branch instruction group 1610 becomes true and thus "goto SUC_B_;" is executed. As a result, the process for branching to the restore instruction group 1650 is executed. That is to say, the tamper-resistant program 1330 employs the STR_B-variable-group value assigning instruction group 1630 so that the restore instruction group 1650 (not the SUC_A instruction group 1430) will be executed after the respective processes of the B instruction group 1440, the save instruction group 1640, and the A instruction group 1420 are performed in this order.

It is to be noted that when the restore instruction group 1650 is not present, the STR_B-variable-group value assigning instruction group 1630 serves as an instruction group for setting a value to a variable such that the B instruction group 1440 will be followed by the A instruction group 1420, and that the A instruction group 1420 will be followed by the SUC_B instruction group 1450.

(2.6) BR_B Branch Instruction Group 1660

The BR_B branch instruction group 1660 shown in FIG. 20 is an instruction for causing a branch from the B instruction group 1440 to the A instruction group 1420. In the case where the tamper-resistant program 1330 includes the save instruction group 1640, however, it is necessary to save an intermediate result before branching to the A instruction group 1420, and thus the BR_B branch instruction group 1660 serves as an instruction group for causing a branch to the A instruction group 1420 after the process of the save instruction group 1640 is finished.

The tamper-resistant program 1330 exemplified in FIG. 20 includes the save instruction group 1640, and thus the BR_B branch instruction group 1660 is represented as a branch instruction group "goto A;" for causing a branch to the A instruction group 1420 after the process of the save instruction group 1640 is finished.

(2.7) Process Flow of the Tamper-Resistant Program 1330

To describe the process flow of the tamper-resistant program 1330 according to the present embodiment in comparison with that of the input program 1310, the process flow of the input program 1310 shall be described first.

FIG. 21 is a diagram showing a process flow of the input program 1310.

As apparent from FIG. 21, the input program 1310 is a simple program having no branches. In executing the input program 1310, the execution processing apparatus 1340 first executes the PRE_A instruction group 1410 (Step S200), and then the A instruction group 1420 (Step S202). Subsequently, the execution processing apparatus 1340 executes the SUC_A instruction group 1430 (Step S204), the B instruction group 1440 (Step S206), and then the SUC_B instruction group 1450 (Step S208).

Figure 22:
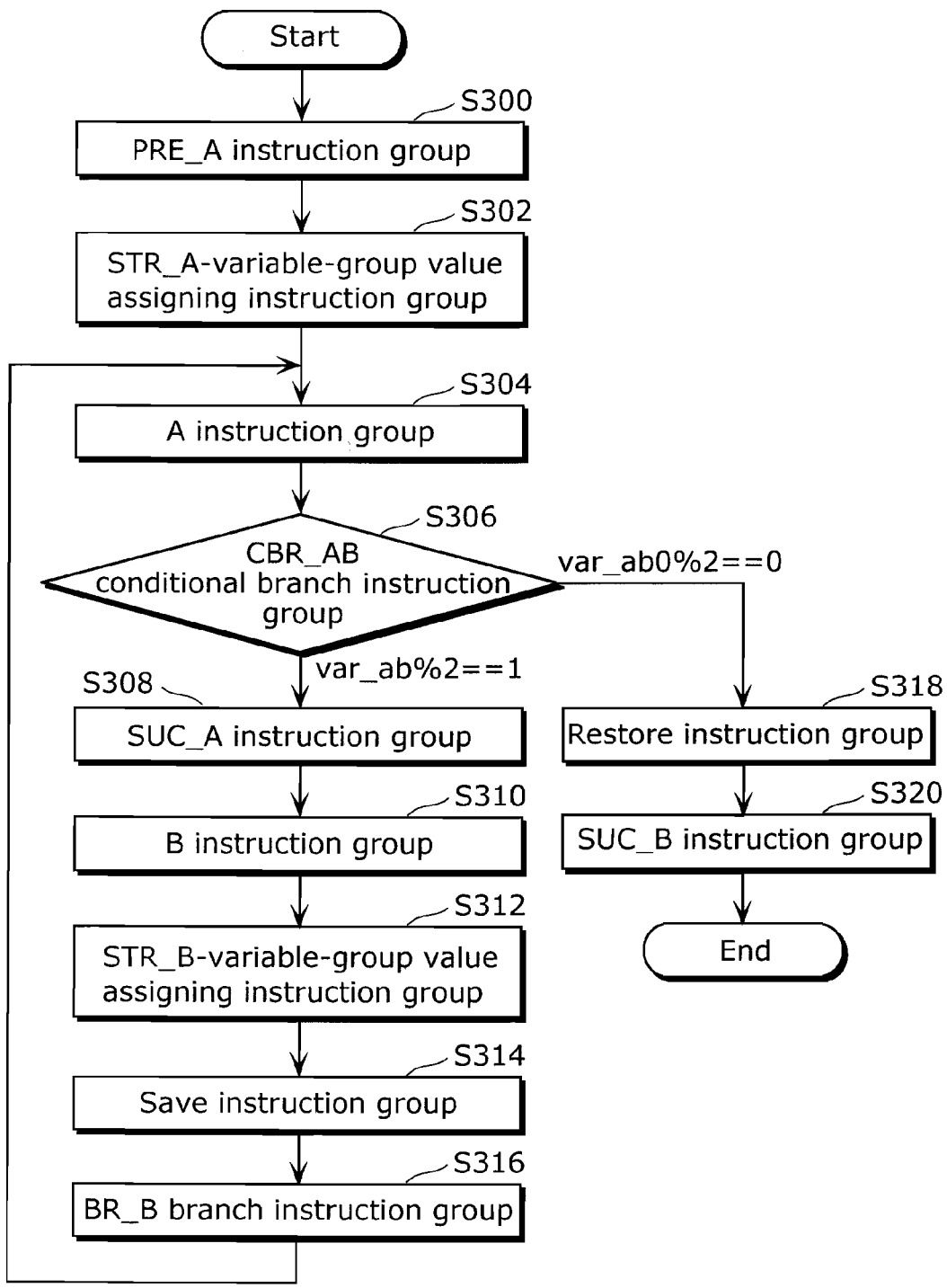
FIG. 22 is a diagram showing a process flow of a tamper-resistant program according to Embodiment 3 of the present invention.

FIG. 22 is a diagram showing a process flow of the tamper-resistant program 1330.

As apparent from FIG. 22, the tamper-resistant program 1330 includes a branch and a confluence. In executing the tamper-resistant program 1330, the execution processing apparatus 1340 first executes the PRE_A instruction group 1410 (Step S300), and then the STR_A-variable-group value assigning instruction group 1620 (Step S302), followed by the A instruction group 1420 (Step S304). Here, the execution processing apparatus 1340 assigns a value "1" to the variable "var_ab0" by executing the STR_A-variable-group value assigning instruction group 1620 in Step S302.

Then, by executing the CBR_AB conditional branch instruction group 1610, the execution processing apparatus 1340 judges whether or not the variable "var_ab0" satisfies "var_ab0%2==0" (Step S306). Here, since the value "1" is assigned to the variable "var_ab0" in Step S302, the execution processing apparatus 1340 judges that the variable "var_ab0" does not satisfy "var_ab0%2==0" ("var_ab0%2==1" in Step S306). As a result, the execution processing apparatus 1340 executes the SUC_A instruction group 1430 (Step S308), and then the B instruction group 1440 (Step S310), followed by the STR_B-variable-group value assigning instruction group 1630 (Step S312). Here, when executing the STR_B-variable-group value assigning instruction group 1630 in Step S312, the execution processing apparatus 1340 assigns a value "8" to the variable "var_ab0".

Then, after executing the save instruction group 1640 (Step S314) and the BR_B branch instruction group 1660 (Step S316), the execution processing apparatus 1340 executes the A instruction group 1420 again (Step S304).

Then, by executing the CBR_AB conditional branch instruction group 1610 again, the execution processing apparatus 1340 judges whether or not the variable "var_ab0" satisfies "var_ab0%2==0" (Step S306). Here, since the value "8" is assigned to the variable "var_ab0" in Step S312, the execution processing apparatus 1340 judges that the variable "var_ab0" satisfies "var_ab0%2==0" ("var_ab0%2==0" in Step S306).

As a result, the execution processing apparatus 1340 executes the restore instruction group 1650 (Step S318) and then the SUC_B instruction group 1450 (Step S320).

In such a manner, the A instruction group 1420 is executed after the STR_A-variable-group value assigning instruction group 1620 and also after the BR_B branch instruction group 1660. That is to say, in the input program 1310, the execution processing apparatus 1340 executes the A instruction group 1420 only once, whereas in the tamper-resistant program 1330, the execution processing apparatus 1340 executes the A instruction group 1420 twice. Consequently, the order in which the instruction groups are executed is different between the case where the execution processing apparatus 1340 executes the tamper-resistant program 1330 and the case where the execution processing apparatus 1340 executes the input program 1310, that is, a pre-obfuscation program.

(2.8) Advantageous Effects of the Tamper-Resistant Program 1330

As shown in FIGS. 21 and 22, the execution order of the tamper-resistant program 1330 analyzed by an unauthorized analyzer is different from the execution order of the input program 1310, and therefore, even if the unauthorized analyzer is able to analyze the execution order of the tamper-resistant program 1330, he or she would not be able to easily analyze the execution order of the pre-obfuscation input program. Thus, the analysis becomes difficult. Further, since the execution order of the tamper-resistant program 1330 is more complicated than that of the input program 1310, the analysis and tampering become difficult. As a result, the A instruction group 1420, the protection target code, can be reliably protected.

If the unauthorized analyzer finds a redundant process added for the purpose of the obfuscation, he or she may make an attack by skipping or deleting the redundant process. The redundant process in the present embodiment is the execution of the A instruction group 1420 following the BR_B branch instruction group 1660, and thus the unauthorized analyzer may find this out and attempt to delete the A instruction group 1420. However, in the tamper-resistant program 1330 of the present embodiment, the A instruction group 1420 is not merely a redundant process, but is a process necessary for the pre-obfuscation program (the input program 1310). Therefore, deletion of the A instruction group 1420 results in a situation where the process employing the A instruction group 1420 in the pre-obfuscation program will no longer be executed. As a consequence, the whole process result of the tamper-resistant program 1330 and that of the input program 1310 no longer match each other. In other words, the unauthorized analyzer deletes even the necessary process. Thus, it becomes difficult for the unauthorized analyzer to tamper with the tamper-resistant program 1330 through such an attack.

There may also be a case where the unauthorized analyzer knows the controlling structure of a specific part of the program, and with this knowledge makes an attack of finding that specific part (an example of the controlling structure is a commonly-known cryptographic algorithm). In addition, there may be a case where the program subject to the obfuscation (the input program 1310) handles confidential information, and the unauthorized analyzer having knowledge of a specific operation included in the program makes an attack of finding that specific operation to access the confidential information. However, the controlling structure of the tamper-resistant program 1330 according to the present embodiment is different from the controlling structure known by the unauthorized analyzer, and thus it is difficult to analyze the controlling structure of the tamper-resistant program 1330 based on the one known by the unauthorized analyzer.

(3) Structure of the Tampering-Prevention-Process Generation Apparatus 1320

Hereinafter, the tampering-prevention-process generation apparatus 1320 shall be described. The tampering-prevention-process generation apparatus 1320 obfuscates the input program 1310 to generate the tamper-resistant program 1330.

Figure 23:
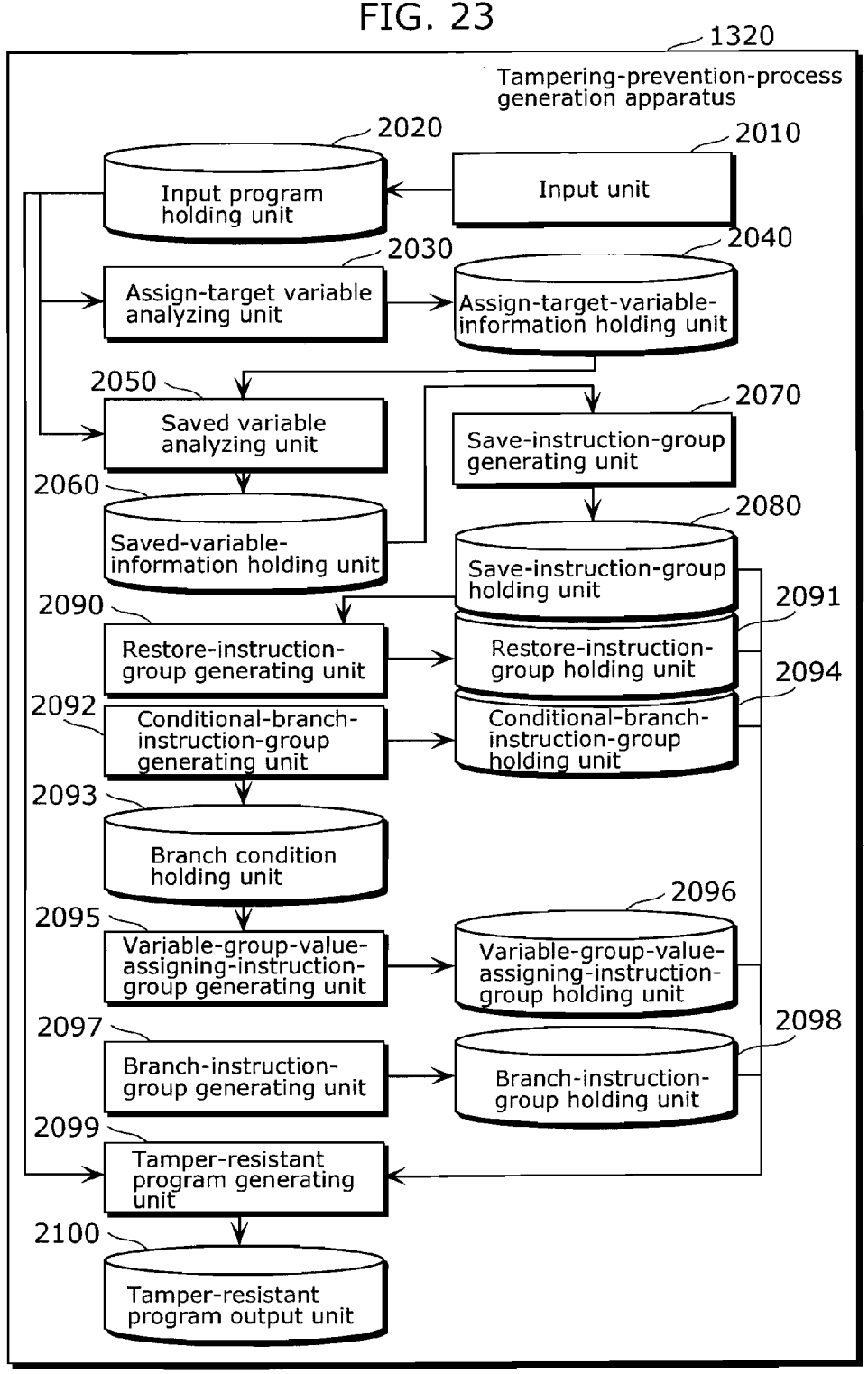
FIG. 23 is a diagram showing the structure of a tampering-prevention-process generation apparatus according to Embodiment 3 of the present invention.

FIG. 23 is a diagram showing the structure of the tampering-prevention-process generation apparatus 1320.

The tampering-prevention-process generation apparatus 1320 includes an input unit 2010, an input program holding unit 2020, an assign-target variable analyzing unit 2030, an assign-target-variable-information holding unit 2040, a saved variable analyzing unit 2050, a saved-variable-information holding unit 2060, a save-instruction-group generating unit 2070, a save-instruction-group holding unit 2080, a restore-instruction-group generating unit 2090, a restore-instruction-group holding unit 2091, a conditional-branch-instruction-group generating unit 2092, a branch condition holding unit 2093, a conditional-branch-instruction-group holding unit 2094, a variable-group-value-assigning-instruction-group generating unit 2095, a variable-group-value-assigning-instruction-group holding unit 2096, a branch-instruction-group generating unit 2097, a branch-instruction-group holding unit 2098, a tamper-resistant program generating unit 2099, and a tamper-resistant program output unit 2100.

The input unit 2010 receives an input program 1310 (e.g. the program shown in FIG. 18) which includes the A instruction group 1420 having the SUC_A instruction group 1430 as the branch destination, the PRE_A instruction group 1410 having the A instruction group 1420 as the branch destination, and the B instruction group 1440 having the SUC_B instruction group 1450 as the branch destination.

The input program holding unit 2020 holds the input program 1310 received by the input unit 2010.

The assign-target variable analyzing unit 2030 analyzes (identifies) a variable (assign-target variable) to which a value is to be assigned, from among variables contained in the A instruction group 1420 which is included in the input program 1310 held by the input program holding unit 2020.

The assign-target-variable-information holding unit 2040 holds information such as the name of the assign-target variable identified through the analysis by the assign-target variable analyzing unit 2030.

The saved variable analyzing unit 2050 analyzes (identifies) a variable (referenced variable) a value of which is referred to, from among variables included in the SUC_B instruction group 1450. The saved variable analyzing unit 2050 also identifies a variable which serves as an assign-target variable held by the assign-target-variable-information holding unit 2040 and also as a referenced variable (hereinafter referred to as a saved variable).

The saved-variable-information holding unit 2060 holds information such as the name of the saved variable identified by the saved variable analyzing unit 2050.

The save-instruction-group generating unit 2070 generates a save instruction group 1640 which is an instruction group for saving in a saving variable (e.g. the variable "var_save0" in the present embodiment) a value held by the saved variable.

The save-instruction-group holding unit 2080 holds the save instruction group 1640 generated by the save-instruction-group generating unit 2070.

The restore-instruction-group generating unit 2090 generates a restore instruction group 1650 which is an instruction group for restoring the value saved in the saving variable to the saved variable.

The restore-instruction-group holding unit 2091 holds the restore instruction group 1650 generated by the restore-instruction-group generating unit 2090.

The conditional-branch-instruction-group generating unit 2092 generates a CBR_AB conditional branch instruction group 1610 which is an instruction group for determining a branch destination from among conditional branch destinations including the SUC_A instruction group 1430 and the SUC_B instruction group 1450, based on a value of the G_VAL_AB variable group (e.g. the variable "var_ab0" in the present embodiment), which is a variable used for determining a branch destination (a branch destination determining variable).

The branch condition holding unit 2093 holds a set of values to be taken by the branch destination determining variable for satisfying a condition that allows the CBR_AB conditional branch instruction group 1610 to branch to the SUC_A instruction group 1430, and a set of values to be taken by the branch destination determining variable for satisfying a condition that allows the CBR_AB conditional branch instruction group 1610 to branch to the SUC_B instruction group 1450.

The conditional-branch-instruction-group holding unit 2094 holds the CBR_AB conditional branch instruction group 1610 generated by the conditional-branch-instruction-group generating unit 2092.

The variable-group-value-assigning-instruction-group generating unit 2095 generates an instruction group for assigning, to the G_VAL_AB variable group (e.g. the variable "var_ab0" in the present embodiment), a value that satisfies the condition that allows the SUC_A instruction group 1430 to be the branch destination, and an instruction group for assigning, to the G_VAL_AB variable group, a value that satisfies the condition that allows the SUC_B instruction group 1450 to be the branch destination.

The variable-group-value-assigning-instruction-group holding unit 2096 holds the instruction groups generated by the variable-group-value-assigning-instruction-group generating unit 2095.

The branch-instruction-group generating unit 2097 generates a BR_B branch instruction group 1660 for performing control in such a manner that the A instruction group 1420 is executed after the B instruction group 1440.

The branch-instruction-group holding unit 2098 holds the BR_B branch instruction group 1660 generated by the branch-instruction-group generating unit 2097.

The tamper-resistant program generating unit 2099 generates a tamper-resistant program 1330 using the input program 1310 held by the input program holding unit 2020 and the instruction groups held by each of the instruction group holding units.

The tamper-resistant program output unit 2100 records on the recording medium 1350 the tamper-resistant program 1330 generated by the tamper-resistant program generating unit 2099.

Hereinafter, operations of each of the structural elements shall be described in more detail. Also, to provide a specific example, operations shall be described which are performed when the tampering-prevention-process generation apparatus 1320 receives the input program 1310 shown in FIG. 18.

(3.1) Input Unit 2010

The input unit 2010 receives the input program 1310. As mentioned above in describing the structure of the input program 1310, the input program 1310 includes the A instruction group 1420, the PRE_A instruction group 1410, the SUC_A instruction group 1430, the B instruction group 1440, and the SUC_B instruction group 1450. The input unit 2010 also receives specification regarding which part of the input program 1310 is the A instruction group 1420, the PRE_A instruction group 1410, the SUC_A instruction group 1430, the B instruction group 1440, or the SUC_B instruction group 1450.

(3.2) Input Program Holding Unit 2020

The input program holding unit 2020 has a region for storing an instruction group. The input program holding unit 2020 holds the input program 1310 received by the input unit 2010.

(3.3) Assign-Target Variable Analyzing Unit 2030

The assign-target variable analyzing unit 2030 analyzes (identifies) a storing location at which some kind of process result is to be stored through the A instruction group 1420 included in the input program 1310 held by the input program holding unit 2020.

More specifically, in the case where the A instruction group 1420 includes a process for assigning a value of a variable, for example, the assign-target variable analyzing unit 2030 analyzes (identifies) the name, type and so on of the variable. Further, in the case where the A instruction group 1420 includes a process for specifying a relative value from a stack pointer and storing the value on a stack, for example, the assign-target variable analyzing unit 2030 analyzes (identifies) the stack pointer, the stack size, and the relative value specified from the stack pointer. Further, in the case where the A instruction group 1420 includes a process for storing a value at a location designated by an address variable, for example, the assign-target variable analyzing unit 2030 analyzes (identifies) the address at which the value is to be stored. In the following description, the pieces of information about storing locations at which some kind of process result of the A instruction group 1420 is to be stored, are collectively referred to as "assign-target variable information". It is to be noted that in the present embodiment, any information about a storing location at which some kind of process result is to be stored is referred to as assign-target variable information, even in the case where the information is not a variable that appears directly in the A instruction group 1420. For example, in the case where a stack or the like is embodied as an OS function, the stack pointer and the stack size may not explicitly appear in the A instruction group 1420, but such values are also referred to as the assign-target variable information.

Next, the assign-target variable analyzing unit 2030 stores in the assign-target-variable-information holding unit 2040 the assign-target variable information obtained through the analysis. For example, when the A instruction group 1420 shown in FIG. 18 is the target of the analysis, the assign-target variable analyzing unit 2030 identifies "int var_org0" and "int var_org2" as the respective names and types of the variables "var_org0" and "var_org2", to which values are to be assigned, and stores the identified names and types in the assign-target-variable-information holding unit 2040.

It is assumed in the present embodiment that the range of the A instruction group 1420 in the input program 1310 starts from a label "A:" up to another label appearing next. Similarly, the ranges of the PRE_A instruction group 1410, the SUC_A instruction group 1430, the B instruction group 1440, and the SUC_B instruction group 1450 are assumed to start from some kind of label up to another label appearing next.

The labels may be given through user specification via the input unit 2010, or may be labels that are originally attached to the input program 1310.

(3.4) Assign-Target-Variable-Information Holding Unit 2040

The assign-target-variable-information holding unit 2040 stores the assign-target variable information for the A instruction group 1420, obtained through the analysis by the assign-target variable analyzing unit 2030. When there is a plurality of assign-target variables, the assign-target variable information is stored for each of the assign-target variables.

In the present embodiment, when the A instruction group 1420 shown in FIG. 18 is the target of the analysis by the assign-target variable analyzing unit 2030, the assign-target-variable-information holding unit 2040 stores "int var_org0" and "int var_org2", which are the respective names and types of the assign-target variables.

(3.5) Saved Variable Analyzing Unit 2050

The saved variable analyzing unit 2050 analyzes (identifies) a variable which influences a process result of the SUC_B instruction group 1450 onward and which has a value to be changed through the A process instruction group. As with the target of the analysis by the assign-target variable analyzing unit 2030, the target of the analysis by the saved variable analyzing unit 2050 may be other than a variable that directly appears in the A instruction group 1420. As described above, a failure to analyze such a variable and to save its value results in a situation where the execution of the A process instruction group prior to the SUC_B instruction group 1450 causes the process result of the tamper-resistant program 1330 to be different from that of the input program 1310.

First, the saved variable analyzing unit 2050 identifies variables necessary for executing the SUC_B instruction group 1450 and the instructions executed after the SUC_B instruction group 1450 that are included in the input program 1310 held by the input program holding unit 2020. Here, the variable necessary for executing these instructions is a variable whose value obtained from the execution of the B instruction group 1440 is used for the SUC_B instruction group 1450 onward, that is, a variable which influences the process result of the SUC_B instruction group 1450 onward. To be more specific, the necessary variable is a variable to which a value is assigned by the time the B instruction group 1440 is executed, and which appears at the right-hand side of an assignment expression included in the SUC_B instruction group 1450 onward.

Next, when there is a variable, among the identified variables, which is held by the assign-target-variable-information holding unit 2040, the saved variable analyzing unit 2050 sets that variable as a saved variable and stores in the saved-variable-information holding unit 2060 information such as the name of the saved variable. In other words, the saved variable analyzing unit 2050 extracts, as a saving variable, the variable which is necessary for the SUC_B instruction group 1450 onward and to which a value is assigned through the A instruction group 1420.

More specifically, in the case where the SUC_B instruction group 1450 is an instruction group that includes a process for referring to a variable, the saved variable analyzing unit 2050 analyzes (identifies) the name and/or type of that variable. Further, in the case where the SUC_B instruction group 1450 is an instruction group that includes a process for referring to a value stored on a stack, for example, the saved variable analyzing unit 2050 analyzes (identifies) the size of the stack referred to. Furthermore, in the case where the SUC_B instruction group 1450 is an instruction group that includes a process for referring to a value stored at a location designated by an address variable, for example, the saved variable analyzing unit 2050 analyzes (identifies) the address variable and/or the type of the value stored. In the following description, the pieces of information related to parameters and variables necessary for executing the SUC_B instruction group 1450 are collectively referred to as "referenced variable information", and the parameters and the variables are referred to as "referenced variables".

Next, when there is a variable, among the referenced variables, which is held by the assign-target-variable-information holding unit 2040, the saved variable analyzing unit 2050 sets that variable as a saved variable and stores in the saved-variable-information holding unit 2060 information such as the name of the saved variable.

For example, in the case of the SUC_B instruction group 1450 shown in FIG. 18, values of the variables "var_org1" and "var_org2" in "var_org1=var_org1+var_org2; var_org1=var_org1*123;" are referred to. Therefore, the saved variable analyzing unit 2050 sets the variables "var_org1" and "var_org2" as referenced variables, and "int var_org1" and "int var_org2" as the referenced variable information. Among these pieces of the referenced variable information, "int var_org1" is not held by the assign-target-variable-information holding unit 2040 whereas "int var_org2" is. Therefore, the variable "var_org2", whose referenced variable information "int var_org2" is held, is the variable that influences the process result of the SUC_B instruction group 1450 and has a value to be changed through the A instruction group 1420. Consequently, the value of the variable "var_org2" needs to be saved prior to the execution of the A instruction group 1420, and be restored prior to the execution of the SUC_B instruction group 1450. The saved variable analyzing unit 2050 sets "int var_org2" as the referenced variable information, and stores the same in the saved-variable-information holding unit 2060.

It is to be noted that the process performed by the saved variable analyzing unit 2050 is not limited to the above described process, as long as the variable to be extracted is a variable that influences the process result of the SUC_B instruction group 1450 and has a value to be changed through the A instruction group 1420. For example, the saved variable analyzing unit 2050 may extract a variable held by the assign-target-variable-information holding unit 2040, and check whether this value is included in the SUC_B instruction group 1450 onward. Further, the saved variable analyzing unit 2050 may directly extract, from the input program 1310 held by the input program holding unit 2020, a variable whose value is to be changed through the A instruction group 1420, without using the assign-target-variable-information holding unit 2040.

(3.6) Saved-Variable-Information Holding Unit 2060

The saved-variable-information holding unit 2060 has a region for storing saved variable information.

The saved-variable-information holding unit 2060 stores saved variable information which is obtained through the analysis performed by the saved variable analyzing unit 2050. It is to be noted that when there is a plurality of saved variables, the saved-variable-information holding unit 2060 stores saved variable information for each of the saved variables.

More specifically, in the case of the SUC_B instruction group 1450 shown in FIG. 18, the saved-variable-information holding unit 2060 stores the name and type "int var_org2" of the saved variable.

(3.7) Save-Instruction-Group Generating Unit 2070

The save-instruction-group generating unit 2070 generates a save instruction group 1640 for saving a value of the saved variable information, and stores the generated save instruction group in the save-instruction-group holding unit 2080. To be more specific, the following processes are performed:

A) The save-instruction-group generating unit 2070 determines the way in which a value of a saved variable should be stored. More specifically, it determines in which variable a value of a saved variable should be stored. In the present embodiment, the save-instruction-group generating unit 2070 creates a new variable as a saving location for the saved variable, and saves the value of the saved variable in that variable.

B) In accordance with the determined way of saving the saved variable, the save-instruction-group generating unit 2070 generates a save instruction group 1640, which is an instruction group for saving the saved variable value.

C) The save-instruction-group generating unit 2070 stores the generated save instruction group 1640 in the save-instruction-group holding unit 2080.

Hereinafter, a description shall be provided of an example of specific operations performed by the save-instruction-group generating unit 2070 when the tampering-prevention-process generation apparatus 1320 receives the input program 1310 shown in FIG. 18.

A) The save-instruction-group generating unit 2070 obtains the saved variable information from the saved-variable-information holding unit 2060, and checks the number of saved variables. In this example, "int var_org2" is the only saved variable. The save-instruction-group generating unit 2070 newly creates as many saving variables as the saved variables, and determines the created saving variable "int var_save0" as a variable used for the saving process.

B) The save-instruction-group generating unit 2070 generates a save instruction group 1640 for saving the value of the saved variable in the saving variable. In this example, the save-instruction-group generating unit 2070 generates an instruction "var_save0=var_org2;". It is to be noted that when there is a plurality of saved variables, the save-instruction-group generating unit 2070 generates a save instruction group for each of the saved variables. Further, instead of saving the saved variable itself for the save instruction group, a conversion such as encryption may be performed on the saved variable before saving. In the present embodiment, conversion refers to the saving of the saved variable after conversion and refers also to the saving of the saved variable without conversion.

C) The save-instruction-group generating unit 2070 stores the generated save instruction group 1640 in the save-instruction-group holding unit 2080. In this example, "var_save0=var_org2;" is stored.

(3.8) Save-Instruction-Group Holding Unit 2080

The save-instruction-group holding unit 2080 has a region for storing an instruction group. The save-instruction-group holding unit 2080 stores in the storing region the save instruction group 1640 generated by the save-instruction-group generating unit 2070.

In the case where the tampering-prevention-process generation apparatus 1320 receives the input program 1310 shown in FIG. 18, the save instruction group 1640 generated by the save-instruction-group generating unit 2070 is "var_save0=var_org2;", and thus the save-instruction-group holding unit 2080 stores "var_save0=var_org2;".

(3.9) Restore-Instruction-Group Generating Unit 2090

The restore-instruction-group generating unit 2090 generates a restore instruction group 1650 which is an instruction group for restoring the value saved in the saving variable to the saved variable. To be more specific, the following processes are performed:

A) The restore-instruction-group generating unit 2090 obtains the save instruction group 1640 held by the save-instruction-group holding unit 2080.

B) The restore-instruction-group generating unit 2090 generates, as the restore instruction group 1650, an instruction group for inversely performing the conversion performed through the obtained save instruction group 1640.

C) The restore-instruction-group generating unit 2090 stores the restore instruction group 1650 in the restore-instruction-group holding unit 2091.

Hereinafter, a description shall be provided of an example of specific operations performed by the restore-instruction-group generating unit 2090 when the tampering-prevention-process generation apparatus 1320 receives the input program 1310 shown in FIG. 18.

A) The restore-instruction-group generating unit 2090 obtains the save instruction group 1640, "var_save0=var_org2;", held by the save-instruction-group holding unit 2080.

B) The restore-instruction-group generating unit 2090 generates, as the restore instruction group 1650, "var_org2=var_save0;", which is a result obtained through an inverse conversion of "var_save0=var_org2;".

C) The restore-instruction-group generating unit 2090 stores the restore instruction group 1650 "var_org2=var_save0;" in the restore-instruction-group holding unit 2091.

(3.10) Restore-Instruction-Group Holding Unit 2091

The restore-instruction-group holding unit 2091 has a region for storing an instruction group. The restore-instruction-group holding unit 2091 stores in the storing region the restore instruction group 1650 generated by the restore-instruction-group generating unit 2090.

In the above specific example, the restore instruction group 1650 generated by the restore-instruction-group generating unit 2090 is "var_org2=var_save0;", and thus the restore-instruction-group holding unit 2091 stores the generated "var_org2=var_save0;".

(3.11) Conditional-Branch-Instruction-Group Generating Unit 2092

The conditional-branch-instruction-group generating unit 2092 generates a CBR_AB conditional branch instruction group 1610 for determining a branch destination from among conditional branch destinations including the SUC_A instruction group 1430 and the SUC_B instruction group 1450, based on a value of the G_VAL_AB variable (the variable "var_ab0"), which is a branch destination determining variable. It is to be noted that in the case where the restore instruction group 1650 is present, the conditional-branch-instruction-group generating unit 2092 generates a CBR_AB conditional branch instruction group 1610 which includes, as a branch destination, the restore instruction group 1650 instead of the SUC_B instruction group 1450.

To be more specific, the following processes are performed:

A) The conditional-branch-instruction-group generating unit 2092 determines a variable used for determining a branch destination. In the present embodiment, a variable is newly created as the branch destination determining variable.

B) The conditional-branch-instruction-group generating unit 2092 determines which value of the branch destination determining variable should cause the SUC_A instruction group 1430 to be the branch destination. Moreover, the conditional-branch-instruction-group generating unit 2092 determines which value of the branch destination determining variable should cause the SUC_B instruction group 1450 to be the branch destination. Specific examples of the condition for the branch destination determination include: a match between the variable value and a predetermined value; the variable value being greater than a predetermined value; and a match between a predetermined value and a value obtained through some kind of conversion performed on the variable value.

C) The conditional-branch-instruction-group generating unit 2092 stores in the branch condition holding unit 2093 a set of the values of the branch destination determining variable which are determined in the above process B) as values that cause the SUC_A instruction group 1430 to be the branch destination. The conditional-branch-instruction-group generating unit 2092 also stores in the branch condition holding unit 2093 a set of the values of the branch destination determining variable which are determined in the above process B) as values that cause the SUC_B instruction group 1450 to be the branch destination.

D) In the case where the restore instruction group 1650 is held by the restore-instruction-group holding unit 2091, the conditional-branch-instruction-group generating unit 2092 generates a CBR_AB conditional branch instruction group 1610 for setting the SUC_A instruction group 1430 or the restore instruction group 1650 as the conditional branch destination. In the case where the restore instruction group 1650 is not held by the restore-instruction-group holding unit 2091, the conditional-branch-instruction-group generating unit 2092 generates a CBR_AB conditional branch instruction group 1610 for setting the SUC_A instruction group 1430 or the SUC_B instruction group 1450 as the conditional branch destination.

E) The conditional-branch-instruction-group generating unit 2092 stores the generated CBR_AB conditional branch instruction group 1610 in the conditional-branch-instruction-group holding unit 2094.

Hereinafter, a description shall be provided of an example of specific operations performed by the conditional-branch-instruction-group generating unit 2092 when the tampering-prevention-process generation apparatus 1320 receives the input program 1310 shown in FIG. 18.

A) The conditional-branch-instruction-group generating unit 2092 newly creates, as the G_VAL_AB variable, that is, a branch destination determining variable, a variable which is not included in the input program 1310. Here, "var_ab0" is assumed to be the branch destination determining variable.

B) The conditional-branch-instruction-group generating unit 2092 determines that when the branch destination determining variable is not a multiple of 2, that is, when "var_ab0%2==1" applies, the SUC_A instruction group 1430 is set as the branch destination, and that when the branch destination determining variable is a multiple of 2, that is, when "var_ab0%2==0" applies, the SUC_B instruction group 1450 is set as the branch destination.

Although this example has shown one way of determining what value of the branch destination determining variable should cause the SUC_A instruction group 1430 to be as the branch destination, it is to be noted that the way of determination is not limited to this. For example, the SUC_A instruction group 1430 may be set as the branch destination when the value of the branch destination determining variable equals a randomly selected value.

C) The conditional-branch-instruction-group generating unit 2092 stores in the branch condition holding unit 2093 a set of values of the branch destination determining variable which are determined in the above process B) as values that cause the SUC_A instruction group 1430 to be the branch destination. In this example, the conditional-branch-instruction-group generating unit 2092 stores the set "var_ab0%2==1", that is, a set of values other than the multiples of 2.

The conditional-branch-instruction-group generating unit 2092 also stores in the branch condition holding unit 2093 a set of values of the branch destination determining variable that cause the SUC_B instruction group 1450 to be the branch destination. In this example, the conditional-branch-instruction-group generating unit 2092 stores the set "var_ab0%2==0", that is, a set of multiples of 2.

Here, storing a set may mean storing all the values included in the set, or storing an expression such as "var_ab0%2==0" that represents the set.

D) In the case where the restore instruction group 1650 is held by the restore-instruction-group holding unit 2091, the conditional-branch-instruction-group generating unit 2092 generates a CBR_AB conditional branch instruction group 1610 for setting the SUC_A instruction group 1430 or the restore instruction group 1650 as the conditional branch destination. In the case where the restore instruction group 1650 is not held by the restore-instruction-group holding unit 2091, the conditional-branch-instruction-group generating unit 2092 generates a CBR_AB conditional branch instruction group 1610 for setting the SUC_A instruction group 1430 or the SUC_B instruction group 1450 as the conditional branch destination. In this example, the restore instruction group 1650 is held by the restore-instruction-group holding unit 2091, and thus the conditional-branch-instruction-group generating unit 2092 attaches a label "SUC_B_" to the head of the restore instruction group 1650, and generates a CBR_AB conditional branch instruction group 1610 "if (var_ab0%2==0) goto SUC_B_".

E) The conditional-branch-instruction-group generating unit 2092 stores the generated CBR_AB conditional branch instruction group 1610 "if(var_ab0%2==0) goto SUC_B_;" in the conditional-branch-instruction-group holding unit 2094.

(3.12) Branch Condition Holding Unit 2093

The branch condition holding unit 2093 has at least two regions for storing sets of variable values. A first region is for storing a first set, which is a set of variable values that satisfy the condition for setting the SUC_A instruction group 1430 as the branch destination of the instruction group generated by the conditional-branch-instruction-group generating unit 2092. A second region is for storing a second set, which is a set of variable values that satisfy the condition for setting the SUC_B instruction group 1450 (or the restore instruction group 1650) as the branch destination of the instruction group generated by the conditional-branch-instruction-group generating unit 2092. Here, storing a set may mean storing all the values included in the set, or storing an expression such as "var_ab0%2==0" that represents the set.

In the above specific example, the first region is for storing "var_ab0%2==1", which is a set of variable values that satisfy the condition for setting the SUC_A instruction group 1430 as the branch destination of the instruction group generated by the conditional-branch-instruction-group generating unit 2092. Further, the second region is for storing "var_ab0%2==0", which is a set of variable values that satisfy the condition for setting the restore instruction group 1650 as the branch destination of the instruction group generated by the conditional-branch-instruction-group generating unit 2092.

(3.13) Conditional-Branch-Instruction-Group Holding Unit 2094

The conditional-branch-instruction-group holding unit 2094 has a region for storing an instruction group. The conditional-branch-instruction-group holding unit 2094 stores in the storing region the CBR_AB conditional branch instruction group 1610 generated by the conditional-branch-instruction-group generating unit 2094.

In the above specific example, the conditional-branch-instruction-group holding unit 2094 stores the CBR_AB conditional branch instruction group 1610 "if(var_ab0%2==0) goto SUC_B_;" generated by the conditional-branch-instruction-group generating unit 2092.

(3.14) Variable-Group-Value-Assigning-Instruction-Group Generating Unit 2095

The variable-group-value-assigning-instruction-group generating unit 2095 generates an STR_A-variable-group value assigning instruction group 1620 and an STR_B-variable-group value assigning instruction group 1630. To be more specific, the following processes are performed:

A) The variable-group-value-assigning-instruction-group generating unit 2095 obtains the first and second sets held by the branch condition holding unit 2093.

B) The variable-group-value-assigning-instruction-group generating unit 2095 generates, as the STR_A-variable-group value assigning instruction group 1620, an instruction group for assigning a value included in the first set to a branch destination determining variable. The variable-group-value-assigning-instruction-group generating unit 2095 also generates, as the STR_B-variable-group value assigning instruction group 1630, an instruction group for assigning a value included in the second set to the branch destination determining variable. It is to be noted that when the first or second set includes a plurality of values, the variable-group-value-assigning-instruction-group generating unit 2095 selects a value to be assigned. The value may be selected randomly, or according to some kind of standard.

C) The variable-group-value-assigning-instruction-group generating unit 2095 stores the generated instruction groups in the variable-group-value-assigning-instruction-group holding unit 2096.

Hereinafter, a description shall be provided of an example of specific operations performed by the variable-group-value-assigning-instruction-group generating unit 2095 when the tampering-prevention-process generation apparatus 1320 receives the input program 1310 shown in FIG. 18.

A) The variable-group-value-assigning-instruction-group generating unit 2095 obtains the first and second sets held by the branch condition holding unit 2093. The first set and second set are "var_ab0%2==1" and "var_ab0%2==0", respectively.

B) The variable-group-value-assigning-instruction-group generating unit 2095 generates, as the STR_A-variable-group value assigning instruction group 1620, an instruction group for assigning a value included in the first set to the branch destination determining variable. In this example, the branch destination determining variable is "var_ab0" and the value included in the first set "1", for example. Therefore, the variable-group-value-assigning-instruction-group generating unit 2095 sets "var_ab0=1;" as the STR_A-variable-group value assigning instruction group 1620. Similarly, the variable-group-value-assigning-instruction-group generating unit 2095 sets "var_ab0=8;" as the STR_B-variable-group value assigning instruction group 1630.

C) The variable-group-value-assigning-instruction-group generating unit 2095 stores in the variable-group-value-assigning-instruction-group holding unit 2096 the generated STR_A-variable-group value assigning instruction group 1620 and STR_B-variable-group value assigning instruction group 1630.

(3.15) Variable-Group-Value-Assigning-Instruction-Group Holding Unit 2096

The variable-group-value-assigning-instruction-group holding unit 2096 has a region for storing an instruction group. The variable-group-value-assigning-instruction-group holding unit 2096 stores in the storing region the STR_A-variable-group value assigning instruction group 1620 and the STR_B-variable-group value assigning instruction group 1630 generated by the variable-group-value-assigning-instruction-group generating unit 2095.

In the above specific example, the variable-group-value-assigning-instruction-group holding unit 2096 holds "var_ab0=1;" and "var_ab0=8;" which are the STR_A-variable-group value assigning instruction group 1620 and the STR_B-variable-group value assigning instruction group 1630, respectively, which are generated by the variable-group-value-assigning-instruction-group generating unit 2095.

(3.16) Branch-Instruction-Group Generating Unit 2097

The branch-instruction-group generating unit 2097 generates a BR_B branch instruction group 1660 for causing a branch from the B instruction group 1440 to the A instruction group 1420.

More specifically, in the case where the input program 1310 shown in FIG. 18 is the target of the process, the branch-instruction-group generating unit 2097 generates "goto A;" as the BR_B branch instruction group 1660 for causing a branch to the A instruction group 1420.

(3.17) Branch-Instruction-Group Holding Unit 2098

The branch-instruction-group holding unit 2098 has a region for storing an instruction group. The branch-instruction-group holding unit 2098 stores in the storing region the BR_B branch instruction group 1660 generated by the branch-instruction-group generating unit 2097.

In the above specific example, for example, the branch-instruction-group holding unit 2098 holds "goto A;" which is the BR_B branch instruction group 1660 generated by the branch-instruction-group generating unit 2097.

(3.18) Tamper-Resistant Program Generating Unit 2099

The tamper-resistant program generating unit 2099 generates a tamper-resistant program 1330 using the input program 1310 held by the input program holding unit 2020 and the instruction groups held by each of the instruction group holding units. To be more specific, the tamper-resistant program generating unit 2099 generates the tamper-resistant program 1330 by inserting or placing the instruction groups held by each of the instruction group holding units at the following locations of the input program 1310.

A) The tamper-resistant program generating unit 2099 inserts the STR_A-variable-group value assigning instruction group 1620 at a location in the PRE_A instruction group 1410.

B) The tamper-resistant program generating unit 2099 places the CBR_AB conditional branch instruction group 1610 at the end of the A instruction group 1420.

C) The tamper-resistant program generating unit 2099 inserts the STR_B-variable-group value assigning instruction group 1630 at a location in the B instruction group 1440.

D) The tamper-resistant program generating unit 2099 places the save instruction group 1640 at the end of the B instruction group 1440, and further places the BR_B branch instruction group 1660 at the end of the save instruction group 1640.

E) The tamper-resistant program generating unit 2099 places the restore instruction group 1650 immediately before the SUC_B instruction group 1450.

A specific example is that the tamper-resistant program generating unit 2099 inserts into the input program 1310 shown in FIG. 18 the generated instruction groups which are held by the instruction group holding units, to generate the tamper-resistant program 1330 shown in FIG. 20.

It is to be noted that in the case where the input program 1310 has already undergone a conversion and the like using another obfuscation method, the program may include, at the end of the A instruction group 1420 and the B instruction group 1440, dummy instructions and so on which are not executed in a normal series of execution. In such a case, the CBR_AB conditional branch instruction group 1610 and the save instruction group 1640 do not need to be placed at the end of the A instruction group 1420 and the B instruction group 1440, respectively. In other words, they are to be placed at the end of an instruction executed lastly in the normal series of execution.

(3.19) Tamper-Resistant Program Output Unit 2100

The tamper-resistant program output unit 2100 receives and stores the tamper-resistant program 1330 generated by the tamper-resistant program generating unit 2099. Further, the tamper-resistant program output unit 2100 records the tamper-resistant program 1330 on the recording medium 1350.

It is to be noted that in the present embodiment, the G_VAL_AB variable (the variable "var_ab0") for determining a branch destination corresponds to the additional variable, and the conditional-branch-instruction-group generating unit 2092 corresponds to the variable generating unit. Further, the STR_A-variable-group value assigning instruction group 1620 corresponds to the first conditional value assigning instruction, the STR_B-variable-group value assigning instruction group 1630 corresponds to the second conditional value assigning instruction, and the variable-group-value-assigning-instruction-group generating unit 2095 corresponds to the conditional-value-assigning-instruction generating unit.

(3.20) Process Flow of the Tampering-Prevention-Process Generation Apparatus 1320

Figure 24:
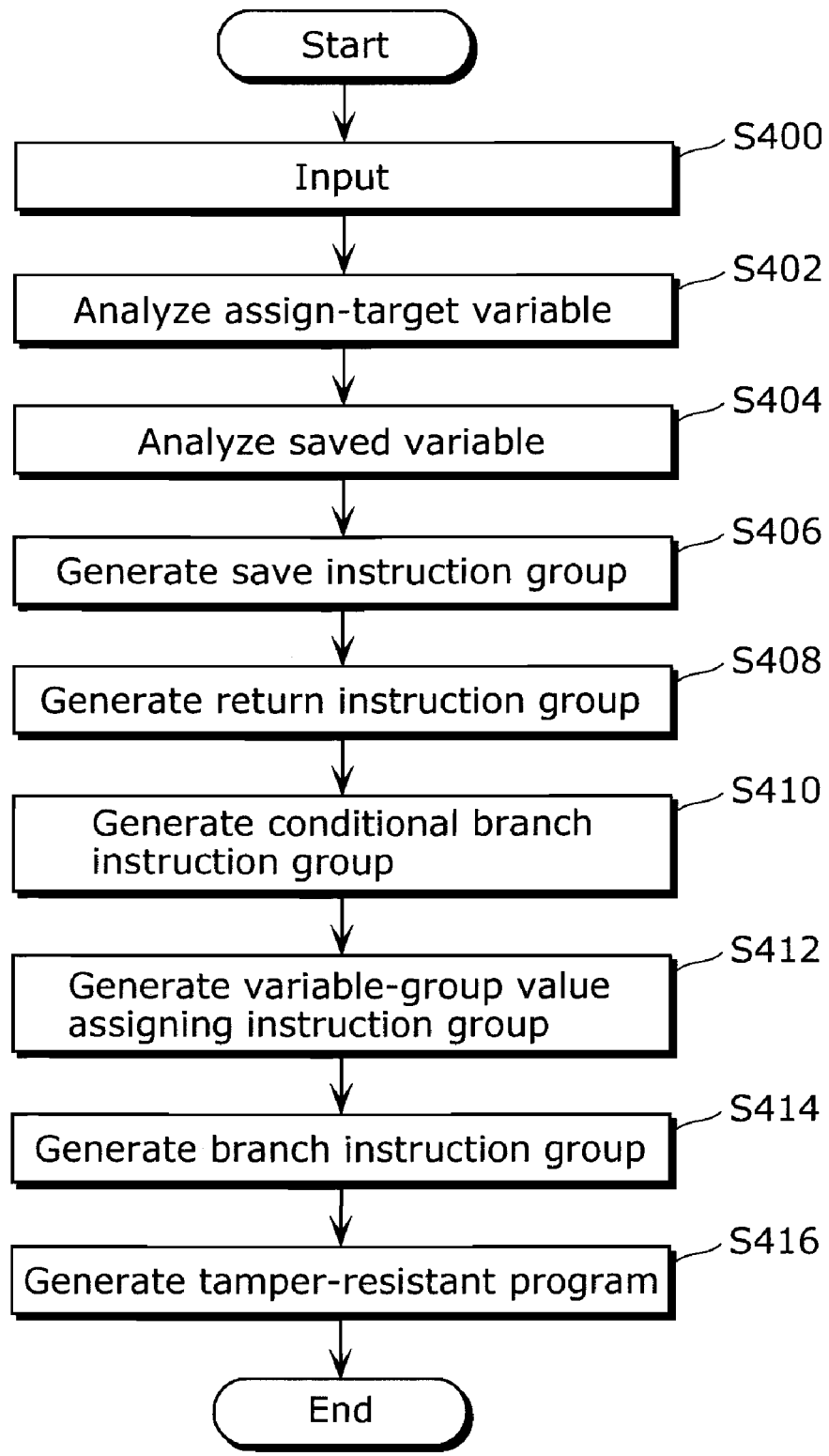
FIG. 24 is a flow chart showing operations of a tampering-prevention-process generation apparatus according to Embodiment 3 of the present invention.

FIG. 24 is a flow chart showing operations of the tampering-prevention-process generation apparatus 1320. With reference to FIG. 24, the conversion of the input program 1310 into the tamper-resistant program 1330, or the obfuscation process, shall be described.

The input unit 2010 of the tampering-prevention-process generation apparatus 1320 first receives the input program 1310 and specification regarding the locations, in the input program 1310, of the A instruction group 1420, the PRE_A instruction group 1410, the SUC_A instruction group 1430, the B instruction group 1440, and the SUC_B instruction group 1450, and stores the input program 1310 and the specification in the input program holding unit 2020 (Step S400).

The assign-target variable analyzing unit 2030 analyzes the assign-target variable information concerning the A instruction group 1420 held by the input program holding unit 2020, and stores the assign-target variable information in the assign-target-variable-information holding unit 2040 (Step S402).

The saved variable analyzing unit 2050 identifies variables necessary for executing the SUC_B instruction group 1450 and the instructions executed after the SUC_B instruction group 1450 included in the input program 1310 held by the input program holding unit 2020. Then, from among the identified variables, the saved variable analyzing unit 2050 sets, as a saved variable, a variable which is held by the assign-target-variable-information holding unit 2040, and stores the saved variable in the saved-variable-information holding unit 2060 (Step S404).

The save-instruction-group generating unit 2070 generates a save instruction group 1640, and stores it in the save-instruction-group holding unit 2080 (Step S406).

The restore-instruction-group generating unit 2090 generates a restore instruction group 1650, and stores it in the restore-instruction-group holding unit 2091 (Step S408). In the case where no saved variable is found in Step S404, there is no need to generate a save instruction group 1640 and a restore instruction group 1650, and thus Steps S406 and S408 are not performed.

The conditional-branch-instruction-group generating unit 2092 generates a CBR_AB conditional branch instruction group 1610, and stores it in the conditional-branch-instruction-group holding unit 2094 (Step S410).

The variable-group-value-assigning-instruction-group generating unit 2095 generates an STR_B-variable-group value assigning instruction group 1630 and an STR_A-variable-group value assigning instruction group 1620, and stores them in the variable-group-value-assigning-instruction-group holding unit 2096 (Step S412).

The branch-instruction-group generating unit 2097 generates a BR_B branch instruction group 1660, and stores it in the branch-instruction-group holding unit 2098 (Step S414).

The tamper-resistant program generating unit 2099 generates a tamper-resistant program 1330, and stores it in the tamper-resistant program output unit 2100 (Step S416). Further, the tamper-resistant program output unit 2100 records the tamper-resistant program on the recording medium 1350.

(3.21) Advantageous Effects of the Tampering-Prevention-Process Generation Apparatus 1320

The tampering-prevention-process generation apparatus 1320 is capable of converting the input program 1310 received as an input, into the tamper-resistant program 1330 that produces the same result as that of the input program 1310. As stated in the description of the tamper-resistant program 1330, even when an unauthorized analyzer analyzes the tamper-resistant program 1330 by actually operating it, the execution order of the instruction groups included in the input program 1310 and the controlling structure of the program cannot be easily found out.

In addition, the tampering-prevention-process generation apparatus 1320 is capable of obfuscating the input program 1310 to generate the tamper-resistant program 1330 having a more complicated controlling structure.

(Other Variations)

Although the present invention has been described above based on some exemplary embodiments, it is obvious that the present invention is not limited to the above embodiments. The following cases, for example, are also to be included in the present invention.

(1) In Embodiment 1, the variations thereof, and Embodiments 2 and 3, the instructions such as a variable declaration are added during the obfuscation process in order to conform to the C language notation. However, the instructions may be added with different timings. They may be added at the last after the completion of the obfuscation process, or with other timings. Furthermore, this process may be unnecessary depending on the post-obfuscation language.

(2) Although Embodiment 1, the variations thereof, and Embodiment 2 have shown that the execution processing apparatus is separately provided from the tampering-prevention-process generation apparatus, the present invention is not limited to this. For example, the execution processing apparatus may include a process generating unit having a function equivalent to that of the tampering-prevention-process generation apparatus, and execute programs after the process generating unit performs obfuscation. With this structure, the programs to be executed are obfuscated according to the present invention, making it possible to prevent unauthorized tampering and analyses as in Embodiments 1 and 2. In such a case, it is obvious that original programs are desirably protected by making the program storage location in the execution processing apparatus tamper-resistant, for example.

Furthermore, the execution processing apparatus may be an apparatus that executes programs distributed from a program distribution server, and may include a decryption apparatus in addition to the tampering-prevention-process generation apparatus to decrypt the distributed programs which have been encrypted, followed by obfuscation and execution thereof. With such a structure, the programs distributed from the program distribution server can be obfuscated and executed by the execution processing apparatus.

Further, although Embodiment 3 has shown the structure in which the tampering-prevention-process generation apparatus and the execution processing apparatus are separately provided, the present invention is not limited to this also. Similarly to Embodiments 1 and 2, a variation such as the above may be considered.

(3) Although Embodiment 3 has shown that the saved variable analyzing unit 2050 identifies, as a saved variable, some of the variables held by the assign-target-variable-information holding unit 2040, all of the variables held by the assign-target-variable-information holding unit 2040 may be identified as saved variables. In the case of employing such a structure, there is a possibility that even the excess variables, which do not influence process results even if not saved, are also saved. However, since the process of selecting a saved variable is no longer necessary, the obfuscation process can be performed faster.

Further, all the variables included in the A instruction group 1420 may be identified as saved variables, or all the variables included in the input program 1310 may be identified as saved variables. Such a structure makes the analysis of the assign-target variables unnecessary, which further enables a faster obfuscation process.

(4) Although Embodiment 3 has shown that the save-instruction-group generating unit 2070 generates the save instruction group 1640 "var_save0=var_org2;", it may generate a different instruction which is inversely convertible, such as "var_save0=var_org2+2;". In such a case, the restore-instruction-group generating unit 2090 generates a restore instruction group 1650 "var_org2=var_save0−2;" for inverse conversion. It is to be noted that the method for generating an inversely convertible instruction is not limited to the above, and methods already known or methods to be proposed in the future may be adopted.

Further, a save instruction group may be generated so that the value of a single saved variable is saved through a process having multiple steps, or a plurality of save instruction groups may be generated for a plurality of saved variables so that the values of all of the saved variables are eventually saved. In other words, any save instruction group may be generated as long as execution of the save instruction group eventually enables saving of the value of the saving variable. Furthermore, plural save instruction groups may be generated for some of the saved instruction groups, while generating one save instruction group for each of the other saved instruction groups. Such a structure makes it difficult for the unauthorized analyzer to find the save instruction groups and restore instruction groups from the instruction groups included in the tamper-resistant program.

Further, although it has been described that the save-instruction-group generating unit 2070 adds a new variable as a saving variable, a different variable generated for the obfuscation may be used also as a saving variable. Examples of such a variable include a variable used for a dummy process in the case where a dummy press is added not to be executed in the normal series of execution when obfuscation is performed according to a different technique. Further, a variable included in the program, yet no longer in use may be used.

Such a structure makes it difficult for the unauthorized analyzer to identify, from among variables used in the tamper-resistant program, which variables have been present even before the obfuscation and which variables are the saving variables. As a result, it becomes difficult to find out on which part of the tamper-resistant program the present technique is applied.

(5) Although Embodiment 3 has shown that each instruction group included in the tamper-resistant program 1330 is an independent instruction group, an instruction group combining some of the instruction groups may be generated. Even in Embodiment 1, the variations thereof, and Embodiment 2, an instruction group combining plural instruction groups may be generated as stated above. For example, in Embodiment 3, instead of generating the restore instruction group 1650 "var_org2=var_save0;" and the SUC_B instruction group 1450 "var_org1=var_org1+var_org2; var_org1=var_org1*123;", an instruction group "var_org1=var_org1+var_save0;var_org1=var_org1*123;f" may be generated to combine the two instruction groups. In the above example, an analysis of the program reveals that the value of the variable "var_org2" is the same as that of "var_save0", and thus "var_org2" in the SUC_B instruction group 1450 is replaced with "var_save0". Such a structure makes it difficult for the unauthorized analyzer to find the save instruction group and restore instruction group from the tamper-resistant program. As a result, it becomes difficult to find out on which part of the tamper-resistant program the present technique is applied.

It is to be noted that as well as the technique of the above example, techniques for generating a new, combining instruction from plural instructions without creating contradiction between preceding and following instructions are known in the field of compilers and so on. While a detailed description shall be omitted, it is obvious that such techniques may be adopted to the present technique as necessary.

(6) In Embodiment 3, the branch-instruction-group generating unit 2097 may generate a conditional branch instruction group instead of the BR_B branch instruction group 1660 "goto A;". For example, the BR_B branch instruction group 1660 may be changed to "if(var_org2>200)goto A;".

Such a structure makes the operation of the tamper-resistant program 1330 different depending on the value of "var_org2". In this example, the operation of the tamper-resistant program 1330 varies depending on whether or not the value of "var_org2" exceeds "200". This makes the unauthorized analyzer consider the value "200" (which is not a particularly important value) as an important value, and thus the analytic operations become more difficult to perform.

It is to be noted that, even in Embodiment 1, the variations thereof, and Embodiment 2, the branch-process-instruction-group generating units 203 and 203b may generate a conditional branch process instruction group in stead of the branch process instruction groups 320, 320a, and 320b "plainData=decrypt(encryptedData)" as described above.

(7) Although Embodiment 3 has shown the case where the A instruction group 1420 precedes the B instruction group 1440 in the input program, they may be in the opposite order.

(8) Although Embodiment 3 has shown the case where the PRE_A instruction group is the only branch source block of the A instruction group in the input program, there may be more than one branch source block. When there are plural branch source blocks such as a first PRE_A instruction group, a second PRE_A instruction group, . . . and so on, an STR_A-variable-group value assigning instruction group may be added to each of the branch source blocks. Such a structure enables the tampering-prevention-process generation apparatus 1320 to obfuscate programs having a complicated controlling structure. In such a case, the STR_A-variable-group value assigning instruction groups added to the respective instruction groups may be instructions that produce the same final calculation result through different calculation processes. This makes it difficult for the unauthorized analyzer to identify which instructions are the STR_A-variable-group value assigning instruction groups.

Furthermore, although Embodiment 3 has shown that a single A instruction group corresponds to a single B instruction group, either or both of them may be plural in number. Such a structure allows a wide variety of tamper-resistant programs, making it difficult for the unauthorized analyzer to imagine input programs based on the tamper-resistant programs. It is to be noted that even in Embodiment 1, the variations thereof, and Embodiment 2, there may be plural instruction groups of the same type as described above, as long as they do not create contradiction.

(9) Although Embodiment 3 has shown that the SUC_B instruction group is the only branch destination block of the B instruction group in the input program, there may be more than one branch destination block. For example, when the B instruction group 1440 has branch destination blocks of a first SUC_B instruction group and a second SUC_B instruction group, a branch destination is determined based on the value of "var_org2" at the end of the B instruction group 1440. The CBR_B conditional branch instruction that determines the branch destination in such a manner is represented as "if (var_org2%2==0){goto SUC_B_1;}else{goto SUC_B_2;}", for example. In this case, the CBR_AB conditional branch instruction group 1610 determines the SUC_A instruction group as the branch destination when "var_ab0%2!=0" applies, and determines the branch destination based on the value of "var_org2" when "var_ab0%2==0" applies. When specifically written in the C language, the CBR_AB conditional branch instruction group 1610 performing this process is as follows:

```
"if(var__ab0%2==0){
if(var__org2%2==0){goto SUC__B__1;}
else{goto SUC__B__2;}
}"
```

It is to be noted that "SUC_B_1" is a label attached to the first SUC_B instruction group, and "SUC_B_2" is a label attached to the second SUC_B instruction group.

With such a CBR_AB conditional branch instruction group 1610 as described, in the case where the A instruction group is executed after the PRE_A instruction group, "var_ab %2!=0" applies, which means that the SUC_A instruction group placed immediately after the CBR_AB conditional branch instruction group 1610 is determined as the branch destination. Further, in the case where the A instruction group is executed after the B instruction group, "var_ab %2==0" applies, which means that either the first SUC_B instruction group or the second SUC_B instruction group is determined as the conditional branch destination based on the condition of the CBR_B conditional branch instruction included in the second to third lines of the above described instruction group.

It is to be noted that the CBR_AB conditional branch instruction group 1610 is not limited to the structure of the CBR_AB conditional branch instruction group 1610 in Embodiment 3 added with the CBR_B conditional branch instruction as described above. The CBR_AB conditional branch instruction group 1610 may have a different structure as long as, in the above example, the SUC_A instruction group is determined as the branch destination when "var_ab %2!=0" applies, the first SUC_B instruction group is determined as the branch destination when "var_ab %2==0" and "var_org2%2==0" apply, and the second SUC_B instruction group is determined as the branch destination when "var_ab %2==0" and "var_org2%2!=0" apply.

For example, the CBR_AB conditional branch instruction group 1610 may be an instruction group as shown below.

```
"tmp = (var_ab0%2)*2+(var_org2%2);
switch(tmp){case 0:
case 1:
   goto SUC_A;
case 2:
   goto SUC_B_1;
case 3:
   goto SUC_B_2;}"
```

Similarly, although it has been described that the SUC_A instruction group is the only branch destination block of the A instruction group, there may be more than one branch destination block. The following is an example of the CBR_AB conditional branch instruction group 1610 in the case where a branch destination is determined from among a first SUC_A instruction group and a second SUC_A instruction group based on whether or not the value of the variable "var_org2" is a multiple of 2.

```
"if(var_ab0%2==0){goto SUC_B;}
else{
if(var_org2%2==0){goto SUC_A_1;}
else{goto SUC_A_2;}
}"
```

It is to be noted that "SUC_A_1" is a label attached to the first SUC_A instruction group, and "SUC_A_2" is a label attached to the second SUC_A instruction group.

In the above example, when "var_ab0" is an aliquant part of 2, a process for determining whether to branch to the first SUC_A instruction group or the second SUC_A instruction group is performed. It is to be noted that the method for generating the CBR_AB conditional branch instruction group 1610 when there is more than one SUC_A instruction group is not limited to the above described method. A specific example of the method shall be omitted because it is the same as that in the case where there is more than one SUC_B instruction group.

Further, it is obvious that both the SUC_A instruction group and the SUC_B instruction group may be plural in number.

Hereinafter, advantageous effects produced through such a structure shall be described.

An example of an attack by an unauthorized analyzer is alteration of a conditional branch instruction into an unconditional branch instruction, performed at the time of unauthorized program tampering. For example, in the case where the tampering target program is a program that checks whether or not an ID entered by a user is a correct value, executes the first SUC_B instruction group when it is a correct value, and executes the second SUC_B instruction group when it is an incorrect value, the unauthorized analyzer alters a conditional branch instruction to be an unconditional branch instruction for causing a branch to the first SUC_B instruction group. Such alteration enables the unauthorized analyzer to, without having to know the correct ID, execute a program equivalent to that of a normal user having the knowledge of the correct ID. Here, in the case where tampering is performed with a program obfuscated in the above described manner to alter a conditional branch instruction to be an unconditional branch instruction, that is, for example, to replace the above mentioned CBR_AB conditional branch instruction group 1610 with "goto SUC_B_1;", the first SUC_B instruction group can be executed even when the entered ID is an incorrect value (the second SUC_B instruction group would be executed if no tampering is performed). However, since the CBR_AB conditional branch instruction group 1610, which is obfuscated in the above described manner, is also called prior to the execution of the SUC_A instruction group, such tampering results in unconditional execution of the SUC_B instruction group even when the SUC_A instruction group needs to be executed. Thus, such tampering results in a situation where the SUC_A instruction group is no longer executed, which is unintended by the unauthorized analyzer. Therefore, since it becomes difficult for the unauthorized analyzer to comprehend the influence of the tampering, the unauthorized analysis and tampering become hard to carry out.

Especially in the case of combining the above described structure and that described in Variation (6), there may be and may not be an influence of the above tampering, depending on the input value and the like (e.g. the value of "var_org2"). For this reason, in the case where the unauthorized analyzer performs an analysis using an input value that results in no influence, it becomes more difficult for the unauthorized analyzer to identify on which part of the program the present technique is applied, and thus the unauthorized analysis and tampering become hard to carry out.

Furthermore, as disclosed in the obfuscation technique of the Non-Patent Reference 1, a conditional branch instruction group including a dummy branch destination to which no process actually branches may be added. To be more specific, dummy branch destinations such as "case 4", "case 5" . . . and so on may be added to the above exemplary conditional branch instruction group. Such a structure makes it difficult to identify which part should be tampered is with, even when only the part where the process branches to the second SUC_B instruction group is to be targeted for tampering such that the process unconditionally branches to the first SUC_B instruction group. Further, in the case of obfuscating programs written in the assembly language and so on, a conditional branch instruction using a relative jump may be used.

Furthermore, a first SUC_B instruction group 1, a first SUC_B instruction group 2, . . . and so on for executing processes equivalent to the first SUC_B instruction group may be provided such that the process may branch to one of the equivalent processes when the original condition for branching to the first SUC_B instruction group is satisfied. The same holds true for the second SUC_B instruction group and the first SUC_A instruction group. This makes it difficult for the unauthorized analyzer to identify which instruction group represents the process equivalent to the first SUC_B instruction group or the like.

(10) Although Embodiment 3 has shown that the B instruction group is the only branch source of the SUC_B instruction group, there may be a C1 instruction group, a C2 instruction group, . . . and so on as well as the B instruction group as branch sources of the SUC_B instruction group. In such a case, since a restore instruction group is added to the SUC_B instruction group, a save instruction group needs to be added to each of the C1 instruction group, C2 instruction group, . . . and so on to correspond to the restore instruction. Further, in the case where the C1 instruction group includes a D1 branch destination instruction group, a D2 branch destination instruction group, . . . and so on as branch destinations of an instruction group other than the SUC_B instruction group, a save instruction group is also added to each of the D1 branch destination instruction group, D2 branch destination instruction group, . . . and so on since a restore instruction group is added to the C1 instruction group.

As for programs having a complicated controlling structure, the above described operation is repeated to determine the instruction group to which a save instruction group is to be added and the instruction group to which a restore instruction group is to be added. The addition of a save instruction group and a restore instruction group to the respective instruction groups determined enables the obfuscation according to the present invention.

(11) Although Embodiment 3 has shown that the execution result of the A instruction group is not used in the case where the A instruction group is executed after the B instruction group, the result obtained through the execution of the A instruction group may be used in the SUC_B instruction group. This enables achievement of the same advantageous effect as that of Embodiments 1 and 2.

Figure 25:
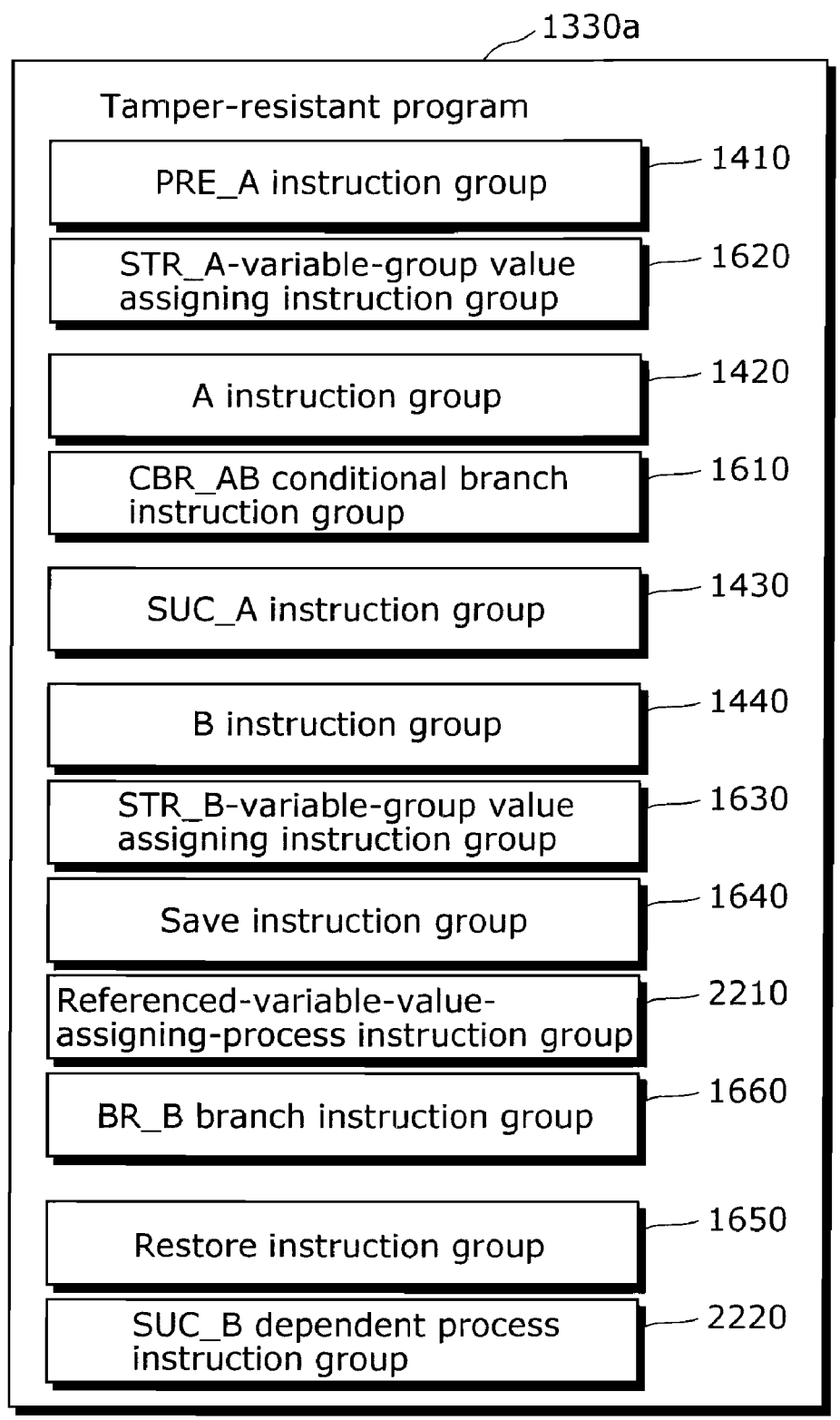
FIG. 25 is a diagram showing the structure of a tamper-resistant program according to a variation of Embodiment 3 of the present invention.

FIG. 25 is a diagram showing the structure of a tamper-resistant program according to the present variation.

A tamper-resistant program 1330a according to the present variation includes the PRE_A instruction group 1410, the STR_A-variable-group value assigning instruction group 1620, the A instruction group 1420, the CBR_AB conditional branch instruction group 1610, the SUC_A instruction group 1430, the B instruction group 1440, the STR_B-variable-group value assigning instruction group 1630, the save instruction group 1640, a referenced-variable-value-assigning-process instruction group 2210, the BR_B branch instruction group 1660, the restore instruction group 1650, and an SUC_B dependent process instruction group 2220.

As compared with the tamper-resistant program 1330 of Embodiment 3, the tamper-resistant program 1330a according to the present variation additionally includes the referenced-variable-value-assigning-process instruction group 2210, and includes the SUC_B dependent process instruction group 2220 in replacement of the SUC_B instruction group 1450 of the tamper-resistant program 1330.

Further, in the tamper-resistant program 1330a according to the present variation, the A instruction group 1420 corresponds to the first process instruction group 140 of Embodiment 1, the referenced-variable-value-assigning-process instruction group 2210 corresponds to the referenced-variable-value-assigning-process instruction group 310 of Embodiment 1, the BR_B branch instruction group 1660 corresponds to the branch process instruction group 320 of Embodiment 1, and the SUC_B dependent process instruction group 2220 corresponds to the dependent process instruction group 330 of Embodiment 1.

FIG. 26 is a diagram showing a specific example of the tamper-resistant program 1330a written in the C language.

The referenced-variable-value-assigning-process instruction group 2210 is a process for setting values to various parameters necessary for calling and executing the A instruction group 1420. Specifically, the referenced-variable-value-assigning-process instruction group 2210 is represented as "var_org2=5;" and denotes a process for assigning the value "5" to the referenced variable "var_org2", for example.

Therefore, when the BR_B branch instruction group 1660 causes the process to branch to the A instruction group 1420, the A instruction group 1420, given that the A instruction group 1420 is not tampered with, causes an assumed value "40 (=5×8)" to be assigned to the assign-target variable "var_org0", and "7 (=5+2)" to be assigned to the variable "var_org2".

Meanwhile, the SUC_B dependent process instruction group 2220 is a process instruction group executed after the A process instruction group 1420 is called, and is a program instruction group for performing a process equivalent to the SUC_B instruction group 1450 of the input program 1310. What is different from the SUC_B instruction group 1450 is that a part of the process of the SUC_B instruction group 1450 is replaced with a process which uses a process result of the A instruction group 1420.

More specifically, the SUC_B dependent process instruction group 2220 is represented as "var_org1=var_org1+var_org2; var_org1=var_org1*(var_org0*3+3)", for example. That is to say, in the SUC_B dependent process instruction group 2220, "123" of the SUC_B instruction group 1450 is replaced with "(var_org0*3+3)" which uses a process result of the A instruction group 1420.

Therefore, the SUC_B dependent process instruction group 2220 can cause execution of a process equivalent to the SUC_B instruction group 1450 when the assumed value "40" is obtained as the value of the assign-target variable "var_org0" through the process of the A process instruction group 1420.

FIG. 27 is a diagram showing a process flow of the tamper-resistant program 1330a.

As compared with the process of the tamper-resistant program 1330 shown in FIG. 22, the process of the tamper-resistant program 1330a additionally includes a process of executing the referenced-variable-value-assigning-process instruction group 2210 (Step S315), and a process of executing the SUC_B dependent process instruction group 2220 (Step S321) instead of the process in Step S320 shown in FIG. 22.

More specifically, in executing the tamper-resistant program 1330a, the execution processing apparatus 1340 executes the save instruction group 1640 (Step S314) and then the referenced-variable-value-assigning-process instruction group 2210 (Step S315). After that, the execution processing apparatus 1340 executes the BR_B branch instruction group 1660 (Step S316). Further, after executing the restore instruction group 1650 (Step S318), the execution processing apparatus 1340 executes the SUC_B dependent process instruction group 2220 (Step S321).

Figure 28:
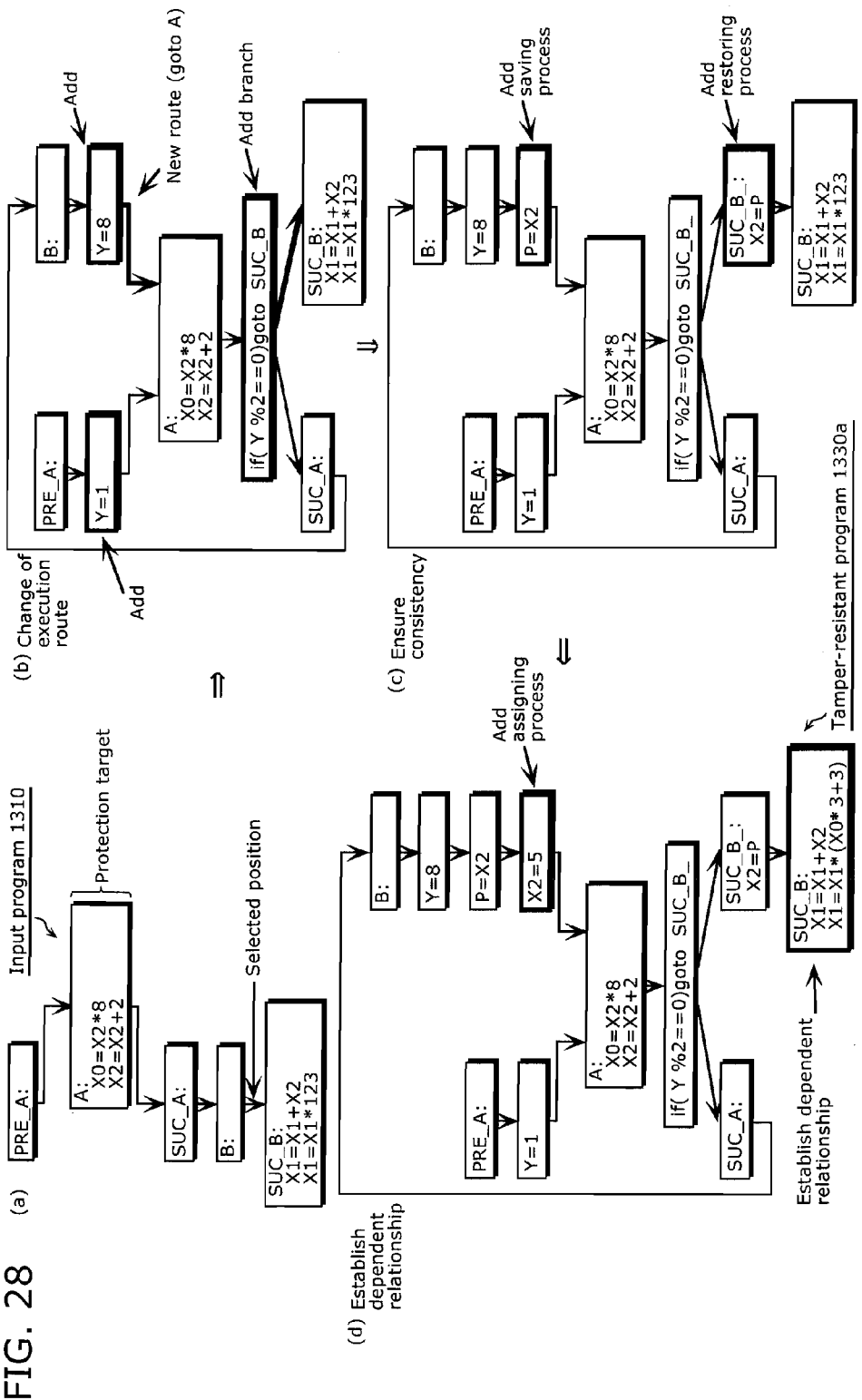
FIG. 28 is a diagram for describing the operation performed by a tampering-prevention-process generation apparatus according to a variation of Embodiment 3 of the present invention for generating a tamper-resistant program.

FIG. 28 is a diagram for describing the operation performed by the tampering-prevention-process generation apparatus according to the present variation for generating the tamper-resistant program 1330a.

It is to be noted that in FIG. 28, "PRE_A" represents the PRE_A instruction group 1410, "A" represents the A instruction group 1420, "SUC_A" represents the SUC_A instruction group 1430, "B" represents the B instruction group 1440, and "SUC_B" represents the SUC_B instruction group 1450 or the SUC_B dependent process instruction group 2220. Further, a variable "X0" represents the variable "var_org0", a variable "X1" represents the variable "var_org1", and a variable "X2" represents the variable "var_org2". Furthermore, a variable "Y" represents the variable "var_ab0" and a variable "P" represents the variable "var_save0".

Upon obtainment of the input program 1310, the tampering-prevention-process generation apparatus identifies an instruction group targeted for protection, and obfuscates the input program 1310 in such a manner that the protection target instruction group will be executed through plural processing routes. In other words, the tampering-prevention-process generation apparatus generates the tamper-resistant program 1330*a* such that when the protection target instruction group, which forms a part of a processing route, is tampered with, the tampering causes an abnormality in another processing route.

More specifically, as FIG. 28(*a*) shows, the tampering-prevention-process generation apparatus sets the position between the B instruction group 1440 and the SUC_B instruction group 1450 as a selected position. Then, as FIG. 28(*b*) shows, the tampering-prevention-process generation apparatus changes the execution route (processing route) of the input program such that the A instruction group 1420, the protection target, is executed again at the selected position.

To be more specific, the tampering-prevention-process generation apparatus adds the BR_B branch instruction group 1660 "goto A" as a new route so that the process branches from the B instruction group 1440 to the A instruction group 1420.

Here, the tampering-prevention-process generation apparatus adds a number of instruction groups so that when the A instruction group 1420 is executed after the PRE_A instruction group 1410, the SUC_A instruction group 1430 follows thereafter, whereas when the A instruction group 1420 is executed after the B instruction group 1440, the SUC_B instruction group 1450 follows thereafter. For example, the tampering-prevention-process generation apparatus adds the STR_A-variable-group value assigning instruction group 1620 "Y=1", the STR_B-variable-group value assigning instruction group 1630 "Y=8", and the CBR_AB conditional branch instruction group 1610 "if(Y %2==0)goto SUC_B".

Next, as FIG. 28(*c*) shows, the tampering-prevention-process generation apparatus ensures consistency for the SUC_B instruction group 1450 so as to prevent a change in a process result of the SUC_B instruction group 1450 caused by the execution route change that allows the A instruction group 1420 to be executed again after the B instruction group 1440.

More specifically, the tampering-prevention-process generation apparatus adds the save instruction group 1640 "P=X2" and the restore instruction group 1650 "X2=P". With this addition, even when the A instruction group 1420 is executed after the B instruction group 1440, the tampering-prevention-process generation apparatus can prevent the execution result of the A instruction group 1420 from influencing the process result of the SUC_B instruction group 1450.

Further, as FIG. 28(*d*) shows, the tampering-prevention-process generation apparatus replaces the SUC_B instruction group 1450 with the SUC_B dependent process instruction group 2220 so that the process result of the SUC_B instruction group 1450 is dependent on the execution result of the A instruction group 1420 executed after the B instruction group 1440. Meanwhile, the tampering-prevention-process generation apparatus adds the referenced-variable-value-assigning-process instruction group 2210 "X2=5".

As a result, when no tampering is performed with the A instruction group 1420, the execution of the A instruction group 1420 after the B instruction group 1440 leads to the obtainment of the assumed value "40" as the value of the variable "X0", and the SUC_B dependent process instruction group 2220 becomes a process equivalent to the SUC_B instruction group 1450. On the other hand, when tampering is performed with the A instruction group 1420, the execution of the A instruction group 1420 after the B instruction group 1440 does not lead to the obtainment of the assumed value "40" as the value of the variable "X0", and the SUC_B dependent process instruction group 2220 becomes an abnormal process which differs from the SUC_B instruction group 1450.

In such a manner, the tampering-prevention-process generation apparatus according to the present variation generates the SUC_B dependent process instruction group 2220 which uses the execution result of the A instruction group 140. This is accomplished through the tampering-prevention-process generation apparatus according to the present variation having the same structure as that of the tampering-prevention-process generation apparatuses 110 and 110*a* of Embodiment 1 and the variations thereof. More specifically, the tampering-prevention-process generation apparatus according to the present variation has the structure of the tampering-prevention-process generation apparatus 1320 shown in FIG. 23 according to Embodiment 3 plus the assumed value calculating unit 290, 290*a*, the dependent-process-instruction-group generating unit 201, 201*a*, and so on of Embodiment 1 and the variations thereof.

Here, the A instruction group 1420, the protection target, and the SUC_B instruction group 1450 may include, instead of a function, an Application Program Interface (API) related to a user interface or an external access.

Figure 29:
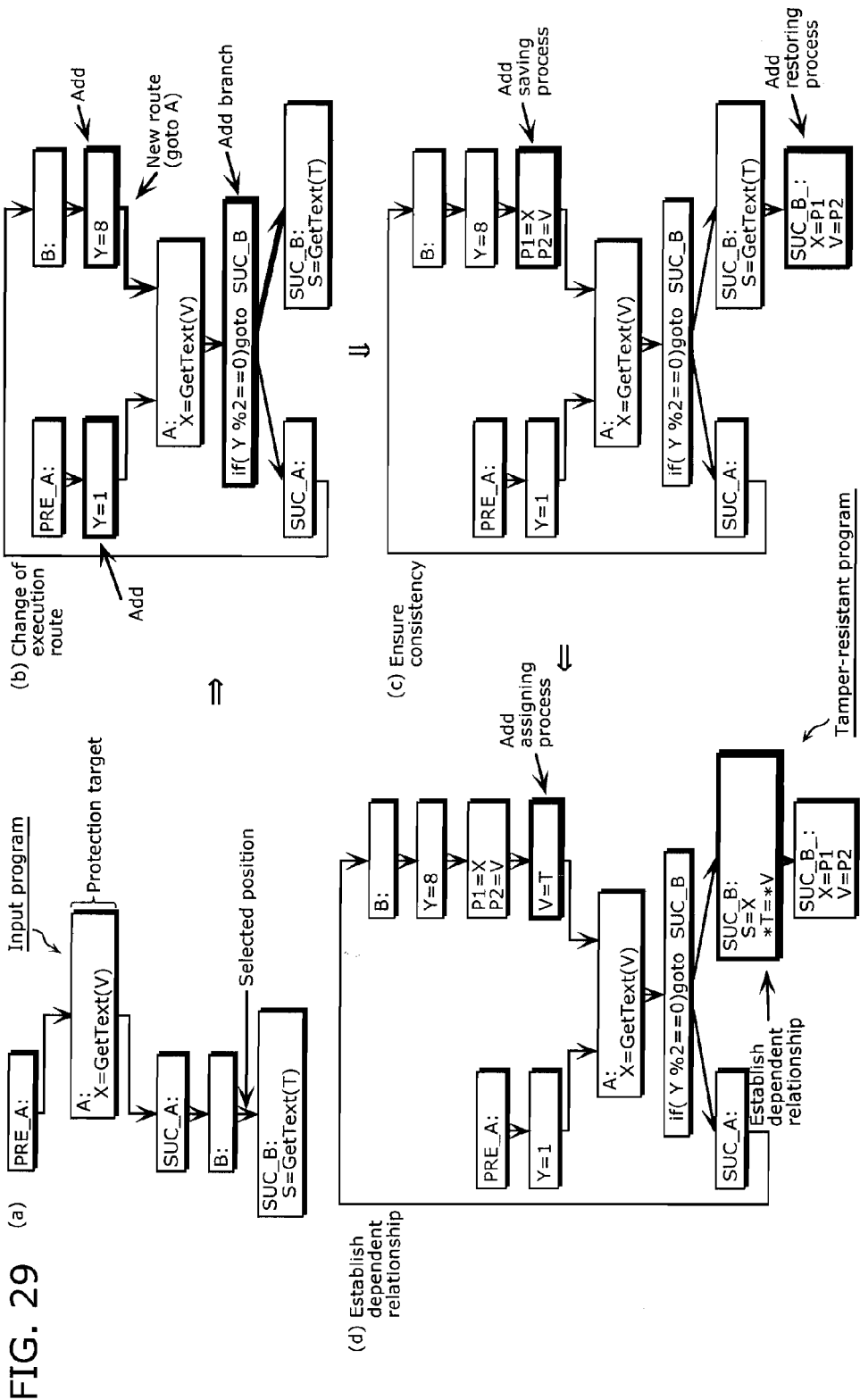
FIG. 29 is a diagram for describing the operation performed by the tampering-prevention-process generation apparatus according to a variation of Embodiment 3 of the present invention for generating a tamper-resistant program including an API.

FIG. 29 is a diagram for describing the operation performed by the tampering-prevention-process generation apparatus according to the present variation for generating a tamper-resistant program including an API.

It is to be noted that in FIG. 29, "PRE_A" represents a PRE_A instruction group, "A" represents an A instruction group, "SUC_A" represents an SUC_A instruction group, "B" represents a B instruction group, and "SUC_B" represents an SUC_B instruction group or an SUC_B dependent process instruction group.

Here, as FIG. 29(*a*) shows, the A instruction group is represented as "X=GetText(V)", for example. "GetText(V)" is an API for storing a character string entered by a user at an address indicated by an address variable V. Similarly, the SUC_B instruction group is represented as "S=GetText(T)", for example. "GetText(T)" is an API for storing a character string entered by the user at an address indicated by an address variable T.

In other words, as FIG. 29(*a*) shows, the tampering-prevention-process generation apparatus obtains an input program which includes an API in the A instruction group and the SUC_B instruction group. Even in such a case, as described above, the tampering-prevention-process generation apparatus identifies an instruction group targeted for protection, and obfuscates the input program in such a manner that the protection target instruction group is executed through plural processing routes. In other words, the tampering-prevention-process generation apparatus generates a tamper-resistant program such that when the protection target instruction group, which forms a part of a processing route, is tampered with, the tampering causes an abnormality in another processing route.

More specifically, the tampering-prevention-process generation apparatus judges whether or not the A instruction group, the protect target, includes an API. Here, when judging that an API is included, the tampering-prevention-process generation apparatus searches for a different process for calling the API. When the SUC_B instruction group is found through the search as the process for calling the API, the tampering-prevention-process generation apparatus sets the position between the B instruction group and the SUC_B instruction group as a selected position as shown in FIG. 29(*a*). Then, as FIG. 29(*b*) shows, the tampering-prevention-process generation apparatus changes the execution route (processing route) of the input program such that the A instruction group, the protection target, will be executed again at the selected position.

To be more specific, the tampering-prevention-process generation apparatus adds the BR_B branch instruction group "goto A" as a new route so that the process branches from the B instruction group to the A instruction group.

Here, the tampering-prevention-process generation apparatus adds a number of instruction groups so that when the A instruction group is executed after the PRE_A instruction group, the SUC_A instruction group follows thereafter, and when the A instruction group is executed after the B instruction group, the SUC_B instruction group follows thereafter. For example, the tampering-prevention-process generation apparatus adds the STR_A-variable-group value assigning instruction group "Y=1", the STR_B-variable-group value assigning instruction group "Y=8", and the CBR_AB conditional branch instruction group "if(Y %2==0)goto SUC_B".

Next, as FIG. 29(c) shows, the tampering-prevention-process generation apparatus ensures consistency for the variable X and the address variable V such that even when the value of the address variable V is changed to execute the A instruction group again after the B instruction group, the variable X and the value of the address variable V are not changed unnecessarily in the SUC_B instruction group onward. Specifically, the tampering-prevention-process generation apparatus adds a save instruction group "P1=X; P2=V" and a restore instruction group "X=P1; V=P2".

Further, as FIG. 29(d) shows, the tampering-prevention-process generation apparatus replaces the SUC_B instruction group "S=GetText(T)" with an SUC_B dependent process instruction group "S=X; *T=*V" so that the process result of the SUC_B instruction group is dependent on the execution result of the A instruction group. More specifically, since the process result is stored at the address indicated by the address variable V, the tampering-prevention-process generation apparatus uses that process result instead of the process result of the SUC_B instruction group which would have been obtained if the replacement did not take place. It is to be noted that meanwhile, the tampering-prevention-process generation apparatus adds the referenced-variable-value-assigning-process instruction group "V=T".

As a result, the SUC_B dependent process instruction group becomes a process equivalent to the SUC_B instruction group unless the A instruction group is tampered with. On the other hand, if the A instruction group is tampered with, that is, if, in the case where the A instruction group is a process for receiving serials, an unauthorized analyzer performs an alteration to establish "X=(constant number of the serial value)" for example, the SUC_B dependent process instruction group becomes an abnormal process different from the SUC_B instruction group.

(12) Although Embodiment 3 has shown that the PRE_A instruction group, the A instruction group, the SUC_A instruction group, the B instruction group, and the SUC_B instruction group are included in the same input program, they may be different functions.

For example, as in Embodiment 1, the A instruction group which corresponds to the first process instruction group, and the B instruction group and the SUC_B instruction group which correspond to the second process instruction group can be received as different functions. In that case, by reading from the B instruction group a function including the A instruction group, and discarding a process result of the function (or not referring to the function rather than explicitly discarding it), the obfuscation as in Embodiment 3 can be achieved while preventing the influence of the A instruction group on the process of the SUC_B instruction group onward. It is to be noted that in the case of calling the function including the A instruction group by call-by-reference and the like, there is a possibility that a change occurs in the variable provided as an argument, resulting in an influence on the process of the SUC_B instruction group onward. Thus, as in Embodiment 3, a save process instruction group and a restore process instruction group are respectively added before and after the function call.

Further, although Embodiment 1 and the variations thereof have shown that the first and second process instruction groups are separately received, they may be different processes in the same input program or function, as in Embodiment 3. Obviously, this case also produces the same advantageous effect as that described above.

(13) Although Embodiment 3 has shown the structure which includes the BR_B branch instruction group 1660 in order to execute the A instruction group after the B instruction group, the present invention is not limited to this. For example, instead of using a branch instruction, the A instruction group may be placed immediately after the save instruction group 1640 through a rearrangement of the processing order of the instruction groups. In that case, the BR_B branch instruction group 1660 is no longer necessary, however, in order to make the processing order of the instruction groups the same as that of the input program 1310, a conversion such as insertion of a branch instruction for branching to the A instruction group after the STR_A-variable-group value assigning instruction group 1620 is necessary.

(14) In Embodiment 3, the user specifies which part of the input program should be treated as the A instruction group and the B instruction group. However, the tampering-prevention-process generation apparatus may randomly select, from the input program, an instruction group as the A instruction group and another instruction group as the B instruction group. In such a case, the tampering-prevention-process generation apparatus needs to determine the PRE_A instruction group and the SUC_A instruction group after determining the A instruction group and the B instruction group. In this case, the tampering-prevention-process generation apparatus analyzes branch source blocks of the determined A instruction group, and determines the analyzed blocks as a first PRE_A instruction group, a second PRE_A instruction group, . . . and so on. The same holds true for a first PRE_B instruction group, a second PRE_B instruction group, . . . and so on. Furthermore, the tampering-prevention-process generation apparatus analyzes branch source blocks of an instruction group, and determines the analyzed blocks as a first SUC_A instruction group, a second SUC_A instruction group, . . . and so on. The same holds true for a first SUC_B instruction group, a second SUC_B instruction group, . . . and so on.

(15) Although Embodiment 3 has shown that "var_ab0" is the only G_VAL_AB variable, that is, the branch destination determining variable, there may be more than one. In that case, the variable indicating whether or not to branch to the SUC_A instruction group may be different from the variable indicating whether or not to branch to the SUC_B instruction group, for example.

(16) Although Embodiment 3 has shown that the input program including the SUC_A instruction group is used as an input to the tampering-prevention-process generation apparatus 1320, the present invention is not limited to this. For example, in the case where an instruction serving as the branch destination of the A instruction group is a function on the OS side, an instruction corresponding to the SUC_A instruction group is not necessarily included in the input program. That is to say, even when the SUC_A instruction group is not provided as an input, as long as the address or the function name of the instruction serving as the branch destination of the A instruction group is known, the tamperingprevention-process generation apparatus 1320 is capable of carrying out the obfuscation through an arrangement of the CBR_AB conditional branch instruction group such that the process branches to the instruction identified by the address or function name.

(17) Although Embodiment 1, the variations thereof, and Embodiments 2 and 3 have shown only an example of the process flow of the program generation, processes having no dependent relationship with each other may be in a rearranged order or executed in parallel.

Further, the obfuscation described here may be applied with another obfuscation technique.

For example, in Embodiment 1, the variations thereof, and Embodiments 2 and 3, the received instruction groups are basically included in the output instruction groups as they are. However, the present invention is not limited to this. According to another obfuscation technique and so on, instruction groups equivalent to the received instruction groups may be generated based on the input program, and included in the post-obfuscation program. This makes it difficult to understand the relationship between the instruction groups of the input program and the instruction groups of the output program. Here, instead of generating equivalent instruction groups for all the instruction groups, equivalent instruction groups may be generated for some of the instruction groups, and other instruction groups may be outputted as they were in the input program. That is to say, the equivalent instruction groups in the present variation include instruction groups on which no conversion is performed in particular, and the generation of the equivalent instruction groups includes the process of simply extracting each instruction group from the input program. It is to be noted that in order to obtain the above described advantageous effect, at least one of the instruction groups needs to be converted into an instruction group which performs a process different from but equivalent to its original one, regardless of whether or not the other instruction groups are converted into instruction groups different from their original ones.

(18) Here, in the case where the second process instruction group 150 shown in FIG. 3 is obfuscated according to a technique different from the present invention to be executed by the execution processing apparatus 130, for example, it is possible to easily port, without having to analyze, the obfuscated second process instruction group 150 to another appliance so as to allow the appliance to execute the second process instruction group 150 normally.

For example, in the second process instruction group 150, decryption is carried out using an encryption key. The encryption key and the details of the decryption process are information to be kept confidential (confidential information), and must not be analyzed. Therefore, the second process instruction group 150 is obfuscated as described above. However, even when the obfuscation of the second process instruction group 150 enables prevention of the analysis on the confidential information, such obfuscation becomes pointless if such an unauthorized operation as the above mentioned porting can be easily performed. Furthermore, in order to prevent such an unauthorized operation, it is necessary to significantly increase the code size of the obfuscated second process instruction group 150.

Therefore, the tampering-prevention-process generation apparatus 110 of Embodiment 1 and the variations thereof may use, as the first process instruction group 140, an instruction group inherently included in the execution processing apparatus 130 to generate the output process instruction group 160 such that the processing route branches to the first process instruction group 140. This makes the above mentioned porting difficult while suppressing the increase of the code size of the output process instruction group 160.

Figure 30:
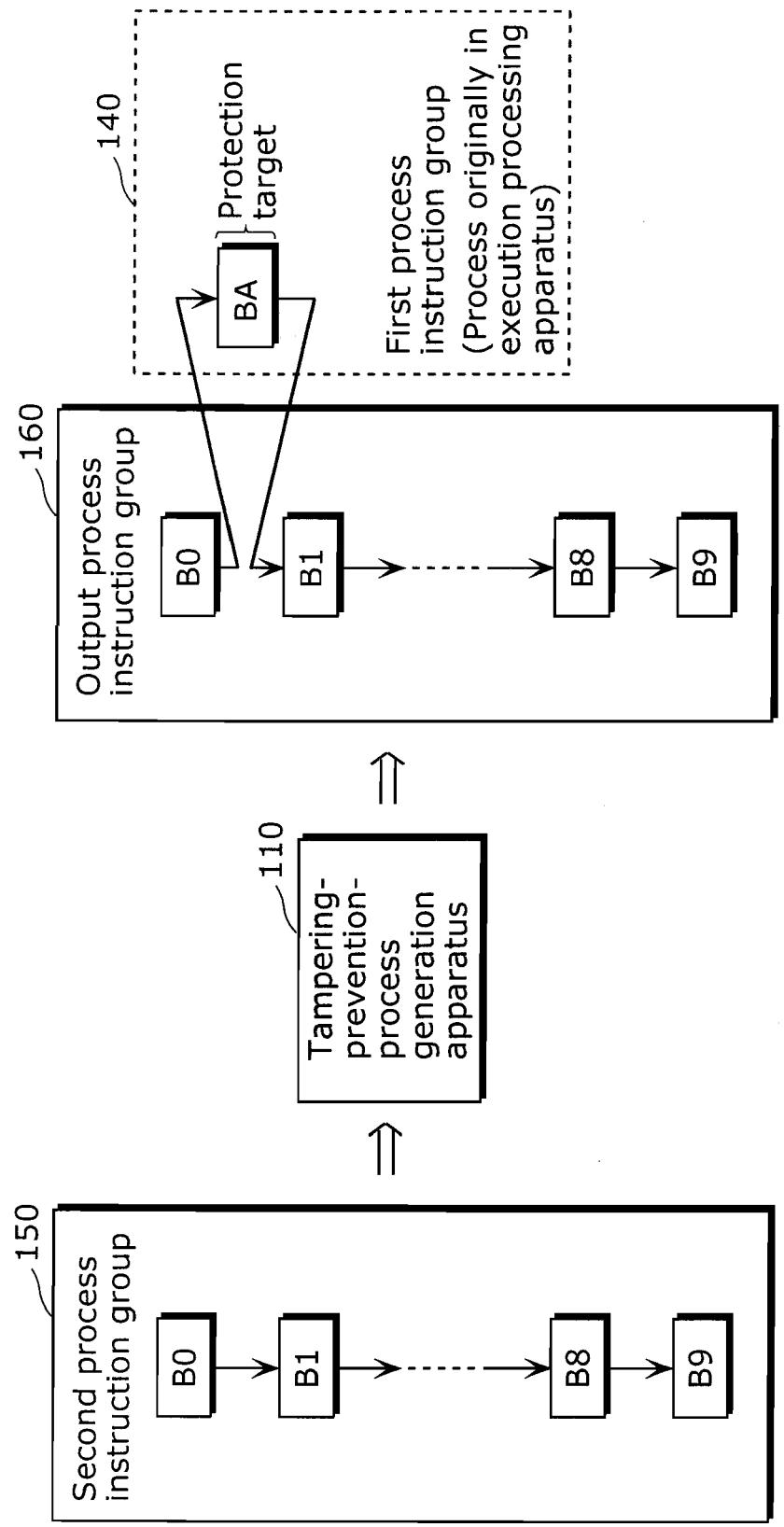
FIG. 30 is a diagram for describing advantageous effects produced in the case where a first process instruction group of the present invention is inherently included in an execution processing apparatus.

FIG. 30 is a diagram for describing advantageous effects of the present invention which are produced in the case where the first process instruction group 140 is inherently included in the execution processing apparatus 130.

The tampering-prevention-process generation apparatus 110 obtains the second process instruction group 150 which is targeted for protection. For example, the second process instruction group 150 includes process blocks B0, B1, . . . and B9. A process block BA which forms the first process instruction group 140 is inherently included in the execution processing apparatus 130. Thus, the tampering-prevention-process generation apparatus 110 generates the output process instruction group 160 by modifying the second process instruction group 150 such that the processing route branches from the process block B0 to the process block BA and then returns to the process block B1. In other words, the tampering-prevention-process generation apparatus 110 sets the first process instruction group 140 as a part of the protection target, and obfuscates the second process instruction group 150 to generate the output process instruction group 160.

As a result, in the case of performing an unauthorized operation to make another appliance execute the process of the second process instruction group 150, for example, the unauthorized analyzer needs to port the first process instruction group 140 as well as the second process instruction group 150. However, porting the first process instruction group 140 to another appliance is difficult since it is an instruction group for performing the process inherently incorporated in the execution processing apparatus. As a consequence, such an unauthorized operation can be made difficult. In addition, the obfuscation of the second process instruction group 150 prevents a significant increase in the number of the instruction groups, and thus it is possible to suppress the increase of the code size of the output process instruction group 160. Further, selecting, as the first process instruction group 140, an instruction group for performing a process unique to each execution processing apparatus further makes the porting difficult.

It is to be noted that the first process instruction group 140 is unnecessarily a program instruction, and it may be a device or a circuit inherently included in the execution processing apparatus 130 (a circuit used for audio reproduction, for example). Further, in order to make the porting difficult, a dedicated device or circuit serving as the first process instruction group 140 may be added to the execution processing apparatus 130. In such cases, it is sufficient to provide the branch process instruction group with an instruction to operate the device or circuit in replacement of the instruction to cause a branch to the first process instruction group 140. It is to be noted that the referenced variable serves as an input to the device or circuit, and the assign-target variable serves as an output of the device or circuit, for example.

Even when a program to be operated by the execution processing apparatus 130 is merely ported, such a structure as above disables the operation of the ported program in an environment where the above mentioned device or circuit is not included, and thus enables prevention of attacks made by unauthorized persons through porting programs.

(19) Here, for example, processes (instruction groups) containing confidential information such as codes sometimes include a characteristic computation such as a table look-up and a bit shift operation that are not commonly used (hereinafter "characteristic computation"). Therefore, when the input program 1310 is executed by the execution processing apparatus 1340 shown in FIG. 16, an unauthorized analyzer can perform an unauthorized analysis by easily finding, with a landmark of the characteristic computation, an instruction group containing confidential information from the input program 1310.

Therefore, the tampering-prevention-process generation apparatus 1320 of Embodiment 3, for example, may generate the tamper-resistant program 1330 with the instruction group including the characteristic computation as the A instruction group 1420.

Figure 31:
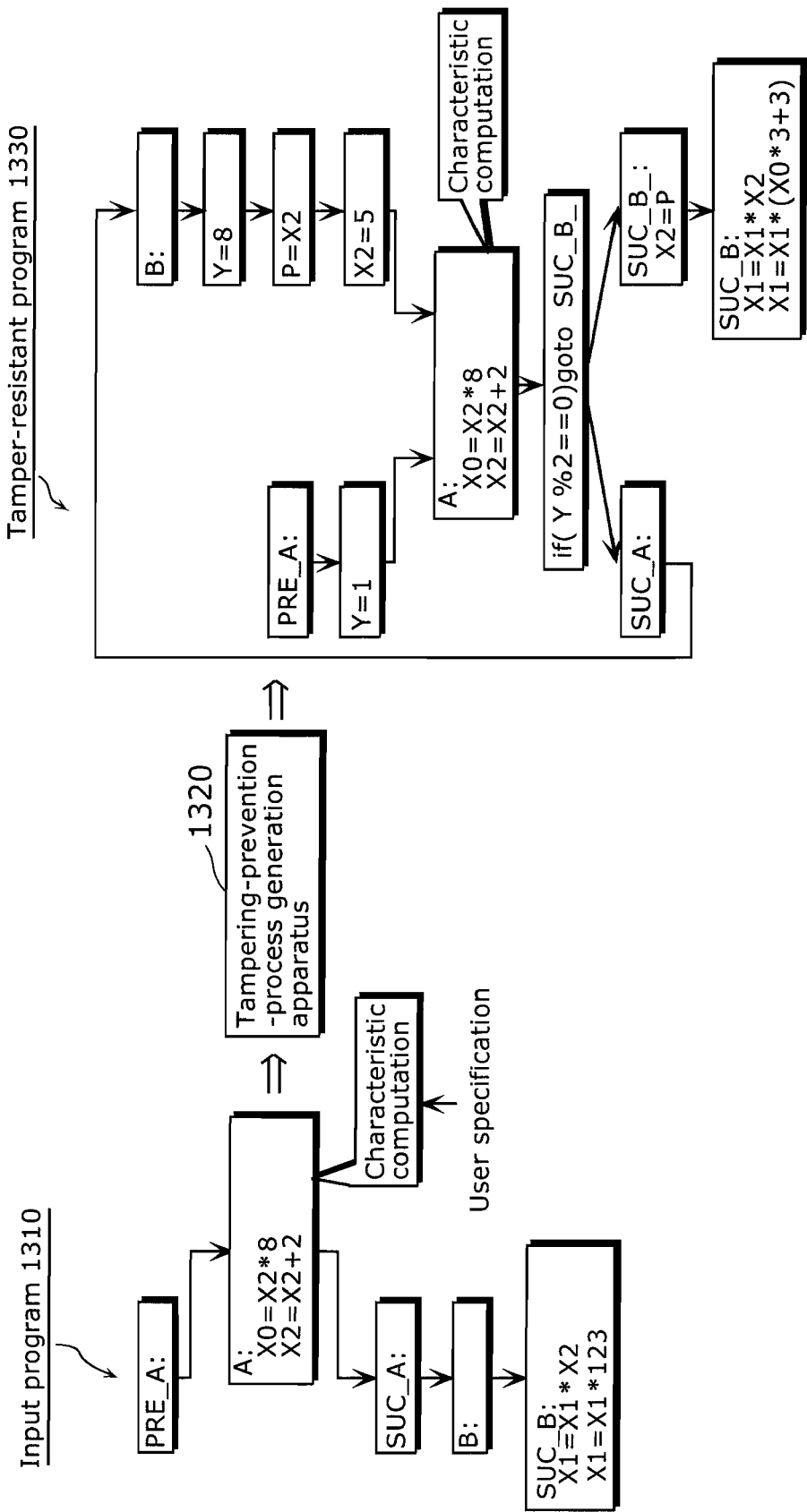
FIG. 31 is a diagram for describing an advantageous effect produced in the case where an A instruction group of the present invention includes a characteristic computation.

FIG. 31 is a diagram for describing an advantageous effect of the present invention produced in the case where the A instruction group 1420 includes the characteristic computation.

Upon obtainment of the input program 1310, the tampering-prevention-process generation apparatus 1320 searches for the instruction group including the characteristic computation and sets the searched out instruction group as the A instruction group 1420 before carrying out the obfuscation as in Embodiment 3 described above. As a result, the program generated by the tampering-prevention-process generation apparatus 1320 becomes the tamper-resistant program 1330 for repeatedly executing the A instruction group 1420 including the characteristic computation, as in Embodiment 3 described above.

This results in an increase in the number of locations, on the process route of the tamper-resistant program 1330, at which the characteristic computation is executed. Consequently, this makes it difficult for the unauthorized analyzer to perform the unauthorized analysis of attempting to find the instruction group containing the confidential information.

It is to be noted that even in Embodiment 1, the variations thereof, and Embodiment 2, the tampering-prevention-process generation apparatus may generate an output process instruction group with the instruction group containing confidential information as the first process instruction group as described above.

(20) In Embodiment 1, the variations thereof, and Embodiments 2 and 3, a branch process instruction group is generated for causing a branch to the protection target instruction group (the first process instruction group or the A instruction group). However, as shown in FIG. 28(d), instead of generating the branch process instruction group, a dependent relationship may be established only.

For example, there may be a case where tampering is performed with a program that restricts content reproduction so that the reproduction restriction set by the program is reset. Such a program allows content reproduction when, for example, the number of times a content item is reproduced is no more than a predetermined, restricted number of times. Another way of allowing the content reproduction is that the program authenticates appliances reproducing a content item, and allows only legitimate appliances to reproduce the content item. Further another way of allowing the content reproduction is that the program judges whether or not the content item is an unauthorized copy, and permits the content reproduction if it is not an unauthorized copy.

That is to say, the unauthorized analyzer finds, from the program, a conditional branch instruction that is for judging whether or not to permit the content reproduction, and attempts to alter the conditional branch instruction to be an unconditional branch instruction so that the reproduction will invariably be permitted.

Figure 32:
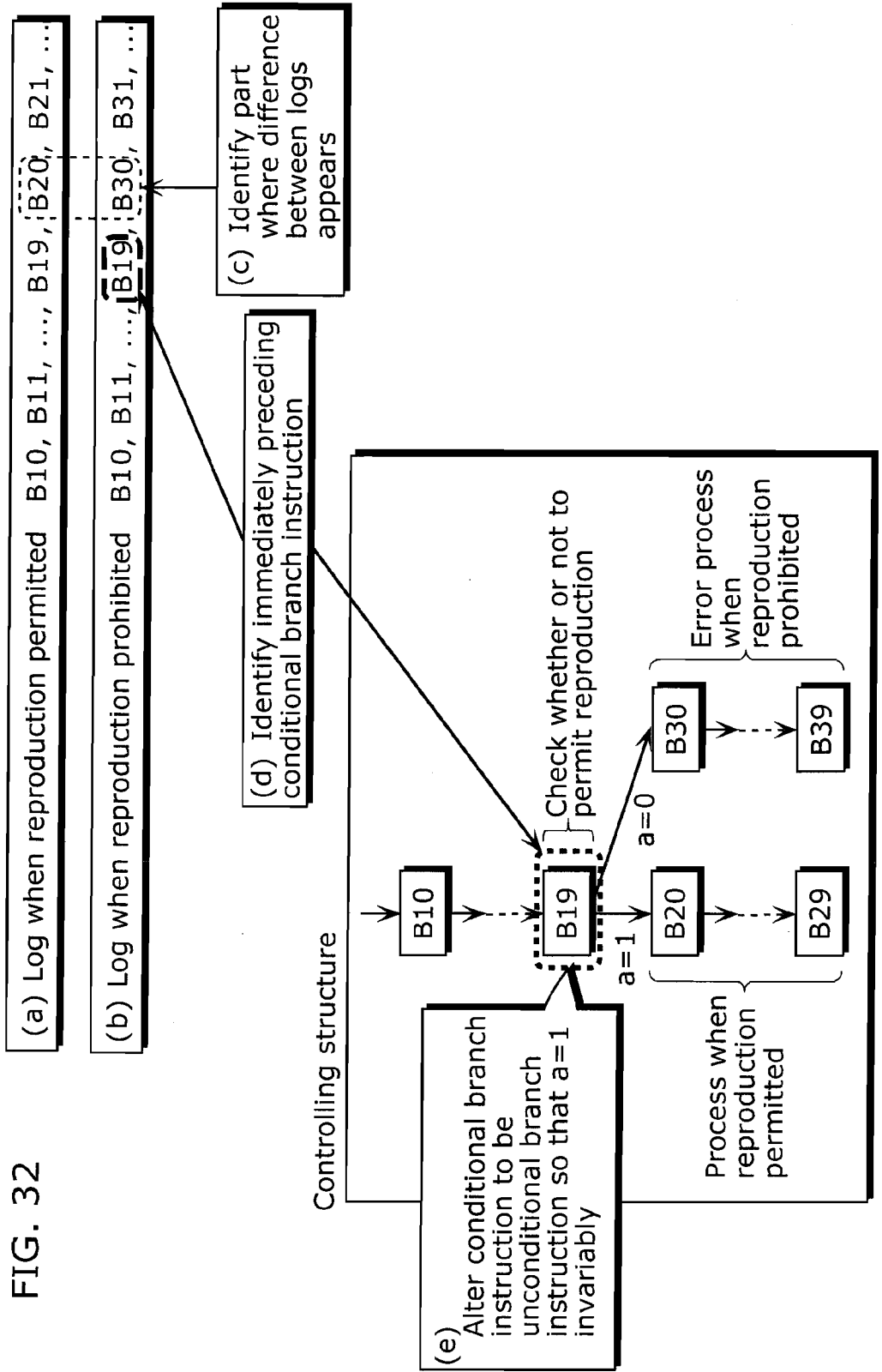
FIG. 32 is a diagram showing an example of tampering carried out by an unauthorized analyzer.

FIG. 32 is a diagram showing an example of tampering carried out by an unauthorized analyzer.

As parts (a) and (b) of FIG. 32 show, the unauthorized analyzer first executes the program to make a comparison between a log when the reproduction is permitted and a log when the reproduction is prohibited. As parts (c) and (d) of FIG. 32 show, the unauthorized analyzer identifies through the comparison the part where a difference between the logs appears, and finds an instruction located immediately before that part, that is, a conditional branch instruction (a process block B19) for judging whether or not to permit the content reproduction.

Then, the unauthorized analyzer analyzes the process block B19, the conditional branch instruction, and elucidates that at the process block B19, "1" is assigned to a variable "a" when the reproduction is permitted, and "0" is assigned to the variable "a" when the reproduction is prohibited. Therefore, the unauthorized analyzer attempts to alter the process block B19 from the conditional branch instruction to an unconditional branch instruction so that "1" will invariably be assigned to the variable "a" at the process block B19.

In order to prevent such an attack, the present invention may establish a dependent relationship only, as shown in FIG. 28(d).

Figure 33:
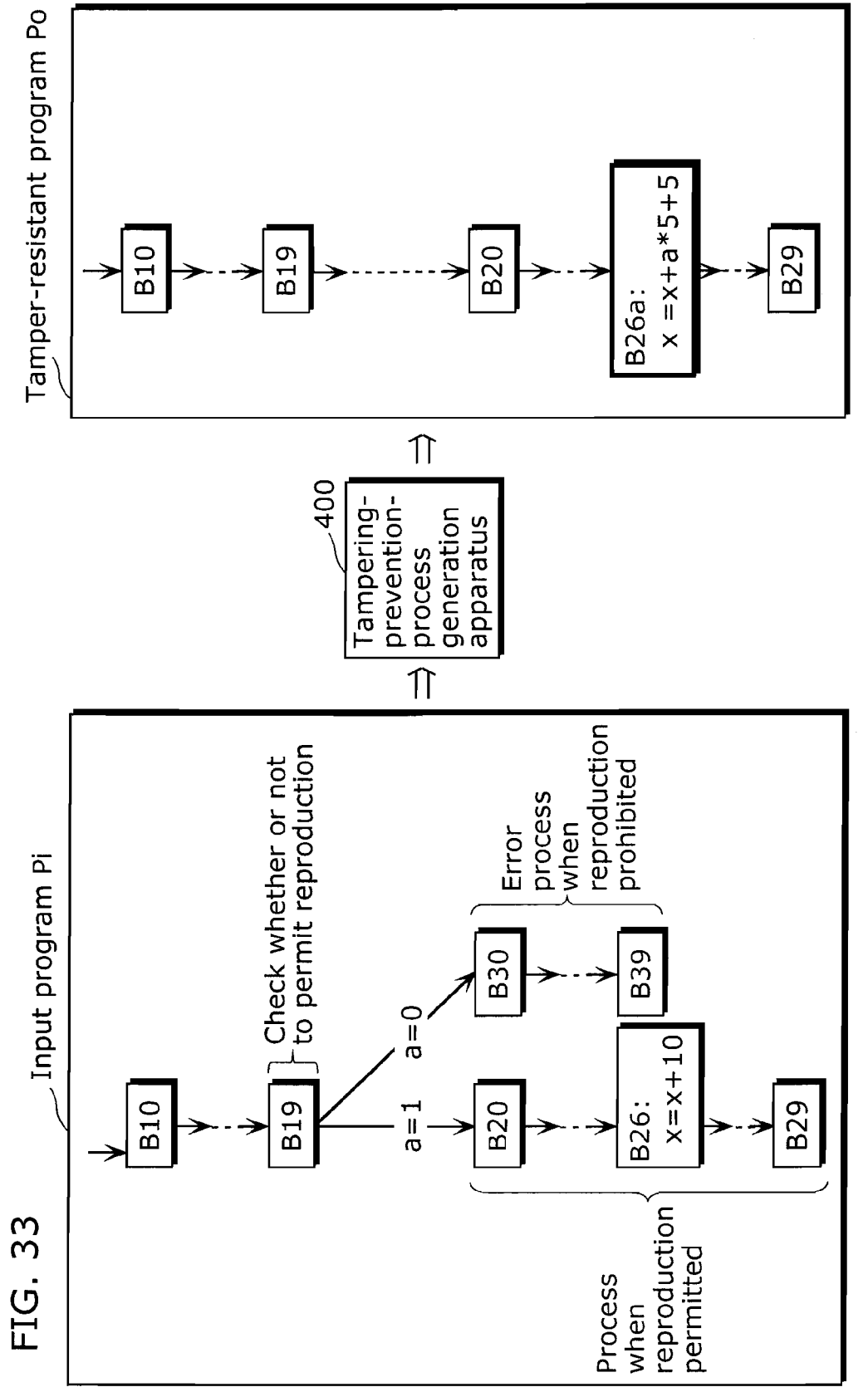
FIG. 33 is a diagram showing an example where a tampering-prevention-process generation apparatus according to a variation of Embodiments 1 to 3 of the present invention establishes a dependent relationship only.

FIG. 33 is a diagram showing an example where the tampering-prevention-process generation apparatus according to the present variation establishes a dependent relationship only.

A tampering-prevention-process generation apparatus 400 obtains a program including the conditional branch instruction shown in FIG. 32 as an input program Pi. Then, the tampering-prevention-process generation apparatus 400 identifies a constant number contained in the process performed when the reproduction is permitted (restricted process) included in the input program Pi. More specifically, the tampering-prevention-process generation apparatus 400 finds a constant number "10" contained in a process block B26. Further, the tampering-prevention-process generation apparatus 400 extracts from the process block B19 a judgment variable "a" for storing, through the conditional branch instruction of the input program Pi (at the process block B19), a judgment result indicating whether or not to permit the reproduction, and a restricted value "1" indicating a judgment result to be stored in the judgment variable "a" when the reproduction is permitted.

As a result, through a conversion of the constant number "10" contained in the process block B26 into a mathematical expression "a*5+5" such that the result of the expression equals the constant number "10" when "a=1", the tampering-prevention-process generation apparatus 400 makes th process at the process block B26 dependent on the process result (execution result) of the process block B19.

More specifically, the tampering-prevention-process generation apparatus 400 generates a tamper-resistant program Po by deleting error processes (process blocks B30 to B39) performed when the reproduction is prohibited and replacing the process block B26 "x=x+10" with a process block B26a "x=x+a*5+5" so that the process performed when the reproduction is permitted is executed regardless of the judgment result of the process block B19 in the input program Pi.

As a result, when the reproduction is permitted at the process block B26, that is, when "1" is assigned to the judgment variable "a", the tamper-resistant program Po allows execution of a process for normal content reproduction. On the other hand, when the reproduction is prohibited at the process block B26, that is, when "0" is assigned to the judgment variable "a", an abnormal process is executed rather than the process for normal content reproduction. Consequently, unless a legitimate value is assigned to the judgment variable "a", the normal content reproduction is not allowed, making it possible to perform the process equivalent to the input program Pi.

Furthermore, according to the present variation, the log of the execution of the tamper-resistant program Po when the reproduction is permitted is identical to the log of the execution of the tamper-resistant program Po when the reproduction is prohibited, which makes it difficult to find the conditional branch instruction targeted for protection and alter it to be an unconditional branch instruction.

Figure 34:
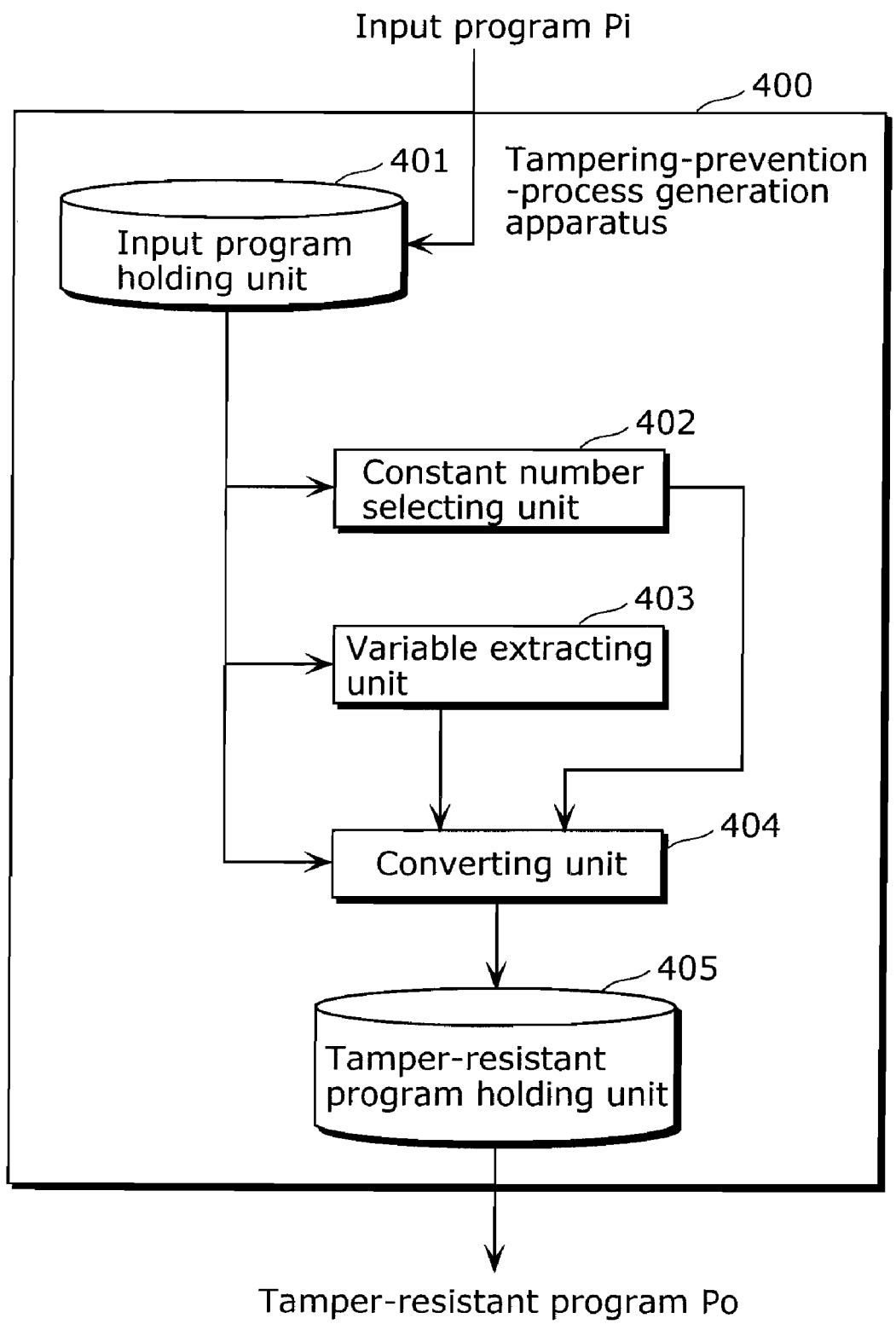
FIG. 34 is a diagram showing an example of the structure of a tampering-prevention-process generation apparatus according to a variation of Embodiments 1 to 3 of the present invention.

FIG. 34 is a diagram showing an example of the structure of the tampering-prevention-process generation apparatus 400 according to the present variation.

The tampering-prevention-process generation apparatus 400 includes an input program holding unit 401, a constant number selecting unit 402, a variable extracting unit 403, a converting unit 404, and a tamper-resistant program holding unit 405.

The input program holding unit 401 obtains and holds the input program Pi.

The constant number selecting unit 402 identifies from the input program Pi the process performed when the reproduction is permitted (restricted process), and selects a constant number contained in that process.

The variable extracting unit 403 extracts, from the conditional branch instruction of the input program Pi, a judgment variable for storing a judgment result through the conditional branch instruction. The variable extracting unit 403 further extracts a restricted value which is stored in the judgment variable when it is judged in the conditional branch instruction that the restricted process should be executed.

It is to be noted that the conditional branch instruction for storing a value indicating the judgment result in the judgment variable may be an instruction group including more than one instruction. Further, the judgment variable may be other than a variable that explicitly appears in the input program Pi. For example, the judgment variable may be a stack. In such a case, the restricted value is a value stored on the stack. Furthermore, the judgment variable may be a storage region corresponding to a location designated by an address variable. In such a case, the restricted value is a value stored at that location. Moreover, the restricted value is also not limited to a single value, and may be a set of values. In such a case, as a process block B26a, an instruction group is generated for performing the same process as the process block B26a regardless of which value among the set is assigned to the judgment variable. The method for generating an instruction group having such a nature is the same as the method for generating the dependent process instruction group according to Variation 6 of Embodiment 1.

Further, such a process for assigning the restricted value to the judgment variable through the conditional branch instruction is the same as the process of the first process instruction group according to Embodiment 1, the variations thereof, and Embodiment 2, and the process according to the A instruction group of Embodiment 3.

The converting unit 404 deletes the error processes in the input program Pi so that the restricted process is executed regardless of the judgment result of the conditional branch instruction. In addition, the converting unit 404 converts the constant number selected by the constant number selecting unit 402 into a mathematical expression which includes the judgment variable. It is to be noted that the converting unit 404 may convert the constant number into a function which includes the judgment variable. Here, the converting unit 404 generates a mathematical expression such that when the restricted value is assigned to the judgment variable, a result calculated from the expression equals the above mentioned constant number. Through such a process, the converting unit 404 generates the tamper-resistant program Po and stores it in the tamper-resistant program holding unit 405. It is to be noted that the converting unit 404 generates the above mentioned mathematical expression by performing the same process as that of the dependent-process-instruction-group generating units 201, 201a, and 201b of Embodiment 1, the variations thereof, and Embodiment 2.

The tamper-resistant program holding unit 405 obtains and holds the tamper-resistant program Po generated by the converting unit 404.

Figure 35:
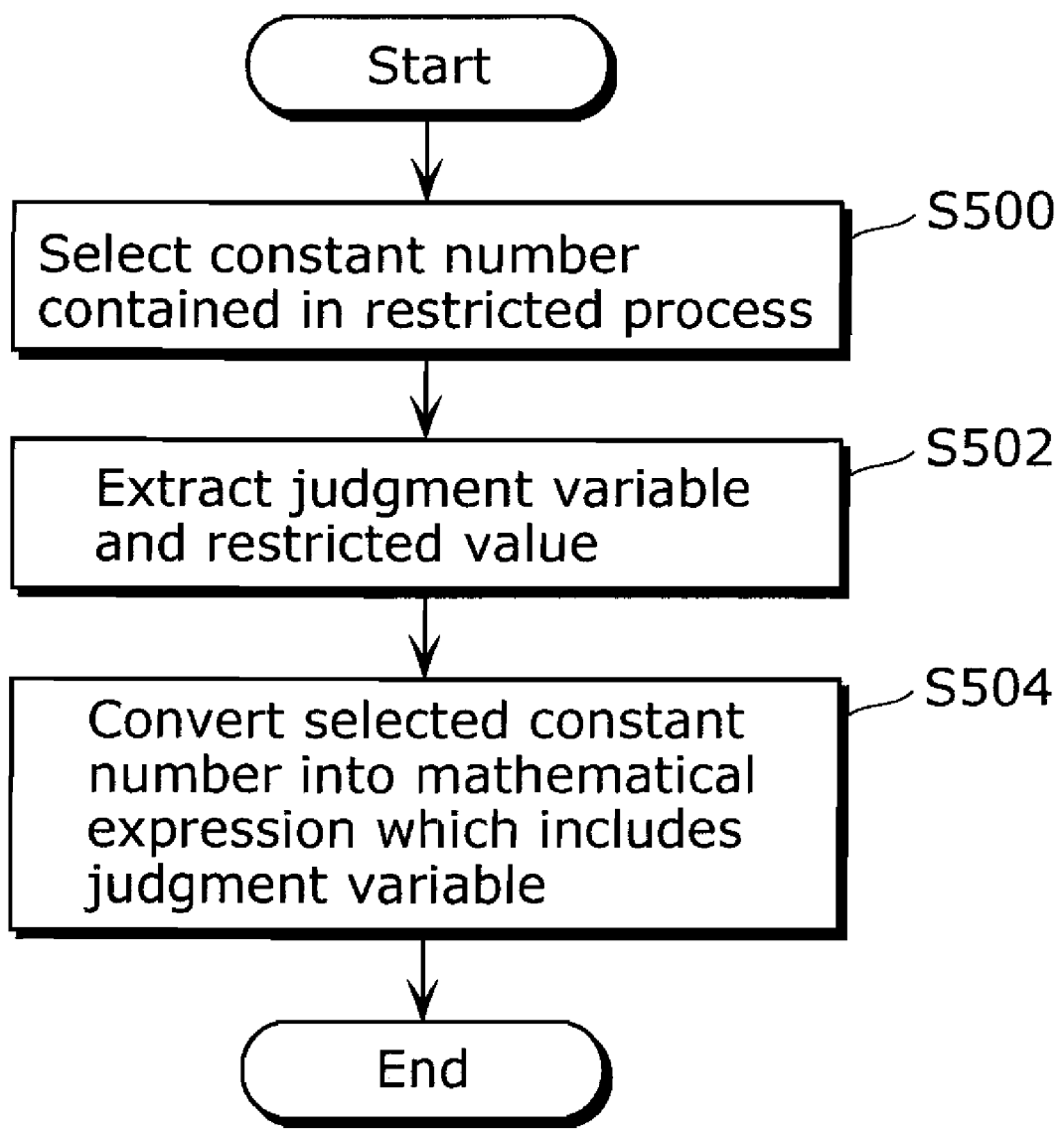
FIG. 35 is a diagram showing an example of operations of a tampering-prevention-process generation apparatus according to a variation of Embodiments 1 to 3 of the present invention.

FIG. 35 is a flow chart showing an example of operations of the tampering-prevention-process generation apparatus 400 according to the present variation.

The tampering-prevention-process generation apparatus 400 first selects a constant number contained in a restricted process of the input program Pi (Step S500). Further, the tampering-prevention-process generation apparatus 400 extracts a judgment variable and a restricted value from a conditional branch instruction of the input program Pi (Step S502). The tampering-prevention-process generation apparatus 400 then converts the constant number selected in Step S500 into a mathematical expression which includes the judgment variable (Step S504). Meanwhile, the tampering-prevention-process generation apparatus 400 deletes error processes in the input program Pi so that the restricted process is executed regardless of the judgment result of the conditional branch instruction. As a result, the input program Pi is converted into the tamper-resistant program Po.

(21) Moreover, although Embodiment 1 and the variations thereof have described the second process instruction group 150 as a process for decompressing a compressed content item, it may be a different process. Furthermore, although Embodiment 1, the variations thereof, and Embodiment 2 have described the first process instruction group 140 as a process for decrypting an encrypted number of times a content item can be reproduced and outputting the resulting number of times in plain text that the content item can be reproduced, it may be a different process. In other words, the present invention may be applied to processes and instruction groups other than the decryption process, decompression process and so on described in Embodiment 1, the variations thereof, and Embodiment 2. The present invention can be applied to any instruction groups as long as they need protection against tampering. An example is an instruction group for managing content usage rights.

(22) Although Embodiment 1, the variations thereof, and Embodiments 2 and 3 have shown an exemplary case where each of the programs and instruction groups is written in the C language, the present invention is not limited to this. They may be written in other programming languages including a modeling language such as the UML, an intermediate language used by compilers and the like, an assembly language, and a machine language.

(23) The target to be obfuscated according to Embodiment 1, the variations thereof, Embodiments 2 and 3 is not limited to what is written in a computer programming language, and may be information about logical design described in such a language as a logic circuit description language (specifically, a program and the like described in a hardware description language such as VHDL). The same holds true for the programs generated through the obfuscation. To be more specific, the obfuscation target programs and the programs obtained through the obfuscation according to the present invention are not limited to the programs described in a computer programming language, but are concepts that also include the above mentioned information about logical design.

(24) Each of the above described apparatuses and devices is specifically a computer system which includes a microprocessor, a ROM, a RAM, a hard disk unit, a display unit, a keyboard, a mouse, and so on. In the RAM or hard disk unit, a computer program is stored. That is to say, each apparatus and device achieves its function through the operation of the microprocessor in accordance with the computer program. Here, the computer program is structured as a combination of plural instruction codes representing commands to the computer for achieving a predetermined function. It is to be noted that each of the above described apparatuses and devices is not limited to a computer system which includes all the components such as a microprocessor, a ROM, a RAM, a hard disk unit, a display unit, a keyboard, and a mouse, but may be a computer system which includes some of these components.

(25) Some or all of the structural elements of each of the above described apparatuses and devices may be incorporated into a single system Large Scale Integration (LSI). The system LSI is a super multifunctional LSI manufactured by integrating plural structural elements on a single chip, and is specifically a computer system which includes a microprocessor, a ROM, a RAM, and so on. In the RAM, a computer program is stored. That is to say, the system LSI achieves its function through the operation of the microprocessor in accordance with the computer program.

(26) Some or all of the structural elements of each of the above described apparatuses and devices may be incorporated into a discrete module or an IC card attachable to each apparatus and device. The IC card and module are computer systems which include a microprocessor, a ROM, a RAM, and so on. The IC card and module may include the above mentioned super multifunctional LSI. That is to say, the IC card and module achieve their functions through the operation of the microprocessor in accordance with the computer program. The IC card and module may be tamper-resistant.

(27) The present invention can be also embodied as a method by which the above described tampering-prevention-process generation apparatus generates a tamper prevention process. In addition, the present invention can be also embodied as a computer program which causes a computer to generate a tamper prevention process according to the method, and as a digital signal representing the computer program.

(28) Further, the present invention can be also embodied as the above mentioned computer program or digital signal recorded on a computer-readable recording medium such as a flexible disk, a hard disk, a CD-ROM, an MO disk, a DVD, a DVD-ROM, a DVD-RAM, a BD (Blu-ray Disc), and a semiconductor memory. Furthermore, the present invention can also be embodied as the digital signal recorded on these recording media.

(29) Furthermore, the present invention can be also embodied as the above described computer program or digital signal transmitted via a data broadcast and the like, or a network typified by a telecommunication line, a wireless communication line, a wire communication line and the Internet.

(30) Moreover, the present invention can be also embodied as a computer system which includes a microprocessor and a memory. In such a case, the above mentioned computer program is stored in the memory, and the microprocessor operates in accordance with the computer program.

(31) Furthermore, by transmission of the computer program or digital signal recorded on a recording medium, or transmission of the computer program or digital signal via a network or the like, the processes of the present invention may be performed by another independent computer system.

(32) The present invention may be a combination of the above described embodiments and variations.

Industrial Applicability

The instruction generation apparatus according to the present invention is capable of converting programs that handle confidential information such as encryption keys into programs which are more difficult to analyze. Therefore, the instruction generation apparatus according to the present invention is useful for appliances and so on that generate software, for example, which handles confidential information which, when leaked to unauthorized analyzers, could cause disadvantageous effects. Further, the programs generated by the instruction generation apparatus according to the present invention are in a form that does not easily allow unauthorized analyzers to perform analyses, and thus it can be used for appliances and so on that executes software, for example, for performing processes handling confidential information which, when leaked to the unauthorized analyzers, could cause disadvantageous effects.

The invention claimed is:

1. An instruction generation apparatus which generates an output process instruction group including a plurality of instructions to be executed by a computer, said apparatus comprising:
   a memory;
   a branch-instruction generating unit configured to generate, as a part of the output process instruction group, a branch instruction which causes a processing route to branch to a first process instruction so that the computer executes the first process instruction, the first process instruction causing the computer to assign data to an assign-target variable; and
   a dependent-process-instruction generating unit configured to generate, as a part of the output process instruction group, a dependent process instruction dependent on the data assigned to the assign-target variable,
   the dependent process instruction causing the computer to execute a predetermined process in the output process instruction group onward when the data indicates predetermined contents, and
   the data assigned to the assign-target variable indicating a result of the first process instruction executed by the computer according to the branch instruction,
   wherein said dependent-process-instruction generating unit is configured to obtain a second process instruction which causes the computer to execute a predetermined process, and to generate the dependent process instruction by converting the second process instruction into the dependent process instruction, and
   the dependent process instruction causes the computer to derive an execution result identical to an execution result of the second process instruction when a value assigned to the assign-target variable equals a predetermined assumed value, the value assigned to the assign-target variable indicating an execution result of the first process instruction,
   said instruction generation apparatus further comprising:
   an obtaining unit configured to obtain an input program which includes: the second process instruction that does not use the first process instruction; and a third process instruction which causes the computer to execute a process different from the second process instruction using the first process instruction; and
   an output unit configured to output an output program which includes the third process instruction and the output process instruction group, the output process instruction group including the dependent process instruction generated through the conversion of the second process instruction included in the input program by said dependent-process-instruction generating unit.

2. An instruction generation apparatus which generates an output process instruction group including a plurality of instructions to be executed by a computer, said apparatus comprising:
- a memory;
- a branch-instruction generating unit configured to generate, as a part of the output process instruction group, a branch instruction which causes a processing route to branch to a first process instruction so that the computer executes the first process instruction, the first process instruction causing the computer to assign data to an assign-target variable; and
- a dependent-process-instruction generating unit configured to generate, as a part of the output process instruction group, a dependent process instruction dependent on the data assigned to the assign-target variable,
- the dependent process instruction causing the computer to execute a predetermined process in the output process instruction group onward when the data indicates predetermined contents, and
- the data assigned to the assign-target variable indicating a result of the first process instruction executed by the computer according to the branch instruction,
- wherein said dependent-process-instruction generating unit is configured to obtain a second process instruction which causes the computer to execute a predetermined process, and to generate the dependent process instruction by converting the second process instruction into the dependent process instruction, and
- the dependent process instruction causes the computer to derive an execution result identical to an execution result of the second process instruction when a value assigned to the assign-target variable equals a predetermined assumed value, the value assigned to the assign-target variable indicating an execution result of the first process instruction,
- said instruction generation apparatus further comprising:
- an assumed value calculating unit configured to calculate, as the assumed value, a value to be assigned to the assign-target variable in the first process instruction according to a predetermined condition,
- wherein said dependent-process-instruction generating unit is configured to generate the dependent process instruction which causes the computer to derive an execution result identical to the execution result of the second process instruction when the value assigned to the assign-target variable equals the assumed value calculated by said assumed value calculating unit, the value assigned to the assign-target variable indicating the execution result of the first process instruction.

3. The instruction generation apparatus according to claim 2, further comprising
- a referenced-variable-value-assigning-process generating unit configured to generate, as a part of the output process instruction group, a referenced-variable-value-assigning-process instruction which causes the computer to assign a value to a referenced variable referred to in the first process instruction at a time of executing the first process instruction,
- wherein said assumed value calculating unit is configured to use the value assigned to the referenced variable as the condition, and calculate, as the assumed value, a value to be assigned to the assign-target variable in the first process instruction according to the value assigned to the referenced variable.

4. The instruction generation apparatus according to claim 3, further comprising
- a referenced-variable identifying unit configured to identify a referenced variable referred to in the first process instruction,
- wherein said referenced-variable-value-assigning-process generating unit is configured to generate the referenced-variable-value-assigning-process instruction which causes the computer to assign a value to the referenced variable identified by said referenced-variable identifying unit.

5. The instruction generation apparatus according to claim 3, further comprising
- a value holding unit configured to hold, as a set of referenced variable values, values which are candidates for a value to be assigned to the referenced variable,
- wherein said referenced-variable-value-assigning-process generating unit is configured to generate the referenced-variable-value-assigning-process instruction which causes a value included in the set of referenced variable values to be assigned to the referenced variable.

6. The instruction generation apparatus according to claim 5,
- wherein said assumed value calculating unit is configured to calculate, as a set of assumed values, a set of values each to be assigned to the assign-target variable in the first process instruction, the calculation being performed according to each of values included in the set of referenced variable values,
- said dependent-process-instruction generating unit is configured to generate the dependent process instruction by using the set of referenced variable values and the set of assumed values, and
- the dependent process instruction causes the computer to derive an execution result identical to the execution result of the second process instruction when the value assigned to the assign-target variable equals a value included in the set of assumed values, the value assigned to the assign-target variable indicating the execution result of the first process instruction.

7. An instruction generation apparatus which generates an output process instruction group including a plurality of instructions to be executed by a computer, said apparatus comprising:
- a memory;
- a branch-instruction generating unit configured to generate, as a part of the output process instruction group, a branch instruction which causes a processing route to branch to a first process instruction so that the computer executes the first process instruction, the first process instruction causing the computer to assign data to an assign-target variable; and
- a dependent-process-instruction generating unit configured to generate, as a part of the output process instruction group, a dependent process instruction dependent on the data assigned to the assign-target variable,
- the dependent process instruction causing the computer to execute a predetermined process in the output process instruction group onward when the data indicates predetermined contents, and
- the data assigned to the assign-target variable indicating a result of the first process instruction executed by the computer according to the branch instruction, wherein the dependent process instruction causes the computer to compare a value assigned to the assign-target variable and a predetermined assumed value, execute the predetermined process when the value assigned to the assign-target variable equals the predetermined assumed value, and suppress the execution of the predetermined process when the value assigned to the assign-target variable is different from the assumed value.

8. An instruction generation apparatus which generates an output process instruction group including a plurality of instructions to be executed by a computer, said apparatus comprising:
 a memory;
 a branch-instruction generating unit configured to generate, as a part of the output process instruction group, a branch instruction which causes a processing route to branch to a first process instruction so that the computer executes the first process instruction, the first process instruction causing the computer to assign data to an assign-target variable; and
 a dependent-process-instruction generating unit configured to generate, as a part of the output process instruction group, a dependent process instruction dependent on the data assigned to the assign-target variable,
 the dependent process instruction causing the computer to execute a predetermined process in the output process instruction group onward when the data indicates predetermined contents, and
 the data assigned to the assign-target variable indicating a result of the first process instruction executed by the computer according to the branch instruction,
 said instruction generation apparatus further comprising:
 an obtaining unit configured to obtain an input program which includes the first process instruction, a first preceding instruction serving as a branch source of the first process instruction, a first subsequent instruction serving as a branch destination of the first process instruction, a second process instruction serving as a branch destination of the first subsequent instruction, and a second subsequent instruction serving as a branch destination of the second process instruction;
 a conditional-branch-instruction generating unit configured to generate a conditional branch instruction; and
 an output unit configured to output an output program which includes the first process instruction, the first preceding instruction, the first subsequent instruction, and the second process instruction,
 wherein said dependent-process-instruction generating unit is configured to generate the dependent process instruction which causes the computer to derive an execution result identical to an execution result of the second subsequent instruction when the data assigned to the assign-target variable indicates predetermined contents,
 said branch-instruction generating unit is configured to generate the branch instruction which causes the processing route to branch from the second process instruction to the first process instruction so that the computer executes the first process instruction again after executing the second process instruction,
 said conditional-branch-instruction generating unit is configured to generate the conditional branch instruction which causes the processing route to branch from the first process instruction to the first subsequent instruction when the first condition is satisfied, and branch from the first process instruction to the dependent process instruction when the second condition is satisfied,
 said output unit is configured to output the output program which includes the dependent process instruction, the branch instruction, and the conditional branch instruction,
 the first condition is that the first preceding instruction has been executed immediately before the first process instruction when the computer executes the first process instruction, and
 the second condition is that the second process instruction has been executed immediately before the first process instruction when the computer executes the first process instruction.

9. The instruction generation apparatus according to claim 8,
 wherein the first subsequent instruction included in the input program includes a plurality of first subsequent instructions, and
 said conditional-branch-instruction generating unit is configured to generate, when the first condition is satisfied, the conditional branch instruction which causes the processing route to branch from the first process instruction to one of the plurality of first subsequent instructions which satisfies a third condition so that the one of the plurality of first subsequent instructions is executed as a branch-destination first subsequent instruction after the first process instruction is executed.

10. The instruction generation apparatus according to claim 9,
 wherein the third condition is a value assigned to a variable, and
 said conditional-branch-instruction generating unit is configured to generate the conditional branch instruction which causes the processing route to make a branch based on a value assigned to a variable indicating whether or not the first condition is satisfied and a value assigned to a variable indicating whether or not the second condition is satisfied.

11. The instruction generation apparatus according to claim 8,
 wherein the second subsequent instruction included in the input program includes a plurality of second subsequent instructions,
 the dependent process instruction causes the plurality of second subsequent instructions to be converted into a plurality of dependent process instructions including the dependent process instruction, and
 said conditional-branch-instruction generating unit is configured to generate, when the second condition is satisfied, the conditional branch instruction which causes the processing route to branch from the first process instruction to one of the plurality of dependent process instructions which satisfies a fourth condition so that the one of the plurality of dependent process instructions is executed as a branch-destination dependent process instruction after the first process instruction is executed.

12. The instruction generation apparatus according to claim 11,
 wherein the fourth condition is a value assigned to a variable, and
 said conditional-branch-instruction generating unit is configured to generate the conditional branch instruction which causes the processing route to make a branch based on a value assigned to a variable indicating whether or not the first condition is satisfied and a value assigned to a variable indicating whether or not the second condition is satisfied.

13. The instruction generation apparatus according to claim 8, further comprising:
- a variable generating unit configured to generate an additional variable which is not used in the input program; and
- a conditional-value-assigning-instruction generating unit configured to generate a first conditional value assigning instruction which causes the computer to assign a first conditional value to the additional variable when the first condition is satisfied, and to generate a second conditional value assigning instruction which causes the computer to assign a second conditional value to the additional variable when the second condition is satisfied,
- wherein said conditional-branch-instruction generating unit is configured to generate a conditional branch instruction which causes the processing route to branch from the first process instruction to the first subsequent instruction when a value assigned to the additional variable is the first conditional value, and branch from the first process instruction to the dependent process instruction when the value assigned to the additional variable is the second conditional value.

14. The instruction generation apparatus according to claim 8,
- wherein the second subsequent instruction and the dependent process instruction cause the computer to execute respective processes that are equivalent to each other by using an execution result obtained through execution of the second process instruction, and
- said instruction generation apparatus further comprises:
- a save-instruction generating unit configured to generate a save instruction to save, before the execution of the first process instruction, the execution result obtained through the execution of the second process instruction; and
- a restore-instruction generating unit configured to generate a restore instruction to restore the saved execution result after the first process instruction is executed again.

15. The instruction generation apparatus according to claim 8,
- wherein, when the first process instruction includes an Application Program Interface (API), said branch-instruction generating unit is configured to search for, as the second subsequent instruction, an instruction to call an API identical to the API, and generate the branch instruction which causes the processing route to branch from the second process instruction serving as a branch source of the second subsequent instruction to the first process instruction.

* * * * *